(12) United States Patent
Zheng et al.

(10) Patent No.: US 12,365,540 B2
(45) Date of Patent: Jul. 22, 2025

(54) CONTROL METHOD FOR GOODS RETRIEVEMENT AND STORAGE, APPARATUS, CARRYING APPARATUS, AND TRANSPORT ROBOT

(71) Applicant: HAI ROBOTICS CO., LTD., Shenzhen (CN)

(72) Inventors: Ruiqun Zheng, Shenzhen (CN); Zhe Kong, Shenzhen (CN); Ying Zhao, Shenzhen (CN); Jiawei He, Shenzhen (CN); Qingxin Zhan, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 746 days.

(21) Appl. No.: 17/707,135

(22) Filed: Mar. 29, 2022

(65) Prior Publication Data

US 2022/0219902 A1    Jul. 14, 2022

Related U.S. Application Data

(63) Continuation of application No. PCT/CN2020/119651, filed on Sep. 30, 2020.

(30) Foreign Application Priority Data

Sep. 30, 2019  (CN) .......................... 201921662771.1
Jan. 21, 2020  (CN) .......................... 202010068990.8
(Continued)

(51) Int. Cl.
*B65G 1/137*    (2006.01)
*B65G 1/04*     (2006.01)
(Continued)

(52) U.S. Cl.
CPC ........... *B65G 1/137* (2013.01); *B65G 1/0492* (2013.01); *G05D 1/0212* (2013.01);
(Continued)

(58) Field of Classification Search
CPC ............ B65G 1/137; B65G 2203/0233; B65G 2203/0283; B65G 2203/041;
(Continued)

(56) References Cited

U.S. PATENT DOCUMENTS 7,177,459 B1    2/2007  Watanabe
9,120,622 B1 *  9/2015  Elazary .................... B66F 9/07
(Continued)

FOREIGN PATENT DOCUMENTS

CA        3049401 A1 *  8/2018  ............... B60P 1/00
CN        103153822 A    6/2013
(Continued)

OTHER PUBLICATIONS

International Search Report and Written Opinion of the ISA for PCT/CN2020/119651 mailed Dec. 31, 2020.
(Continued)

*Primary Examiner* — Thomas Randazzo
(74) *Attorney, Agent, or Firm* — Frank Gao, Esq.

(57)    ABSTRACT

The present disclosure provides a control method for goods retrievement and storage, a control apparatus, and a transport robot. The control method for goods retrievement includes: receiving a retrievement instruction, and acquiring locating information of target goods according to the retrievement instruction; moving a transport robot to a target position according to the locating information; obtaining status information of the target goods and/or position relationship information between a carrying apparatus and the target goods; and adjusting a position and posture of the carrying apparatus according to the status information and/or the position relationship information, and causing the carrying apparatus to take out the target goods. According to the present disclosure, the position of the target goods can be accurately determined by obtaining status information of the (Continued)

target goods and/or position relationship information between the carrying apparatus and the target goods, so that the target goods can be accurately retrieved.

14 Claims, 21 Drawing Sheets

(30) Foreign Application Priority Data

Jan. 21, 2020 (CN) .......................... 202010069012.5
Jan. 21, 2020 (CN) .......................... 202020141209.0
Jan. 21, 2020 (CN) .......................... 202020142100.9

(51) Int. Cl.
*G05D 1/00* (2024.01)
*G06T 7/60* (2017.01)
*G06T 7/70* (2017.01)

(52) U.S. Cl.
CPC ............. *G05D 1/0246* (2013.01); *G06T 7/60* (2013.01); *G06T 7/70* (2017.01); *B65G 2203/0233* (2013.01); *B65G 2203/0283* (2013.01); *B65G 2203/041* (2013.01); *G06T 2207/30252* (2013.01)

(58) Field of Classification Search
CPC .......... B65G 2203/0216; B65G 1/0435; B65G 1/0492; G05D 1/0212; G05D 1/0246; G05D 1/0094; G05D 1/0234; G05D 1/0251; G06T 7/60; G06T 7/70; G06T 2207/30252; B25J 5/007; B25J 9/1697; G05B 2219/37555; G05B 2219/40298; G05B 2219/40543; G05B 2219/45045
See application file for complete search history.

(56) References Cited

U.S. PATENT DOCUMENTS

| | | | |
|---|---|---|---|
| 9,733,646 B1 * | 8/2017 | Nusser ................... | B65G 57/03 |
| 2004/0186624 A1 | 9/2004 | Oda | |
| 2007/0215412 A1 | 9/2007 | Fossier | |
| 2007/0276539 A1 | 11/2007 | Habibi | |
| 2016/0304281 A1 | 10/2016 | Elazary | |
| 2016/0332299 A1 | 11/2016 | Suzuki | |
| 2017/0107055 A1 | 4/2017 | Magens | |
| 2017/0341862 A1 | 11/2017 | Aschauer | |
| 2018/0057263 A1 | 3/2018 | Beer | |
| 2018/0057283 A1 | 3/2018 | Peters | |
| 2018/0127212 A1 * | 5/2018 | Jarvis ..................... | G05D 1/247 |
| 2018/0370727 A1 | 12/2018 | Hance | |
| 2019/0054932 A1 | 2/2019 | Stadie | |
| 2019/0168392 A1 | 6/2019 | Väin | |

FOREIGN PATENT DOCUMENTS

| | | | | |
|---|---|---|---|---|
| CN | 103708161 | A | 4/2014 | |
| CN | 104444080 | A | 3/2015 | |
| CN | 105184537 | A | 12/2015 | |
| CN | 204945796 | U | 1/2016 | |
| CN | 205294184 | U | 6/2016 | |
| CN | 105858188 | A | 8/2016 | |
| CN | 206265699 | U | 6/2017 | |
| CN | 107067206 | A | 8/2017 | |
| CN | 206679679 | U | 11/2017 | |
| CN | 206735725 | U | 12/2017 | |
| CN | 207205163 | U | 4/2018 | |
| CN | 108122016 | A | 6/2018 | |
| CN | 108381572 | A | 8/2018 | |
| CN | 108675226 | A | 10/2018 | |
| CN | 108698224 | A | 10/2018 | |
| CN | 109018810 | A | 12/2018 | |
| CN | 109100744 | A | 12/2018 | |
| CN | 109132313 | A | 1/2019 | |
| CN | 109227529 | A | 1/2019 | |
| CN | 109250380 | A | 1/2019 | |
| CN | 109573449 | A | 4/2019 | |
| CN | 109573526 | A | 4/2019 | |
| CN | 109607105 | A * | 4/2019 | ............ B65G 35/00 |
| CN | 109775219 | A | 5/2019 | |
| CN | 109782681 | A | 5/2019 | |
| CN | 109784793 | A | 5/2019 | |
| CN | 209023571 | U | 6/2019 | |
| CN | 109977886 | A | 7/2019 | |
| CN | 110040412 | A | 7/2019 | |
| CN | 209210300 | U | 8/2019 | |
| CN | 110239870 | A | 9/2019 | |
| CN | 110472515 | A | 11/2019 | |
| CN | 110482098 | A | 11/2019 | |
| CN | 110537189 | A | 12/2019 | |
| CN | 110589331 | A | 12/2019 | |
| CN | 110615223 | A | 12/2019 | |
| CN | 110834897 | A | 2/2020 | |
| CN | 210213653 | U | 3/2020 | |
| CN | 110949923 | A | 4/2020 | |
| CN | 111137610 | A | 5/2020 | |
| CN | 111348361 | A | 6/2020 | |
| CN | 111348362 | A | 6/2020 | |
| DE | 202019005946 | U1 * | 10/2023 | ............ B25J 11/00 |
| EP | 3032460 | A1 | 6/2016 | |
| EP | 3904238 | A1 | 11/2021 | |
| JP | H1179321 | A | 3/1999 | |
| JP | 2002068410 | A | 3/2002 | |
| JP | 2007197134 | A | 8/2007 | |
| JP | 2016124036 | A | 7/2016 | |
| JP | 6428367 | B2 * | 11/2018 | ............ B65G 1/04 |
| KR | 101677497 | B1 | 11/2016 | |
| WO | WO2019011276 | A1 | 1/2019 | |

OTHER PUBLICATIONS

K. Komada, A. Sugahara, H. Nakamoto, A. Ogawa and Y. Hatanaka, "Mobilw Picking-Robot having wide reach area for shelves," 2019 IEEE/SICE International Symposium in System Integration (SII), Pariss, France, 2019, pp. 210-215, doi: 10.1109/SII.2019.8700409, XP033543250.
First Office Action of CN202010069012.5.
First Office Action of EP20872357.7.
Rejection decision of CN202010069012.5 issued on Jan. 26, 2025.
Automated Three-Dimensional Warehouse: A Complete Guide, published on Nov. 30, 2010, authored by Jingyun Huang, China Materials Publishing House, p. 87, involving Claims 1-37. With English Translation.

* cited by examiner

CONTROL METHOD FOR GOODS RETRIEVEMENT AND STORAGE, APPARATUS, CARRYING APPARATUS, AND TRANSPORT ROBOT

CROSS-REFERENCE TO RELATED APPLICATIONS

This application is a continuation under 35 U.S.C. § 120 of international patent application No. PCT/CN2020/119651 filed on Sep. 30, 2020, which claims priority to Chinese Patent Application No. 202010068990.8 filed on Jan. 21, 2020, Chinese Patent Application No. 202010069012.5 filed on Jan. 21, 2020, Chinese Utility Model Patent Application No. 202020141209.0 filed on Jan. 21, 2020, Chinese Utility Model Patent Application No. 202020142100.9 filed on Jan. 21, 2020, and Chinese Utility Model Patent Application No. 201921662771.1 filed on Sep. 30, 2019, which are incorporated herein by reference in their entireties.

TECHNICAL FIELD

The present disclosure relates to the technical field of intelligent storage, and in particular, to a control method for goods retrievement and storage, an apparatus, a carrying apparatus, and a transport robot.

BACKGROUND

Intelligent storage is a step in the logistics process. The application of intelligent storage ensures the speed and accuracy of data input in all steps of warehouse management, so as to ensure that enterprises can grasp the real data of the inventory timely and accurately, and properly maintain and control the enterprise inventory. In this way, batches and shelf life of warehouse goods can be conveniently managed by means of scientific coding. By using the storage location management function of the SNHGES system, current locations of all warehouse goods can be grasped more timely, which is conducive to improving the efficiency of warehouse management.

The transport robot plays an important role in the intelligent warehousing. The transport robot replaces the manual transfer of goods, but the existing transport robot needs to label the container in advance before retrieving the container from the shelving unit, such as a two-dimensional code, a radio frequency identification tag, and the like. The transport robot determines, by using the label attached to the container, an orientation of the container, but the process of labeling the container is very tedious.

SUMMARY

Embodiments of the present disclosure provide a control method for goods retrievement and storage, a control apparatus, and a transport robot. In this way, a tedious labeling process is avoided, and the operation efficiency of the transport robot is improved.

According to a first aspect, the present disclosure provides a control method for goods retrievement, applicable to a transport robot. The transport robot is provided with a carrying apparatus configured to take out goods. The method includes:

receiving a retrieval instruction, and acquiring locating information of target goods according to the retrieval instruction;

moving, a transport robot to a target position according to the locating information;

obtaining status information of the target goods and/or position relationship information between the carrying apparatus and the target goods, where the status information of the target goods includes size information of the target goods and/or posture information of the target goods; and adjusting a position and posture of the carrying apparatus according to the status information and/or the position relationship information, and causing the carrying apparatus to take out the target goods.

According to a second aspect, the present disclosure provides a control method for goods storage, applicable to a transport robot. The transport robot is provided with a carrying apparatus configured to take out goods. The method includes:

receiving a storage instruction, and obtaining locating information of target goods according to the storage instruction;

moving a transport robot to a target position according to the locating information;

causing the transport robot to collect three-dimensional imaging information based on the target position;

determining, according to the three-dimensional imaging information, whether a container exists on a shelving unit; and causing, the carrying apparatus to place the target goods on the shelving unit if no container exists.

According to a third aspect, the present disclosure provides a control apparatus, including:

at least one processor; and a memory, communicatively connected to the at least one processor, the memory storing executable code, the executable code, when executed by the at least one processor, causing the at least one processor to perform the methods in the first aspect and the second aspect.

According to a fourth aspect, the present disclosure provides a transport robot. The transport robot includes a mobile chassis, a carrying apparatus, a storage shelving rack, a lifting assembly, and the control apparatus in the third aspect. The storage shelving rack is mounted to the mobile chassis and is provided with a plurality of storage trays distributed along a vertical direction. Each of the storage trays is configured to place goods. The carrying apparatus is configured to transfer the goods between a stationary shelving unit and any of the storage trays, and the lifting assembly is configured to drive the carrying apparatus to move along the vertical direction, to cause the carrying apparatus to be raised or lowered to a height corresponding to the storage tray or a height of the stationary shelving unit. When the carrying apparatus is raised or lowered to the height corresponding to the storage tray, the carrying apparatus moves the goods to the corresponding storage tray along a transfer direction, or the carrying apparatus moves the goods located on the corresponding storage tray out along the transfer direction. When the carrying apparatus is raised or lowered to the height corresponding to the stationary shelving unit, the carrying apparatus moves the goods to the corresponding stationary shelving unit along the transfer direction, or the carrying apparatus moves the goods located on the corresponding stationary shelving unit out along the transfer direction.

According to a fifth aspect, the present disclosure provides a carrying apparatus, including:

a fork, configured to take out goods; and a three-dimensional imaging information acquisition module, mounted to the fork and configured to acquire three-dimensional imaging information of the goods, to determine a position of the goods.

According to a sixth aspect, the present disclosure provides a transport robot, including the carrying apparatus in the fifth aspect.

According to a seventh aspect, the present disclosure provides a control apparatus, including:

at least one processor; and a memory, communicatively connected to the at least one processor, the memory storing executable code, the executable code, when executed by the at least one processor, causing the at least one processor to perform the method in the first aspect.

According to an eighth aspect, the present disclosure provides a transport robot. The transport robot includes a mobile chassis, a carrying apparatus, a storage shelving rack, a lifting assembly, and the control apparatus in the seventh aspect. The storage shelving rack is mounted to the mobile chassis and is provided with a plurality of storage trays distributed along a vertical direction. Each of the storage trays is configured to place goods. The carrying apparatus is configured to transfer the goods between a stationary shelving unit and any of the storage trays, and the lifting assembly is configured to drive the carrying apparatus to move along the vertical direction, to cause the carrying apparatus to be raised or lowered to a height corresponding to the storage tray or a height of the stationary shelving unit. When the carrying apparatus is raised or lowered to the height corresponding to the storage tray the carrying apparatus moves the goods to the corresponding storage tray along a transfer direction, or the carrying apparatus moves the goods located on the corresponding storage tray out along the transfer direction. When the carrying apparatus is raised or lowered to the height corresponding to the stationary shelving unit, the carrying apparatus moves the goods to the corresponding stationary shelving unit along the transfer direction, or the carrying apparatus moves the goods located on the corresponding stationary shelving unit out along the transfer direction.

According to a ninth aspect, the present disclosure provides a carrying apparatus, configured to convey goods along a transfer direction, and including:

a support frame, extending along a direction perpendicular to the transfer direction in a horizontal plane;

two side arms, respectively disposed on two ends of the support frame in an extending direction, where the two side arms extend along the transfer direction, and at least one of the side arms is movably disposed on the support frame along the extending direction of the support frame; and a transverse driving assembly, drivingly connected to the at least one of the side arms and configured to drive the at least one of the side arms to move along the extending direction of the support frame, to cause the two side arms to move close to or away from each other along the extending direction of the support frame, so that the two side arms adapt to a size of the carried goods when moving close to each other along the extending direction of the support frame.

According to a tenth aspect, the present disclosure provides a transport robot. The transport robot includes a mobile chassis, a storage shelving rack, a lifting assembly, and the carrying apparatus in the ninth aspect. The storage shelving rack is mounted to the mobile chassis and is provided with a plurality of storage trays distributed along a vertical direction. Each of the storage trays is configured to place goods. The carrying apparatus is configured to transfer the goods between a stationary shelving unit and any of the storage trays, and the lifting assembly is configured to drive the carrying apparatus to move along the vertical direction, to cause the carrying apparatus to be raised or lowered to a height corresponding to the storage tray or a height of the stationary shelving unit. When the carrying apparatus is raised or lowered to the height corresponding to the storage tray, the carrying apparatus pushes the goods to the corresponding storage tray along a transfer direction, or the carrying apparatus pulls the goods located on the corresponding storage tray out along the transfer direction. When the carrying apparatus is raised or lowered to the height corresponding to the stationary shelving unit, the carrying apparatus pushes the goods to the corresponding stationary shelving unit along the transfer direction, or the carrying apparatus pulls the goods located on the corresponding stationary shelving unit out along the transfer direction.

According to the control method for goods retrievement and storage, the control apparatus, and the transport robot provided in the embodiments of the present disclosure, the position of the target goods can be accurately determined by using the obtained status information of the target goods and/or position relationship information between the carrying apparatus and the target goods, so that the target goods can be accurately retrieved. In this way, the tedious labeling process is avoided, and the operation efficiency of the transport robot is improved.

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show some embodiments of the present disclosure, and a person of ordinary skill in the art may still derive other drawings from these accompanying drawings without creative efforts.

DESCRIPTION OF REFERENCE NUMERALS

Figure 1:
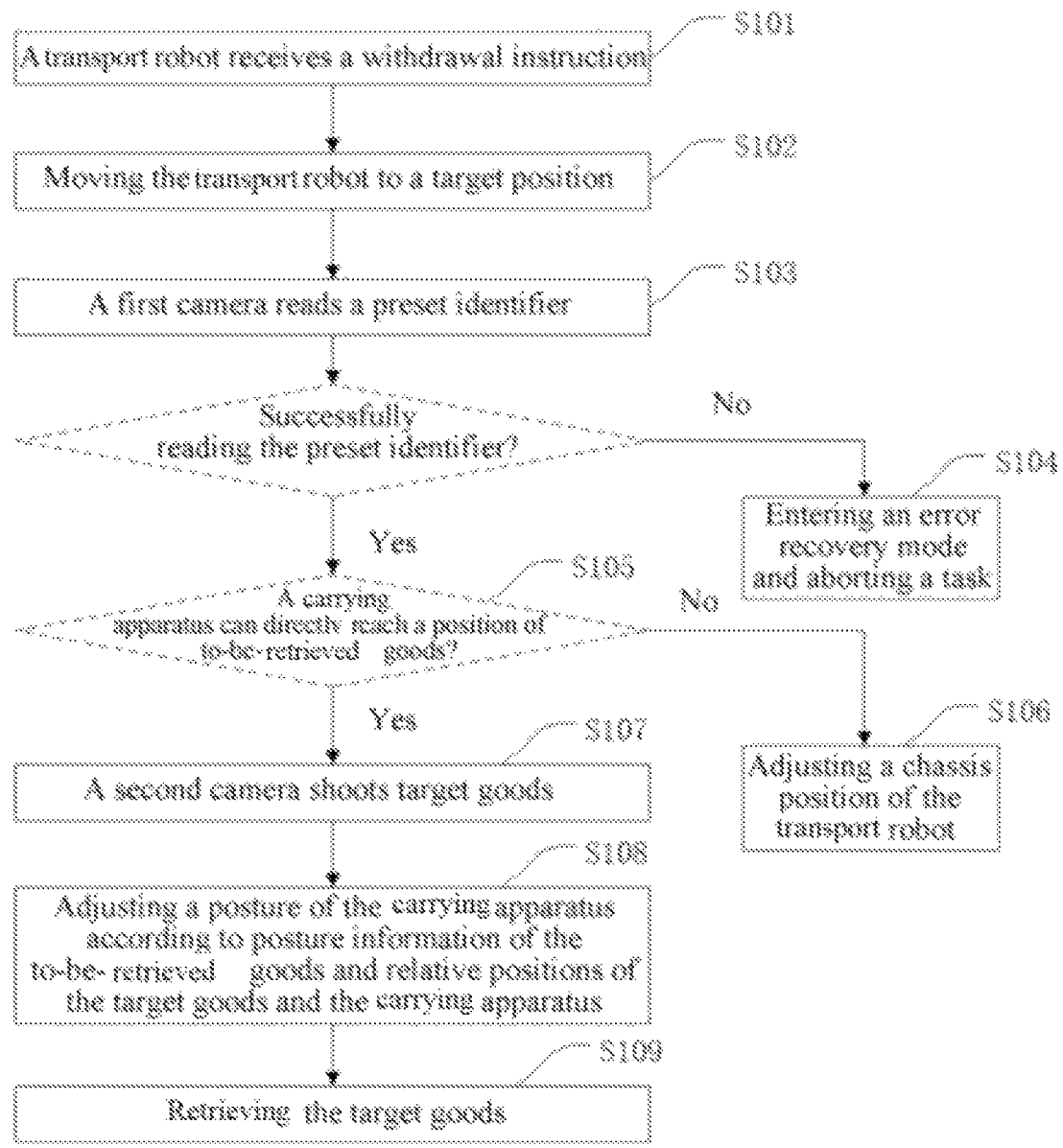
FIG. 1 is a schematic flowchart of a control method for goods retrievement according to an embodiment of the present disclosure.

10—Transport robot;
100—Carrying apparatus; 101—Goods; 102—Fork; 12—Fork support; 14—Telescopic arm; 16—Manipulator; 18—Tray; 20—Three-dimensional imaging information acquisition module; 30—Bracket; 40—Rotary driving module; 42—First chain wheel mechanism; 44—Rotary driving motor; 50—Two-dimensional image scanning module; 60—Router; 110—Support frame; 111—Transverse guide rail; 120—Side arm; 120a—Transverse fixed arm; 120b—Transverse movable arm; 120c—First movable arm; 120d—Second movable arm; 121—Outer arm section; 122—Inner arm section; 123—Pusher assembly; 1231—Fixed pusher; 1232—Movable pusher; 124—Temporary tray; 125—Middle arm section; 130—Transverse driving assembly; 131—Transverse motor; 132—Transverse traction rope; 133—Transverse driving wheel; 134—Transverse transmission shaft; 135—First connecting block; 136—Second connecting block; 140—Bracket; 150—Rotary driving assembly; 151—Chain wheel transmission structure; 152—Rotary motor; 160—Arm section driving assembly; 161—Arm section motor, 162—Arm section transmission shaft; 163—Arm section chain wheel structure;
200—Mobile chassis;
300—Storage shelving rack; 310—Storage tray;
400—Lifting assembly;
500—Control apparatus; 510—Memory; 520—Processor.

DETAILED DESCRIPTION

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are merely some embodiments of the present disclosure rather than all of the embodiments. All other embodiments obtained by a person of ordinary skill in the art based on the embodiments of the present disclosure without creative efforts shall fall within the protection scope of the present disclosure.

The terms used in this disclosure are merely for the purpose of describing specific embodiments, and are not intended to limit this disclosure. The terms "a", "said" and "the" of singular forms used in this disclosure and the appended claims are also intended to include plural forms, unless otherwise specified in the context clearly. It should be further understood that the term "and/or" used herein indicates and includes any or all possible combinations of one or more associated listed items.

It should be understood that although the terms such as first, second, and third may be used herein to describe various information, such information should not be limited to these terms. These terms are merely used to distinguish between information of the same type. For example, within the scope of this disclosure, first information may also be referred to as second information, and similarly, second information may also be referred to as first information. Therefore, a feature defined by "first" or "second" can explicitly or implicitly includes one or more features. In the description of the present disclosure, the meaning of "plurality" is two or more unless specifically defined otherwise.

The present disclosure provides a control method for goods retrievement and storage, a control apparatus, and a transport robot. In this way, a tedious labeling process is avoided, and the operation efficiency is improved.

The following describes in detail the technical solutions provided in the embodiments of the present disclosure with reference to the accompanying drawings.

The present disclosure provides a control method for goods retrievement which may be applicable to any transport robot provided with a carrying apparatus. The control method for goods retrievement may include the following steps.

First, a retrievement instruction is received, and locating information of target goods is acquired according to the retrievement instruction.

Specifically, the transport robot may obtain, after receiving the retrievement instruction, the locating information of the target goods by querying the locating information of the target goods themselves or locating information of a shelving unit on which the target goods are stored.

The transport robot may move the transport robot to a target position according to the locating information after obtaining the locating information of the target goods.

Then status information of the target goods and/or position relationship information between the carrying apparatus and the target goods are/is obtained. The status information of the target goods includes at least one piece of size information of the target goods or posture information of the target goods.

Finally, the transport robot adjusts a position and posture of the carrying apparatus according to the status information and/or the position relationship information, and causes the carrying apparatus to take out the target goods.

In the present disclosure, the position of the target goods can be accurately determined by using the obtained status information of the target goods and/or position relationship information between the carrying apparatus and the target goods, so that the target goods can be accurately retrieved. In this way, the tedious labeling process is avoided, and the operation efficiency of the transport robot is improved.

In the present disclosure, the status information of the target goods may be the posture information of the target goods and/or the size information of the target goods. Different forms of status information respectively correspond to different acquisition methods.

A retrievement method in which the status information of the target goods is used as the posture information of the target goods is described below.

FIG. 1 is a schematic flowchart of a control method for goods retrievement according to an exemplary embodiment of the present disclosure. The method may be applicable to any transport robot provided with a carrying apparatus. Referring to FIG. 1, the method includes the following steps.

S101: The transport robot receives a retrievement instruction and obtains locating information of target goods.

The locating information of the target goods may be the locating information of the target goods themselves, or may be locating information of a shelving unit on which the target goods are stored.

In some embodiments, the retrievement instruction may include identifier information of the target goods or the shelving unit on which the target goods are stored. The transport robot may obtain the locating information of the target goods by querying the identifier information after receiving the retrievement instruction.

In some embodiments, the retrievement instruction may include the locating information of the target goods, and the transport robot may directly obtain the locating information of the target goods from the retrievement instruction.

In some embodiments, the locating information of the target goods includes plane position information, direction information, height information, and/or the like. The plane position information may be, for example, a coordinate value on a horizontal plane, a row number and a column number in a warehouse, or the like. The direction information may be, for example, a transfer direction of the target goods. The height information may be, for example, a layer-number of shelving unit, a coordinate value in a height direction, or the like.

S102: Moving the transport robot to a target position according to the locating information of the target goods.

In some embodiments, the locating information of the target goods includes plane position information and height information. The moving the transport robot to a target position includes: moving the transport robot to a position corresponding to the plane position information; and raising or lowering the carrying apparatus to a height corresponding to the height information.

In some embodiments, the moving the transport: robot to a target position further includes: rotating the carrying apparatus to the transfer direction of the target goods. If the carrying apparatus can carry the goods only in one direction, the carrying apparatus is required to be rotated to the transfer direction of the goods.

In some embodiments, the chassis of the transport robot may be moved to the target position, and then the carrying apparatus is raised or lowered to a target height and/or rotated to a target direction.

In some other embodiments, the chassis of the transport robot may also be moved to the target position, and the carrying apparatus is raised or lowered to the target height and/or rotated to the target direction during the movement of the chassis of the transport robot.

S103: Causing a first camera of the transport robot to attempt to read a preset identifier.

In some embodiments, the first camera is disposed on the carrying apparatus and is a two-dimensional camera (also referred to as a two-dimensional image scanning module). Before the two-dimensional camera reads the preset identifier, the transport robot first turns on a lighting device to provide a light source for the two-dimensional camera. The lighting device may be disposed on the carrying apparatus or at other suitable positions.

In some embodiments, the preset identifier is an identifier of the shelving unit on which the target goods are stored. In some other embodiments, the preset identifier is a goods identifier on the target goods. The preset identifier may be a two-dimensional code or any other identifier that can be shot and read by the first camera, for example, a graphic code.

S104: Entering an error recovery mode and aborting, a task if the first camera cannot read the preset identifier.

In some embodiments, if the first camera fails to read the preset identifier for the first time, the transport robot repeatedly lifts the carrying apparatus by a preset range, and causes the first camera to read the preset identifier again during the lifting of the carrying apparatus. If a number of failures of reading the preset identifier by the first camera exceeds a preset threshold, the error recovery mode is entered, the transport robot reports a result to a server, and the lighting device is turned off.

S105: Determining, based on a position relationship between the transport robot and the preset identifier, whether the carrying apparatus may directly reach the position of the target goods from a current position of the transport robot if the first camera successfully reads the preset identifier.

In some embodiments, when the first camera reads the preset identifier, it is further checked whether the preset identifier has a code lost or is pasted upside down. If the preset identifier has a code lost or is pasted upside down, a reset mode is entered, and a result is reported to the server to notify the staff to make corrections.

In some embodiments, the determining whether the carrying apparatus may directly reach the position of the target goods from a current position of the transport robot may include: determining whether the chassis of the transport robot is within a preset range of the preset identifier. If the chassis of the transport robot is beyond the preset range, it indicates that the carrying apparatus cannot directly reach the position of the target goods from the current position of the transport robot, and a chassis position of the transport robot is required to be adjusted.

S106: Adjusting the chassis position of the transport robot, and performing S103 to read the preset identifier again, if it is determined that the carrying apparatus cannot directly reach the target goods from the current position of the transport robot.

S107: Shooting the target goods by using a second camera of the transport robot, to obtain posture information of the target goods and relative position information of the target goods and the carrying apparatus, if it is determined that the carrying apparatus may directly reach the target goods from the current position of the transport robot.

Three-dimensional imaging information of the target goods may be obtained by using the second camera of the transport robot to shoot the target goods, and the posture information of the target goods and the relative position information of the target goods and the carrying apparatus may be obtained by processing the three-dimensional imaging information.

In some embodiments, the posture information of the target goods includes at least one piece of the following: the size information of the target goods or an orientation of the target goods. The size information of the target goods includes width information. In some embodiments, for example, in a case that a spacing between adjacent layers of the shelving unit is fixed, the size information of the target goods may not include height information, which is understandably not limited in the present disclosure. In some embodiments, the size information of the target goods may include the size information (also referred to as depth information) of the target goods in a taken-out direction. In some embodiments, for example, in a case that the second camera is a depth-of-field camera, the size information of the target goods may not include the depth information of the target goods.

In some embodiments, the position relationship information between the carrying apparatus and the target goods includes at least one of the following: a deviation between the carrying apparatus and the target goods in a traveling direction of the carrying apparatus, a relative distance in the taken-out direction of the carrying apparatus, and an angle at which the target goods are placed relative to the carrying apparatus.

In some embodiments, the second camera is disposed on the carrying apparatus and is a three-dimensional camera (also referred to as a three-dimensional imaging information acquisition module), such as a depth camera, a panoramic camera, and the like.

In some embodiments, the second camera is a camera composed of two two-dimensional cameras, or other devices capable of collecting three-dimensional imaging information. For example, in a specific implementation, a three-dimensional imaging device using a time-of-flight method may be adopted. Such a device can detect a flight (a round-trip) time of the light pulse by transmitting the light pulse to a target and receiving the light returning from an object by using a sensor, to obtain a distance between the target and the object.

In some embodiments, after it is determined that the carrying apparatus may directly reach the target goods from the current position of the transport robot, it is determined, based on shooting information of the second camera, whether goods exist at a corresponding position of the target goods. If it is determined that goods exist at the position of the target goods, it is further determined whether the size of the goods is within a size range that the carrying apparatus can take out. If it is determined that no goods exist at the corresponding position of the target goods or the size of the goods exceeds the size range that the carrying apparatus can take out, the reset mode is entered, and the result is reported to the server.

S108: Adjusting a position and posture of the carrying apparatus according to the posture information of the target goods and the relative position information of the target goods and the carrying apparatus.

In some embodiments, the adjusting a position and posture of the carrying apparatus includes: adjusting the chassis position of the transport robot, raising or lowering the carrying apparatus, and/or rotating the carrying apparatus, to align a specific position of the transport robot to a specific position of the target goods.

In some embodiments, the carrying apparatus has a first telescopic arm and a second telescopic arm, the carrying apparatus is configured to place the goods between the first telescopic arm and the second telescopic arm when retrieving the goods, and the adjusting the position and posture of the carrying apparatus includes: adjusting the chassis position of the transport robot, raising or lowering a bracket of the carrying apparatus, and/or rotating the support frame of carrying apparatus, to align the specific position (such as an intermediate position) between the first telescopic arm and the second telescopic arm to the specific position (such as a central position) of the target goods, and adjusting a spacing between the first telescopic arm and the second telescopic arm of the carrying apparatus according to the size information of the goods, to adapt to the size of the target goods.

S109: Causing the carrying apparatus to take out the target goods in the adjusted position and posture.

After the carrying apparatus adjusts the position and posture of the carrying apparatus, the carrying apparatus is extended out according to the relative position information of the target goods and the carrying apparatus, to take out the target goods.

In some embodiments, the second camera is a depth camera. The causing the carrying apparatus to take out the target goods in the adjusted position and posture includes: determining a extension depth of the carrying apparatus, and causing the first telescopic arm and the second telescopic arm to extend out by the extension depth in the adjusted position and posture, where the extension depth may be equal to a sum of the relative distance between the carrying apparatus and the target goods in the taken-out direction of the carrying apparatus and a predetermined percentage of a largest one (such as 50%) of sizes of all to-be-retrieved goods in the take-out direction; or the extension depth may be equal to a preset maximum extension size. In the case of using the depth camera, the transport robot may acquire the relative distance between the carrying apparatus and the target goods in the taken-out direction of the carrying apparatus, but may not be able to acquire the depth information of the target goods. In this case, the extension depth of the carrying apparatus may be determined by using the largest one of the sizes of the to-be-retrieved goods in the take-out direction or the preset maximum extension size.

In some embodiments, after the transport robot adjusts the position and posture of the carrying apparatus, and before the carrying apparatus is extended to take out the goods, it is determined whether the carrying apparatus will collide with the shelving unit when being extended out. By using the step, the carrying apparatus or the goods may be prevented from being damaged as a result of the carrying apparatus colliding with the shelving unit after being extended out. If it is determined that the carrying apparatus will collide with the shelving unit after being extended out, the error recovery mode is entered to reset the carrying apparatus, and S107 is performed again to readjust the position and posture of the carrying apparatus. If it is still determined, after the readjustment, that the carrying apparatus will collide with the shelving unit after being extended out, the result is reported to the server, and the task is suspended.

In some embodiments, the carrying apparatus is raised or lowered to read the shelving unit identifier, so as to learn relative positions of the carrying apparatus and the shelving unit and determine whether the carrying apparatus will collide with the shelving unit after being extended out. The shelving unit identifier may be located above or below the target goods. If the shelving unit identifier is above the goods, the carrying apparatus is raised to read the shelving unit identifier, or otherwise, the carrying apparatus is lowered to read the identifier on the shelving unit. The shelving unit identifier may be, for example, shot and read by the first camera.

In the above embodiment, the two-dimensional camera is used to shoot the preset identifier such as the goods identifier, the shelving unit identifier, or the like, and the three-dimensional camera is used to shoot the target goods to obtain the three-dimensional imaging information of the goods. As an alternative, the preset identifier is set as an identifier that can be shot and read by the three-dimensional camera. In this way, in some embodiments, the transport robot may only be provided with the three-dimensional camera. That is to say, the first camera and the second camera in the above embodiments represent the same three-dimensional camera.

Figure 2:
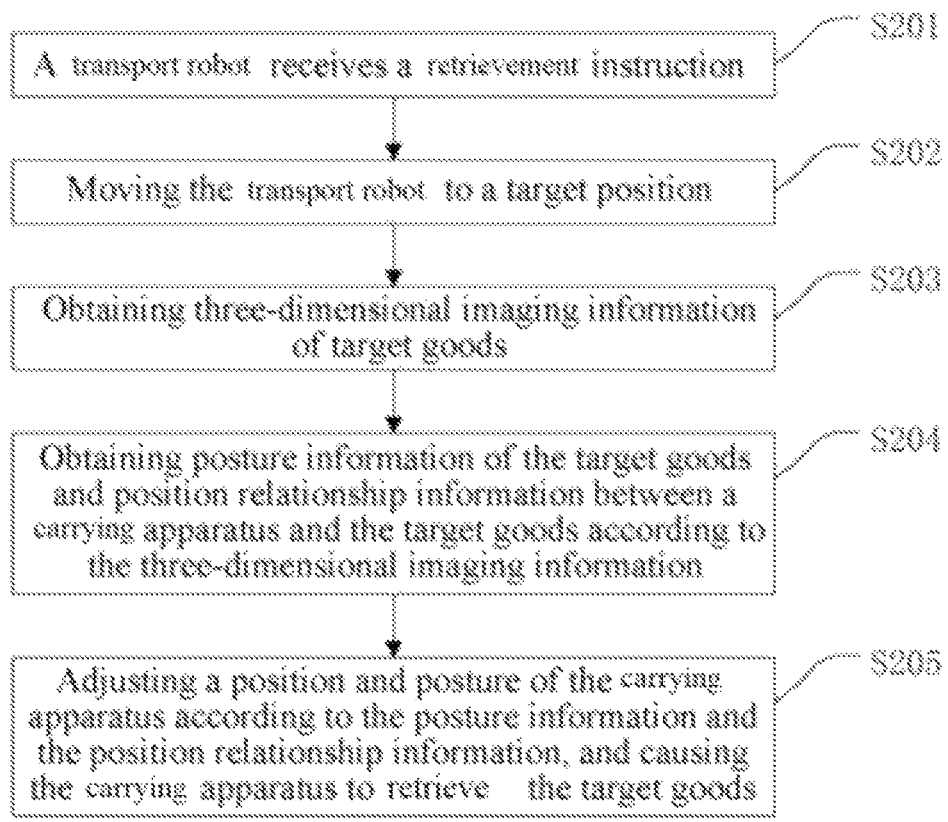
FIG. 2 is a schematic flowchart of a control method for goods retrievement according to another embodiment of the present disclosure.

FIG. 2 is a schematic flowchart of a control method for goods retrievement according to another embodiment of the present disclosure. The method is applicable to a transport robot, and the transport robot has a chassis and a carrying apparatus supported on the chassis and configured to take out goods. Referring to FIG. 2, the method includes the following steps.

S201: Receiving a retrievement instruction, and obtaining locating information of target goods according to the retrievement instruction.

S202: Moving the transport robot to a target position according to the locating information.

S203: Causing the transport robot to acquire three-dimensional imaging information of the target goods.

S204: Acquiring posture information of the target goods and position relationship information between the carrying apparatus and the target goods according to the three-dimensional imaging information.

S205: Adjusting a position and posture of the carrying apparatus according to the position relationship information and the posture information, and causing the carrying apparatus to take out the target goods in the adjusted position and posture.

It may be understood that, in some embodiments, only the posture information of the target goods may be acquired, or only the position relationship information between the carrying apparatus and the target goods may be acquired. The position and posture of the carrying apparatus is adjusted according to the position relationship information or the posture information, and the carrying apparatus is caused to take out the target goods in the adjusted position and posture.

In some embodiments, the posture information of the target goods includes size information of the target goods. The position relationship information between the carrying apparatus and the target goods includes: a deviation between the carrying apparatus and the target goods in a traveling direction of the carrying, apparatus, a relative distance between the carrying apparatus and the target goods in the taken-out direction of the carrying apparatus, and/or an angle at which the target goods are placed relative to the carrying apparatus.

In some embodiments, the carrying apparatus is provided with a sensing apparatus. The causing the transport robot to acquire posture information of the target goods and position relationship information between the carrying apparatus and the target goods includes: obtaining the posture information of the target goods and the position relationship information between the carrying apparatus and the target goods based on an operation of the sensing apparatus on the target goods.

In some embodiments, the sensing apparatus includes a three-dimensional camera.

In some embodiments, the three-dimensional camera includes a depth-of-field camera. The carrying apparatus has telescopic arms, and the causing the carrying apparatus to take out the target goods in the adjusted position and posture includes: determining an extension depth of the carrying apparatus; and causing, each of the telescopic arms to extend out by the extension depth in the adjusted position and posture. The extension depth is equal to a sum of the relative distance between the carrying apparatus and the target goods in the taken-out direction of the carrying apparatus and a predetermined percentage of a largest one of sizes of all to-be-retrieved goods in the taken-out direction. Alternatively, the extension depth is equal to a preset maximum extension size.

In some embodiments, the adjusting a position and posture of the carrying apparatus according to the position relationship information and the posture information includes: aligning a specific position of the transport robot to a specific position of the target goods by performing, at least one of the following: driving the chassis of the transport robot, raising or lowering the carrying apparatus, or rotating the carrying apparatus.

In some embodiments, the carrying apparatus has a pair of telescopic arms, and the adjusting the position and posture of the carrying apparatus further includes: adjusting a spacing between the pair of telescopic arms to adapt to a size of the target goods.

In some embodiments, the posture information includes the size information of the target goods. Before the adjusting the position and posture of the carrying apparatus according to the position relationship information and the posture information, the method includes: determining whether the target goods exist; and determining whether a size of the target goods is within a size range that the carrying apparatus can take out if the target goods exist.

In some embodiments, before the causing the carrying apparatus to take out the target goods in the adjusted position and posture, the method includes: determining whether the carrying apparatus will collide with a shelving unit when retrieving the goods.

In some embodiments, the moving the transport robot to a target position includes: moving the chassis of the transport robot to the target position, and then raising or lowering the carrying apparatus to a target shelving unit height and/or rotating the carrying apparatus to a target direction; or moving the chassis of the transport robot to the target position, and raising or lowering the carrying apparatus to a target height and/or rotating the carrying apparatus to a target direction during the movement of the chassis of the transport robot.

In the above embodiments, the goods are retrieved from the stationary shelving unit by way of example for description. It may be understood that those skilled in the art can obtain the process of retrieving the goods from the storage shelving rack from the above embodiments, and the details will not be described again in the present disclosure.

Figure 3:
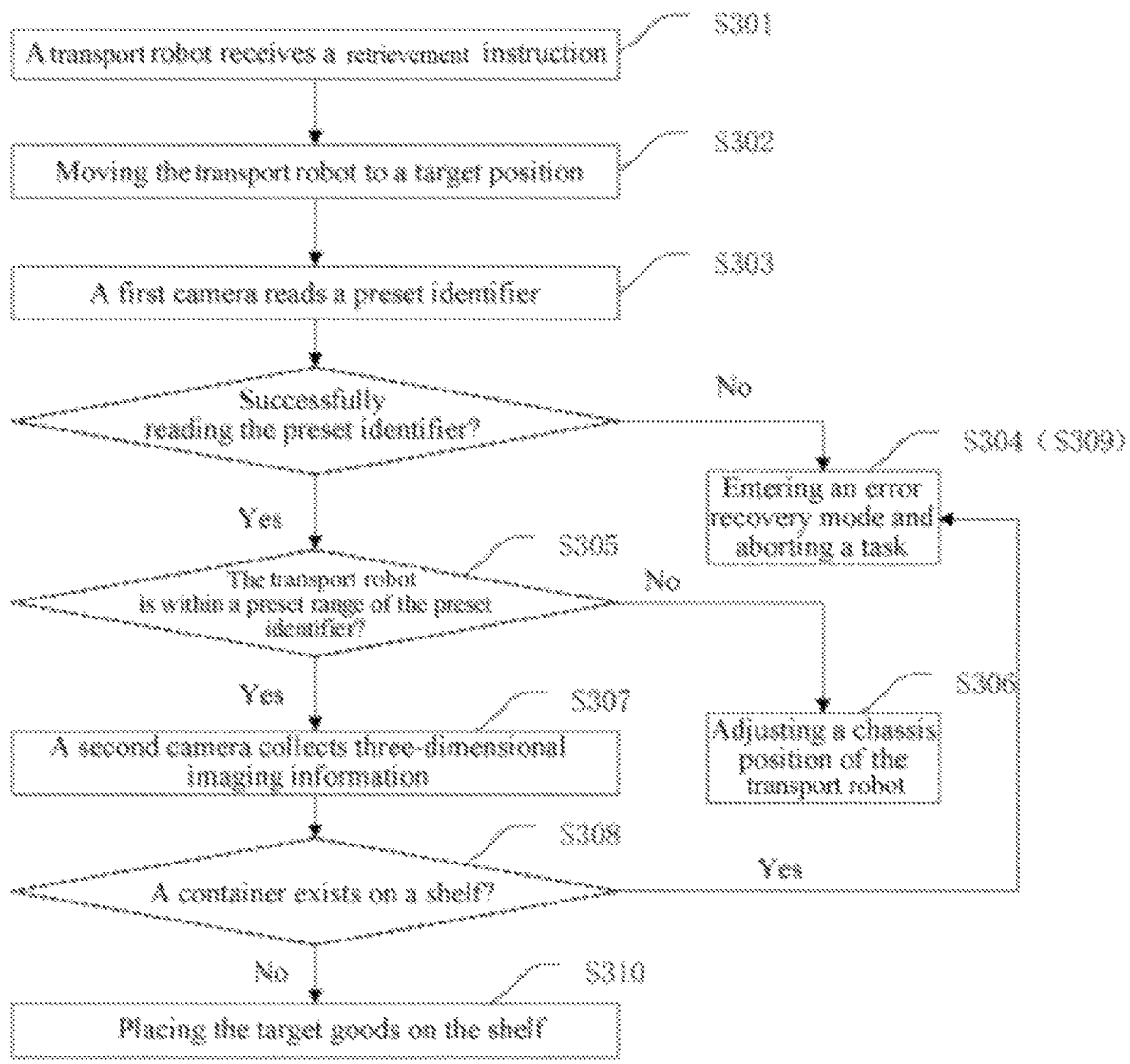
FIG. 3 is a schematic flowchart of a control method for goods storage according to an embodiment of the present disclosure.

FIG. 3 is a schematic flowchart of a control method for goods storage according to an embodiment of the present disclosure. The method is applicable to a transport robot, and the transport robot is provided with a carrying apparatus. Referring to FIG. 3, the method includes the following steps.

S301: The transport robot receives a storage instruction and obtains locating information of target goods.

The locating information of the target goods may be the locating information of the target goods themselves, or may be locating information of a shelving unit on which the target goods are stored.

In some embodiments, the storage instruction may include identifier information of the target goods or the shelving unit on which the target goods are stored. The transport robot may obtain the locating information of the target goods by querying the identifier information after receiving the storage instruction.

In some embodiments, the storage instruction may include the locating information of the target goods, and the transport robot may directly obtain the locating information of the target goods from the storage instruction.

In some embodiments, the locating information of the target goods includes plane position information, direction information, height information, and/or the like. The plane position information may be, for example, a coordinate value on a horizontal plane, a row number and a column number in a warehouse, or the like. The direction information may be, for example, a transfer direction of the target goods. The height information may be, for example, a layer-number of shelving unit, a coordinate value in a height direction, or the like.

S302: Moving the transport robot to a target position according to the locating information of the target goods.

In some embodiments, the locating information of the target goods includes plane position information and height information. The moving the transport robot to a target position includes: moving the transport robot to a position corresponding to the plane position information; and raising or lowering the carrying apparatus to a height corresponding to the height information.

In some embodiments, the moving the transport robot to a target position further includes: rotating the carrying apparatus to the transfer direction of the target goods. If the carrying apparatus can carry the goods only in one direction, the carrying apparatus is required to be rotated to the transfer direction of the goods.

In some embodiments, the chassis of the transport robot may be moved to the target position, and then the carrying apparatus is raised or lowered to a target height and/or rotated to a target direction.

In some other embodiments, the chassis of the transport robot may also be moved to the target position, and the carrying apparatus is raised or lowered to the target height and/or rotated to the target direction during the movement of the chassis of the transport robot.

S303: Causing a first camera of the transport robot to attempt to read a preset identifier.

In some embodiments, the first camera is disposed on the carrying apparatus, and before the two-dimensional camera reads the preset identifier, the transport robot first turns on a lighting device to provide a light source for the two-dimensional camera. The lighting device may be disposed on the carrying apparatus or at other suitable positions.

In some embodiments, the preset identifier is an identifier of the shelving unit on which the target goods are stored. In some other embodiments, the preset identifier is a goods identifier on the target goods. The preset identifier may be a two-dimensional code or any other identifier that can be shot and read by the first camera.

S304: Entering an error recovery mode and aborting a task if the first camera cannot read the preset identifier.

In some embodiments, if the first camera fails to read the preset identifier for the first time, the transport robot repeatedly lifts the carrying apparatus by a preset range, and causes the first camera to read the preset identifier again during the lifting of the carrying apparatus. If a number of failures of reading the preset identifier by the first camera exceeds a preset threshold, the error recovery mode is entered, the transport robot reports a result to a server, and the lighting device is turned off.

S305: Determining, based on a position relationship between the transport robot and the preset identifier, whether the transport robot is within a preset range of the preset identifier if the first camera successfully reads the preset identifier.

In some embodiments, when the first camera reads the preset identifier, it is further checked whether the preset identifier has a code lost or is pasted upside down. If the preset identifier has a code lost or is pasted upside down, a reset mode is entered, and a result is reported to the server to notify the staff to make corrections.

S306: Adjusting a chassis position of the transport robot, and performing S303 to read the preset identifier again if it is determined that the transport robot is not within the preset range of the preset identifier.

S307: Raising the carrying apparatus and collecting three-dimensional imaging information by using a second camera if it is determined that the transport robot is within the preset range of the preset identifier.

The second camera is disposed on the carrying apparatus, and the purpose of raising the carrying apparatus is to raise the second camera to a corresponding position. That is to say, the second camera is caused to be aligned to the position where the target goods are to be placed, and then the three-dimensional imaging information is collected by aligning the second camera to the position.

In some embodiments, the second camera is a three-dimensional camera such as a depth camera, a panoramic camera, and the like.

In some embodiments, the second camera is a camera composed of two two-dimensional cameras, or other devices capable of collecting three-dimensional imaging information.

S308: Determining, based on the collected three-dimensional imaging information, whether a container exists on the shelving unit.

In some embodiments, if the container exists on the shelving unit, the collected three-dimensional imaging information includes image information of the container and corresponding point cloud data, and if no container exists on the shelving unit, the collected three-dimensional imaging information does not include the image information of the container and the corresponding point cloud data.

S309: Entering the error recovery mode and aborting the task if the container exists.

In some embodiments, if the collected three-dimensional imaging information includes image information of the container or the point cloud data corresponding to the container, it is determined that the container exists, the error recovery mode is entered, and the transport robot reports the result to the server.

S310: Lowering the carrying apparatus to place target goods on the shelving unit if no container exists.

In some embodiments, if the collected three-dimensional imaging information does not include the image information of the container or the point cloud data corresponding to the container, it is determined that no container exists. The target goods may be placed on the shelving unit, and then the transport robot lowers the carrying apparatus and places the target goods on the corresponding position of the shelving unit.

In some embodiments, before the causing, the carrying apparatus to place the target goods on the shelving unit, the method further includes: determining, according to a size of the target goods, whether the target goods are suitable to be placed on the shelving unit.

In some embodiments, before the carrying apparatus is raised and the three-dimensional imaging information is collected by using the second camera, it is determined whether the carrying apparatus will collide with the shelving unit when being raised. By using the step, the carrying apparatus or the goods may be prevented from being damaged due to the collision with the shelving unit during the raising or lowering of the carrying apparatus for goods storage. If it is determined that the carrying apparatus will collide with the shelving unit after being raised the error recovery mode is entered to reset the carrying apparatus, and S307 is performed again to readjust the position and posture of the carrying apparatus. If it is still determined, after the readjustment, that the carrying apparatus will collide with the shelving unit after being extended out, the result is reported to the server, and the task is suspended.

In some embodiments, the carrying apparatus is raised or lowered to read the shelving unit identifier, so as to learn relative positions of the carrying apparatus and the shelving unit and determine whether the carrying apparatus will collide with the shelving unit. The shelving unit identifier may be located above or below the target goods. If the shelving unit identifier is above the goods, the carrying apparatus is raised to read the shelving unit identifier, or otherwise, the carrying apparatus is lowered to read the identifier on the shelving unit. The shelving unit identifier may be, for example, shot and read by the first camera.

In the above embodiment, the two-dimensional camera is used to shoot the preset identifier such as the goods identifier, the shelving unit identifier, or the like, and the three-dimensional camera is used to shoot the target goods to obtain the three-dimensional imaging information of the goods. As an alternative, the preset identifier is set as an identifier that can be shot and read by the three-dimensional camera. In this way, in some embodiments, the transport robot may only be provided with the three-dimensional camera. That is to say, the first camera and the second camera in the above embodiments represent the same three-dimensional camera.

Figure 4:
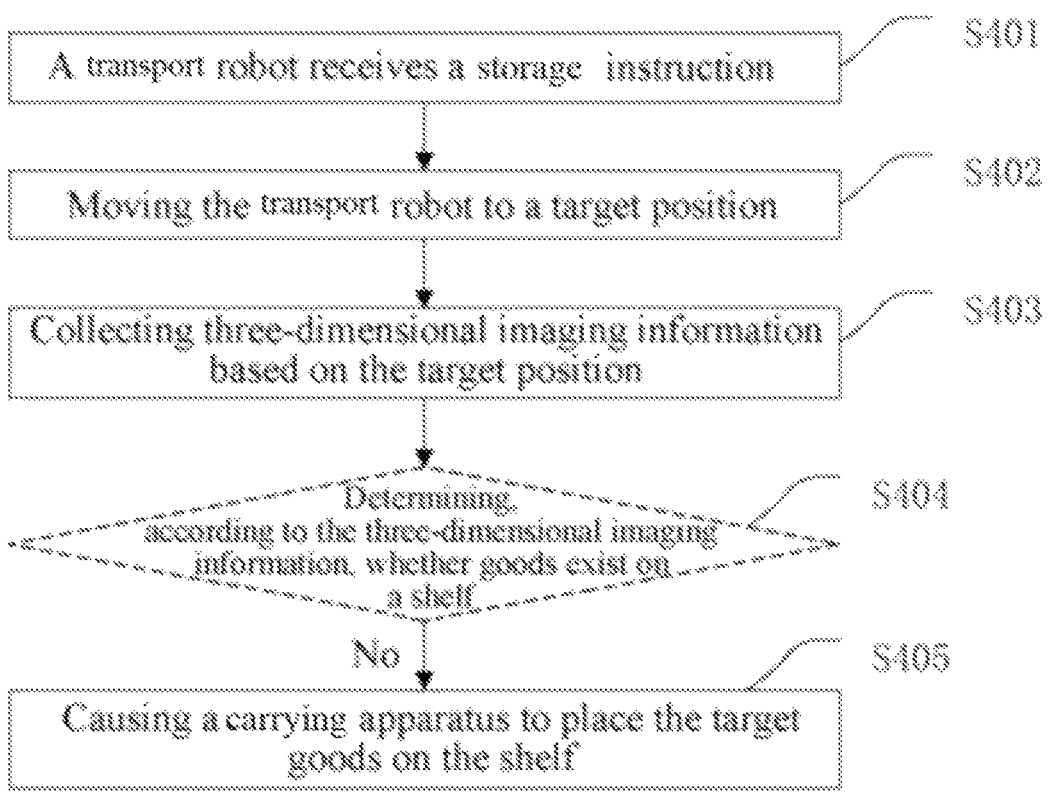
FIG. 4 is a schematic flowchart of a control method for goods storage according to another embodiment of the present disclosure.

FIG. 4 is a schematic flowchart of a control method for goods storage according to another embodiment of the present disclosure. The method is applicable to a transport robot, and the transport robot is provided with a carrying apparatus. Referring to FIG. 4, the method includes the following steps.

S401: Receiving a storage instruction, and obtaining locating information of target goods according to the storage instruction.

S402: Moving the transport robot to a target position according to the locating information.

S403: Causing the transport robot to collect three-dimensional imaging information based on the target position.

S404: Determining, according to the three-dimensional imaging information, whether a container exists on a shelving unit.

S405: Causing the carrying apparatus to place the target goods on the shelving unit if no container exists.

In some embodiments, the carrying apparatus is provided with a sensing apparatus. The causing the transport robot to collect three-dimensional imaging information based on the target position includes: causing the sensing apparatus to collect the three-dimensional imaging information based on the target position.

In some embodiments, the sensing apparatus includes a three-dimensional camera.

In some embodiments, before the causing the carrying apparatus to place the target goods on the shelving unit, the method includes: determining whether the carrying apparatus will collide with the shelving unit when placing the goods.

In some embodiments, the moving the transport robot to a target position includes: moving the chassis of the transport robot to the target position, and then raising or lowering the carrying apparatus to a target shelving unit height and/or rotating the carrying apparatus to a target direction; or moving the chassis of the transport robot to the target position, and raising or lowering the carrying, apparatus to a target height and/or rotating the carrying apparatus to a target direction during the movement of the chassis of the transport robot.

Those skilled in the art may further appreciate that the various exemplary logical blocks, modules, circuits, and algorithm steps described in connection with the disclosure herein may be implemented as electronic hardware, computer software, or a combination of the two.

Flowcharts and block diagrams in the figures show architectures, functions, and operations of possible implementations of systems and methods according to a plurality of embodiments of the present disclosure. In this regard, each block in the flowchart or the block diagram may represent a module, a program segment, or part of code. The module, the program segment, or the part of the code includes one or more executable instructions for implementing specified logical functions. It should also be noted that, in some alternative implementations, the functions marked in the blocks may also be executed out of the order marked in the figures. For example, two consecutive blocks may actually be executed in parallel, or may sometimes be executed in reverse order, which depends on the functions involved. It is also to be noted that each block of the block diagrams and/or flowcharts and combinations of blocks in the block diagrams and/or flowcharts may be implemented by dedicated hardware-based systems that execute the specified functions or operations, or may be implemented in a combination of dedicated hardware and computer instructions.

Figure 5:
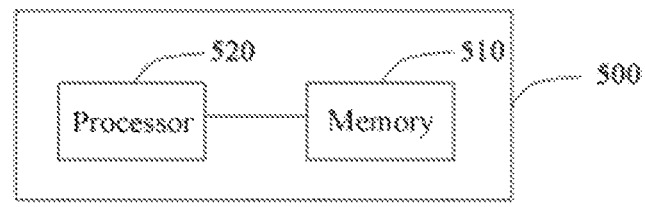
FIG. 5 is a schematic structural diagram of a control apparatus according to another embodiment of the present disclosure.

FIG. 5 is a schematic structural diagram of a control apparatus according, to another embodiment of the present disclosure. Referring to FIG. 5, an embodiment of the present disclosure further provides a control apparatus, including: at least one processor 520; and a memory 510, communicatively connected to the at least one processor 520, the memory 510 storing executable code, the executable code, when executed by the at least one processor 520, causing the at least one processor 520 to perform some or all of the methods of FIG. 1 to FIG. 4.

The processor 520 may be a central processing unit (CPU), and may further be other general-purpose processors, digital signal processors (DSPs), application-specific integrated circuits (ASICs), field-programmable gate arrays (FPGAs), or other programmable logic devices, discrete gates or transistor logic devices, discrete hardware components, and the like. The general-purpose processor may be a microprocessor, or may be any conventional processor, or the like.

The memory 510 may include various types of storage units, for example, a system memory, a read only memory (ROM), and a persistent storage apparatus. The ROM may store static data or instructions required by the processor 520 or other modules of the computer. The persistent storage apparatus may be a read-write storage apparatus. The persistent storage apparatus may be a non-volatile storage device that retains instructions and data after power to a computer is powered off. In some implementations, the persistent storage apparatus adopts a mass storage apparatus (for example, a magnetic disk or an optical disk, or a flash memory) as the persistent storage apparatus. In some other implementations, the persistent storage apparatus may be a removable storage device (for example, a floppy disk or an optical drive). The system memory may be a read-write storage device or a volatile read-write storage device, for example, a dynamic random-access memory. The system memory may store some or all of the instructions and data required for the processor during operation. In addition, the memory 510 may include any combination of computer-readable storage media, including various types of semiconductor memory chips (a DRAM, a SRAM, an SDRAM, a flash memory, and a programmable read-only memory), and the magnetic disk and/or the optical disk may also be adopted. In some implementations, the memory 510 may include a read/write removable storage device, for example, a compact disc (CD), a read-only digital versatile disc (for example, a DVD-ROM, or a dual layer DVD-ROM), a read-only Blu-ray, an ultra density optical disc, a flash memory card for example, an SD card, a mini SD card, a Micro-SD card, and the like), a magnetic floppy disk, and the like. The computer-readable storage media do not include carrier waves and transient electronic signals transmitted in a wireless or wired manner.

Figure 6:
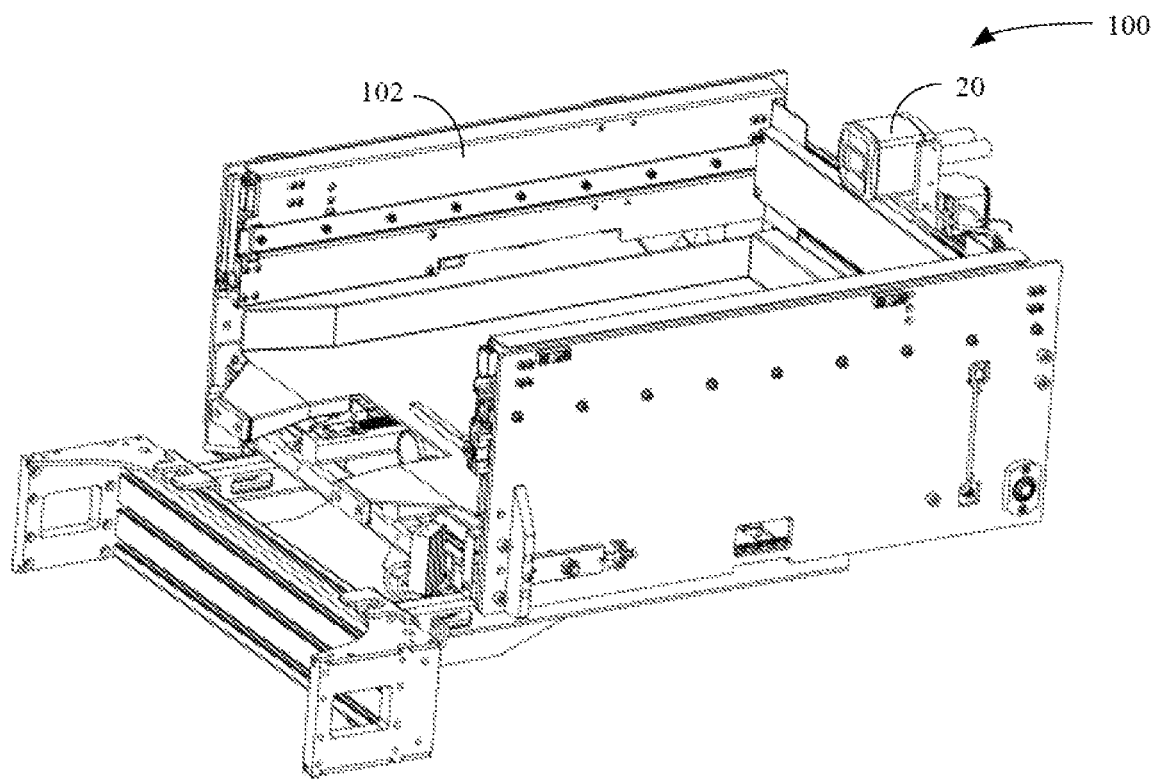
FIG. 6 is a schematic structural diagram of a carrying apparatus according to an embodiment of the present disclosure.

FIG. 6 is a schematic structural diagram of a carrying apparatus according to an embodiment of the present disclosure. Referring to FIG. 6, one embodiment of the present disclosure provides a carrying apparatus 100. The carrying apparatus 100 may be applicable to a device such as a transport robot, a shuttle vehicle, and a three-dimensional warehouse for warehousing and logistics. In this embodiment, the carrying apparatus 100 is applied to the transport robot by way of example for detailed description.

The carrying, apparatus 100 includes a fork 102 and a three-dimensional imaging information acquisition module 20. The fork 102 is configured to take out goods. The three-dimensional imaging information acquisition module 20 is mounted to the fork 102 and configured to acquire three-dimensional imaging information of the goods, to determine a position of the goods on a shelving unit. The three-dimensional imaging information acquisition module 20 may be a depth camera or a panoramic camera, or may be a combination of a plurality of cameras, as long as the three-dimensional imaging information of the goods can be acquired.

Figure 7:
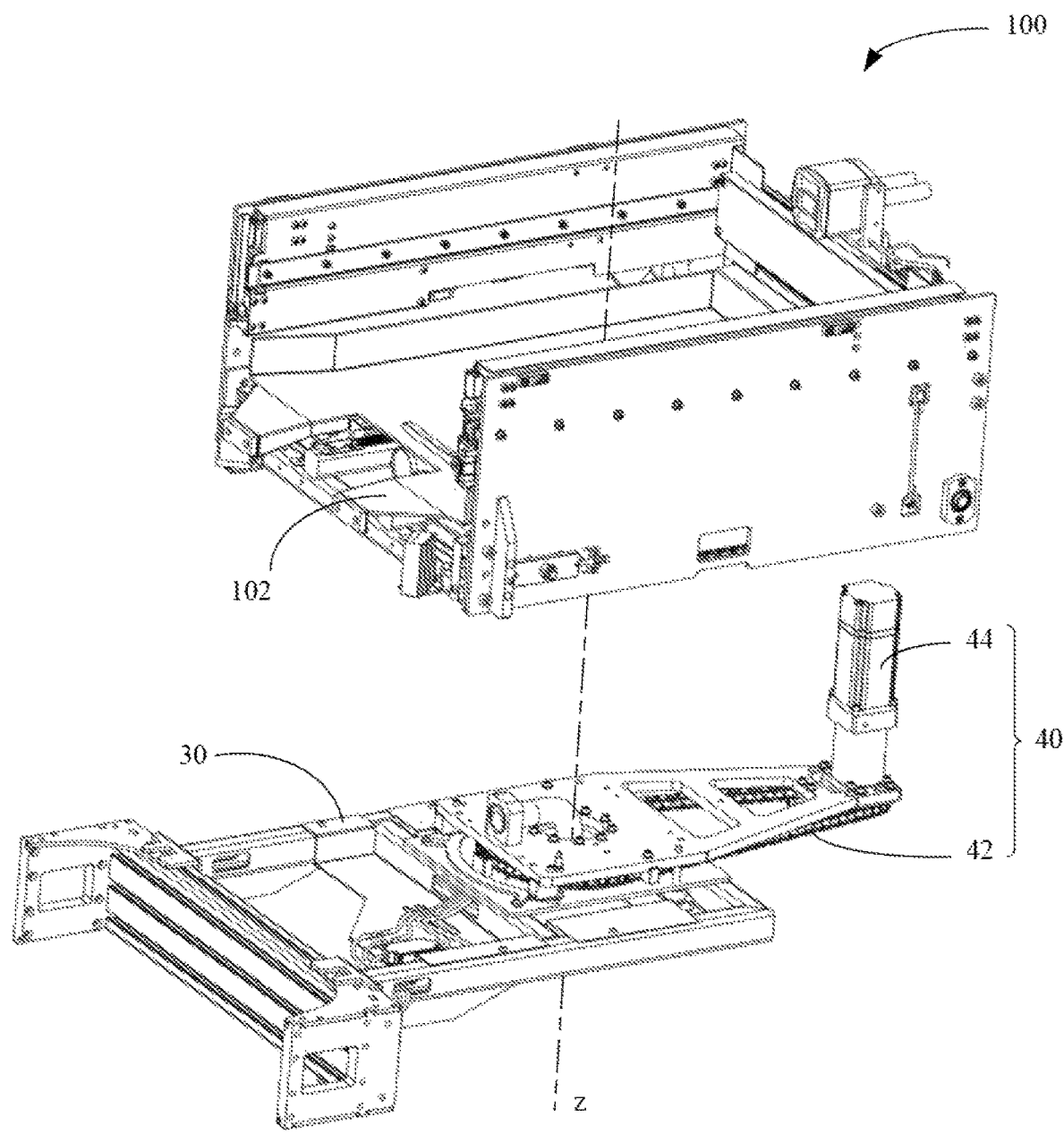
FIG. 7 is a schematic disassembly diagram of the carrying apparatus shown in FIG. 6, where a rotary driving module of the carrying apparatus is shown.

FIG. 7 is a schematic disassembly diagram of the carrying apparatus shown in FIG. 6, where a rotary driving module of the carrying apparatus is shown. Referring to FIG. 7, in some embodiments, the carrying apparatus 100 further includes a bracket 30 and a rotary driving module 40. The fork 102 is mounted to the bracket 30 and is rotatable relative to the bracket 30 along a vertical direction z. The rotary driving module 40 connects the fork 102 to the bracket 30. The rotary driving module 40 is configured to drive, according to position information of the goods, the fork 102 to rotate relative to the bracket 30 in a horizontal plane, to cause the fork 102 to rotate to a position at an angle where the goods are easily taken out, which facilitates avoidance of an obstacle, alignment of the goods, and the like.

The rotary driving module 40 may include a first chain wheel mechanism 42 and a rotary driving motor 44. The first chain wheel mechanism 42 is connected to the fork 102, and the rotary driving motor 44 is configured to drive, by using the first chain wheel mechanism 42, the fork 102 to rotate relative to the bracket 30. It may be understood that, according to an actual situation, the first chain wheel mechanism 42 may also be replaced with a gear set, or may be directly omitted, and the fork 102 is directly driven by the rotary driving motor 44 to rotate relative to the bracket 30.

Figure 8:
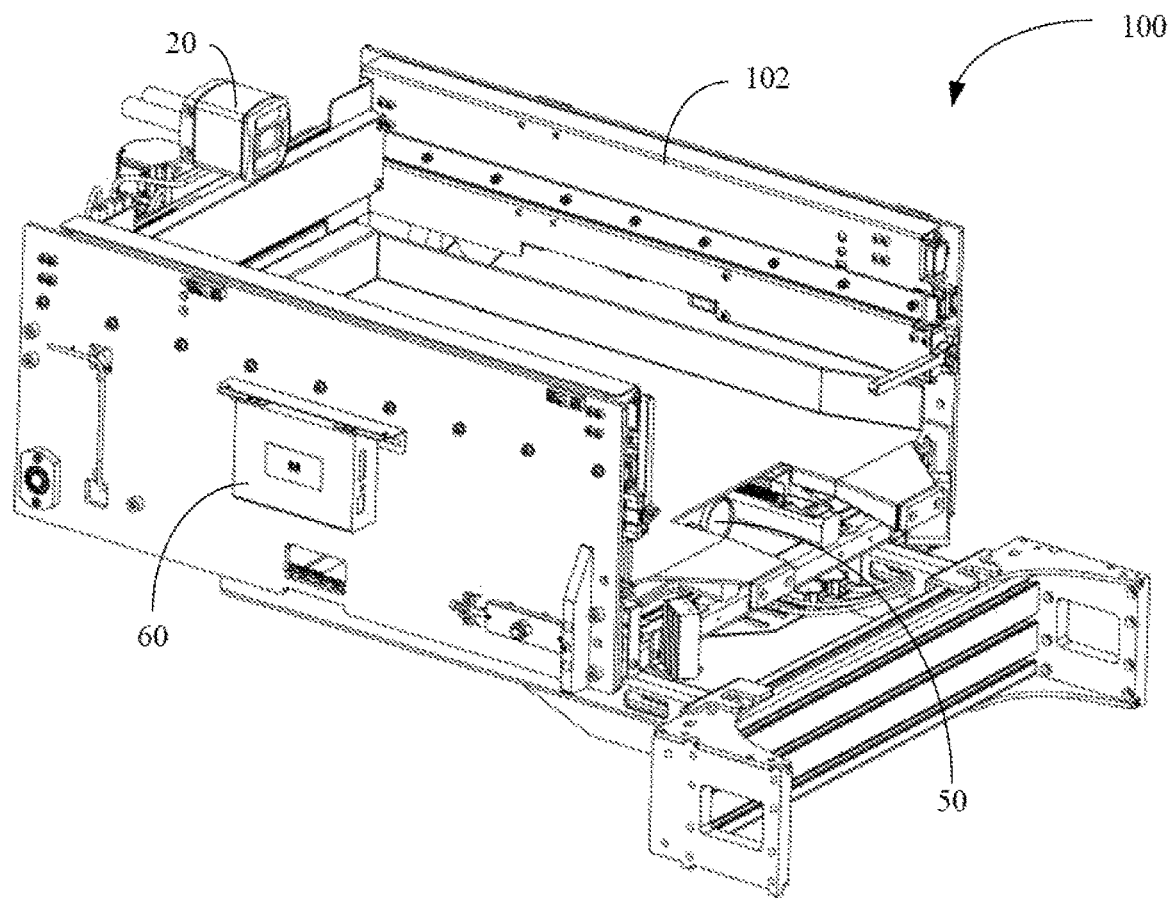
FIG. 8 is a schematic structural diagram of the carrying apparatus shown in FIG. 6 from another angle, where a router of the carrying apparatus is shown.

FIG. 8 is a schematic structural diagram of the carrying apparatus shown in FIG. 6 from another angle, where a router of the carrying apparatus is shown. Referring to FIG. 8, in some embodiments, the shelving unit is pasted with a preset identifier, such as a two-dimensional code, a barcode, and the like. The carrying apparatus 100 further includes a two-dimensional image scanning module 50. The two-dimensional image scanning module 50 is mounted to the fork 102 and configured to acquire graphic code information on the shelving unit to determine a height of the fork 102. The two-dimensional image scanning module 50 may be a camera. It may be understood that the two-dimensional image scanning module 50 may be omitted according to the actual situation. For example, the fork 102 operates at a constant height, and the height at which the fork 102 is located is not required to be determined. For another example, the fork 102 can be raised or lowered, but the height by which the fork 102 is raised or lowered is set by a preset program, and at this point, the height at which the fork 102 is located is not required to be determined either. When the three-dimensional imaging information acquisition module 20 can acquire all required information, the two-dimensional image scanning module 50 may not be disposed.

In some embodiments, the carrying apparatus 100 further includes a router 60. The router is mounted to the fork 102 and electrically connected to the three-dimensional imaging information acquisition module 20 and the two-dimensional image scanning module 50, to receive and deliver the three-dimensional imaging information and the graphic code information. It may be understood that, the router 60 may be omitted according, to the actual situation. For example, the three-dimensional imaging information acquisition module 20 and the two-dimensional image seaming module 50 are directly connected to a host by using two network cables respectively.

Figure 9:
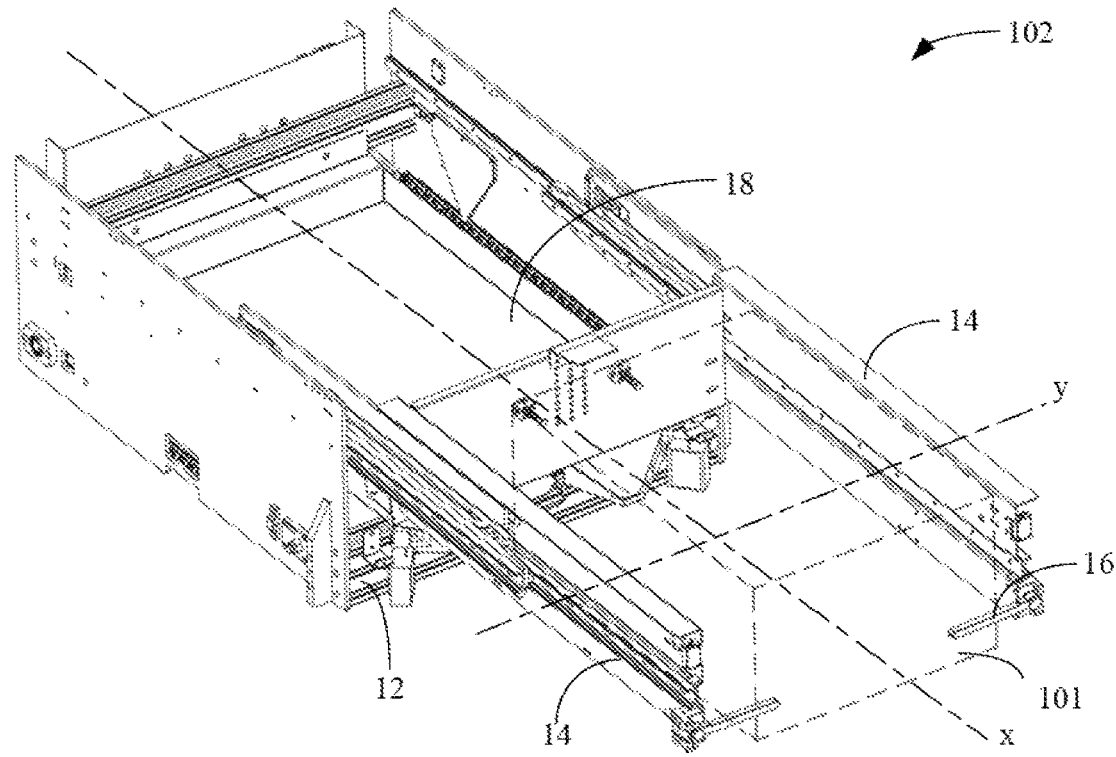
FIG. 9 is a schematic structural diagram of a fork of the carrying apparatus shown in FIG. 6 in a first state, where a manipulator of the fork is extended and has acquired goods.

FIG. 9 is a schematic structural diagram of a fork of the carrying apparatus shown in FIG. 6 in a first state, where a manipulator of the fork is extended and has acquired goods.

Figure 10:
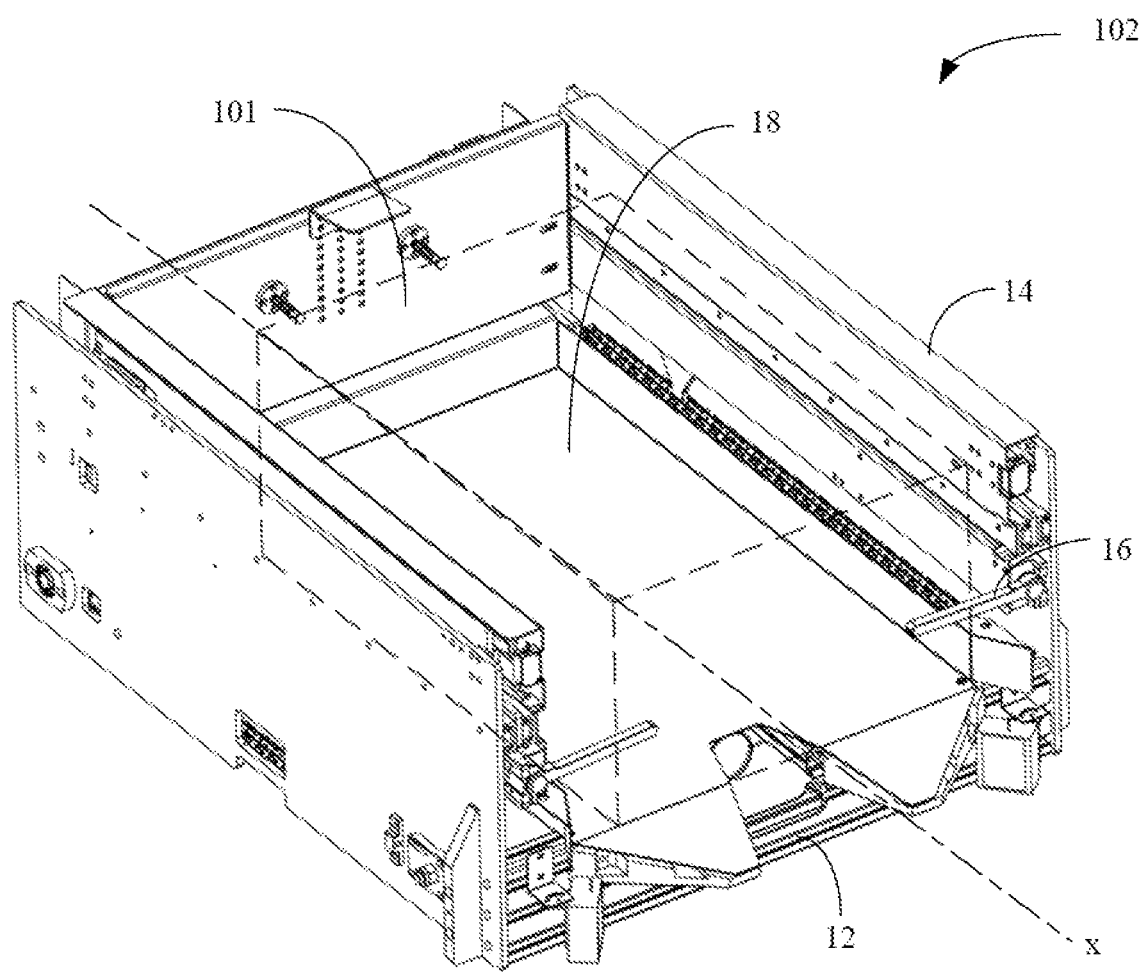
FIG. 10 is a schematic structural diagram of the fork of the carrying apparatus shown in FIG. 6 in a second state, where the manipulator of the fork acquires goods and is retracted.

FIG. 10 is a schematic structural diagram of the fork of the carrying apparatus shown in FIG. 6 in a second state, where a manipulator of the fork acquires goods and is retracted. Referring to FIG. 9 and FIG. 10 together, in some embodiments, the fork 102 include a fork support 12, telescopic arms 14, and a manipulator 16. A fixed end of each of the telescopic arms 14 is mounted to the fork support 12, the manipulator 16 is mounted to a movable end of the each telescopic arm 14, and the movable end is horizontally movable relative to the fork support 12 along a transverse direction x, to cause the manipulator 16 to extend to a position where the goods 101 are acquirable (the manipulator 16 extends out, as shown in FIG. 9), or cause the manipulator 16 to retract after acquiring the goods 101 (the manipulator 16 retracts, as shown in FIG. 10). The manipulator 16 is configured to acquire the goods 101. It may be understood that, according to the actual situation, the fork 102 is not limited to the above form, as long as the fork 102 can take out the goods 101.

The each telescopic arm 14 may include a second chain wheel mechanism (not shown in the figure) and a telescopic driving motor (not shown in the figure). The second chain wheel mechanism is connected to the movable end of the telescopic arm 14, and the telescopic driving motor is configured to drive, by using the second chain wheel mechanism, the movable end of the telescopic arm 14 to move relative to the fork support 12. It may be understood that, according to the actual situation, the second chain wheel mechanism may be replaced with a belt pulley mechanism, a screw rod structure, and the like, or may be omitted directly, or may be directly driven by the movable end of the telescopic arm 14. At this point, the telescopic driving motor is a linear motor.

In some embodiments, the fork 102 further includes a tray 18. The tray 18 is mound to the fork support 12, and the manipulator 16 is configured to place the acquired goods 101 to the tray 18 when the manipulator 16 retracts after acquiring the goods 101. It may be understood that, according to the actual situation, the tray 18 may be omitted, and the fork 102 places the take outd goods 101 in a storage place.

Figure 11:
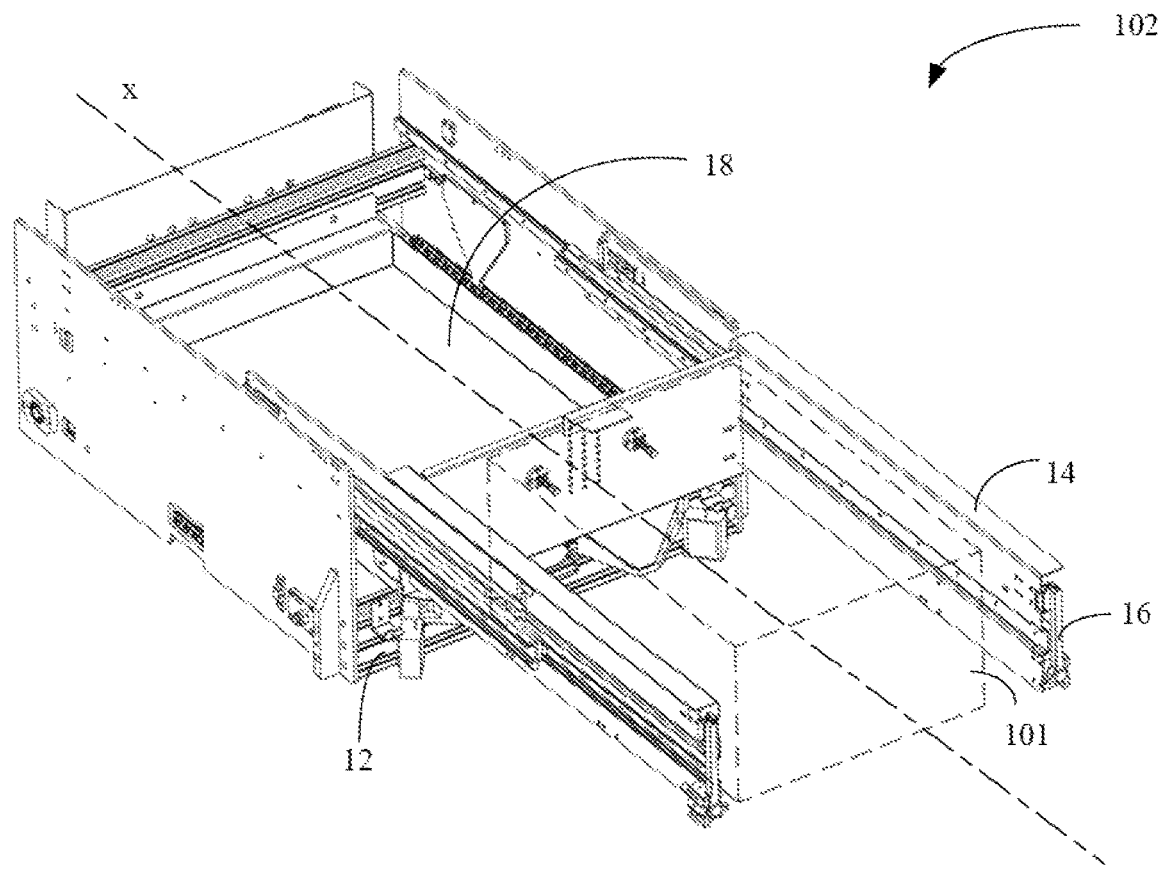
FIG. 11 is a schematic structural diagram of the fork of the carrying apparatus shown in FIG. 6 in a third state, where a movable pusher of the fork is received in a telescopic arm and extends out.

FIG. 11 is a schematic structural diagram of the fork of the carrying apparatus shown in FIG. 6 in a third state, where a movable pusher of the fork is received in a telescopic arm and extends out. Referring to FIG. 9 and FIG. 11 together, in some embodiments, the manipulator 16 includes a movable pusher. As shown in FIG. 11, the movable pusher is receivable in the movable end to avoid the goods 101 during the extension of the manipulator 16. The movable pusher is extendable from the movable end to pull the goods 101 during the retraction of the manipulator 16, as shown in FIG. 9 and FIG. 10. It may be understood that, according to the actual situation, the manipulator 16 is not limited to the above form. For example, a gripping apparatus such as a mechanical gripper, a magnetic chuck, or the like is used.

The manipulator 16 may move in a rotating manner, or move in a moving manner, as long as the manipulator can be received in the movable end or extend from the movable end.

Figure 12:
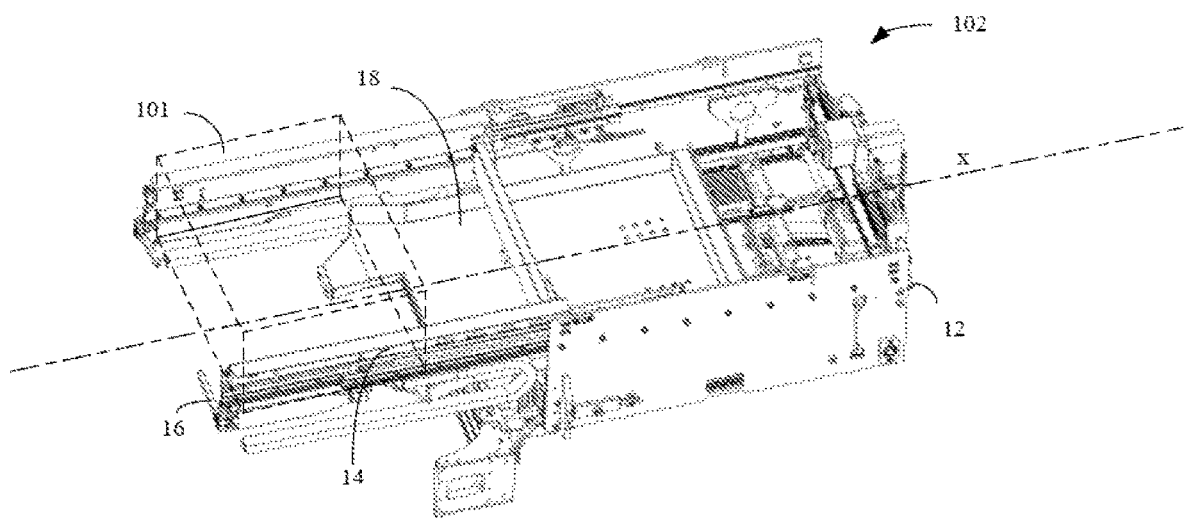
FIG. 12 is a schematic structural diagram of the fork of the carrying apparatus shown in FIG. 6 in a fourth state, where the manipulator of the fork extends out and has acquired goods, and a tray of the fork travels toward the goods.

FIG. 12 is a schematic structural diagram of the fork of the carrying apparatus shown in FIG. 6 in a fourth state, where the manipulator of the fork extends out and has acquired goods, and a tray of the fork travels toward the goods. Referring to FIG. 10 and FIG. 12 together, in some embodiments, the tray 18 is horizontally movable relative to the fork support 12 along the transverse direction x, to travel to a position close to the goods 101 acquired by the manipulator 16, as shown in FIG. 12, or to retract after the goods 101 are placed on the tray 18, as shown in FIG. 10. In this way, a gap between the tray 18 and the shelving unit can be narrowed, and the goods 101 are not easily dropped from the gap.

Referring to FIG. 9 again, in some embodiments, a quantity of the telescopic arms 14 is two. Movable ends of the two telescopic arms 14 are horizontally spaced apart from each other along a longitudinal direction y, and are synchronously horizontally movable relative to the fork support 12 along the transverse direction x. When the manipulator 16 extends to the position where the goods 101 are acquirable, the goods 101 are located between the movable ends of the two telescopic arms 14, and when the manipulator 16 is retracted, the two telescopic arms 14 can transfer the goods 101 more stably.

In some embodiments, one of the telescopic arms 14 is horizontally movable relative to an other of the telescopic arms 14 along the longitudinal direction y, to cause a horizontal distance between the movable ends of the two telescopic arms 14 along the longitudinal direction y to be adjustable, to adapt to goods having different sizes.

In some embodiments, fixed ends of the two telescopic arms 14 are both movably mounted to the fork support 12. The two telescopic arms 14 are simultaneously horizontally movable relative to the fork support 12 along the longitudinal direction y, and the two telescopic arms 14 move in opposite directions. In some other embodiments, the fixed end of one telescopic arm 14 is fixedly mounted to the fork support 12, and the fixed end of the other telescopic arm 14 is movably mounted to the fork support 12. When one of the telescopic arms 14 horizontally moves relative to the other telescopic arm 14 along the longitudinal direction y, the telescopic arm 14 is fixed relative to the fork support 12, and the other telescopic arm 14 horizontally moves relative to the fork support 12 along the longitudinal direction y.

Figure 13:
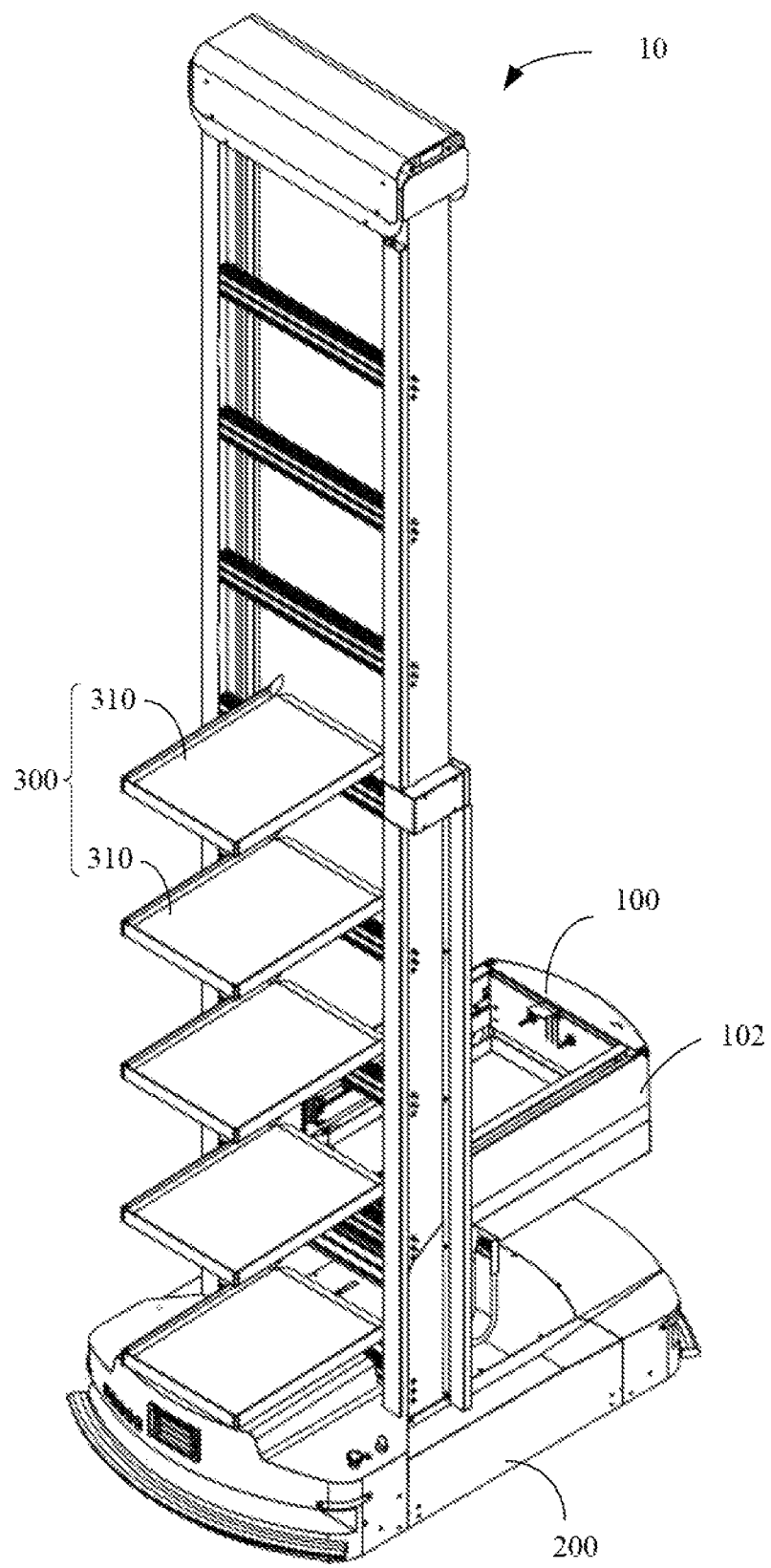
FIG. 13 is a schematic structural diagram of a transport robot according to an embodiment of the present disclosure.

FIG. 13 is a schematic structural diagram of a transport robot according to an embodiment of the present disclosure. Referring to FIG. 13, an embodiment of the present disclosure provides a transport robot 10, which may perform the foregoing method. The transport robot 10 includes a mobile chassis 200, a storage shelving rack 300 (that is, the above storage apparatus), a lifting assembly (not shown in the figure), and the above carrying apparatus 100. The storage shelving rack 300 is mounted to the mobile chassis 200 (that is, the chassis), and the storage shelving rack 300 is provided with a plurality of storage trays 310 (that is, the plates) distributed along a vertical direction. Each of the storage trays 310 is configured to place goods. The carrying apparatus 100 is configured to transfer the goods between a stationary shelving unit and any of the storage trays 310, and the lifting assembly is configured to drive the carrying apparatus 100 to move along the vertical direction, to cause the carrying apparatus 100 to be raised or lowered to a height corresponding to the storage tray 310 or a height of the stationary shelving unit. When the carrying apparatus 100 is raised or lowered to the height corresponding to the storage tray 310, the carrying apparatus 100 moves the goods to the corresponding storage tray 310 along a transfer direction, or the carrying apparatus 100 moves the goods located on the corresponding storage tray 310 out along the transfer direction. When the carrying apparatus 100 is raised or lowered to the height corresponding to the stationary shelving unit, the carrying apparatus 100 moves the goods to the corresponding stationary shelving unit along the transfer direction, or the carrying apparatus 100 moves the goods located on the corresponding stationary shelving unit out along the transfer direction.

According to another embodiment of the present disclosure, the carrying apparatus includes: a fork, configured to take out goods; and a three-dimensional imaging information acquisition module, mounted to the fork and configured to acquire three-dimensional imaging information of the goods, to determine a position of the goods.

In some embodiments, the carrying apparatus further includes a bracket and a rotary driving module. The fork is mounted to the bracket and is rotatable relative to the bracket along a vertical direction. The rotary driving module connects the fork to the bracket, and is configured to drive, according to position information of the goods, the fork to rotate relative to the bracket in a horizontal plane.

In some embodiments, the carrying apparatus further includes a two-dimensional image scanning module. The two-dimensional image scanning module is mounted to the fork and is configured to acquire graphic code information to determine a height of the fork.

In some embodiments, the carrying apparatus further includes a router. The router is electrically connected to the three-dimensional imaging information acquisition module and the two-dimensional image scanning module to receive and deliver the three-dimensional imaging information and the graphic code information.

In some embodiments, the fork includes a fork support, telescopic arms, and a manipulator. A fixed end of each of the telescopic arms is mounted to the fork support, the manipulator is mounted to a movable end of the telescopic arm, and the movable end is horizontally movable relative to the fork support along a transverse direction, to cause the manipulator to extend to a position where the goods are acquirable or cause the manipulator to retract after acquiring the goods. The manipulator is configured to acquire the goods.

In some embodiments, the fork further includes a tray. The tray is mound to the fork support, and the manipulator is configured to place the acquired goods to the tray when retracting after acquiring the goods.

In some embodiments, the manipulator includes a movable pusher. The movable pusher is receivable in the movable end to avoid the goods during the extension of the manipulator. The movable pusher is extendable from the movable end to pull the goods during the retraction of the manipulator.

In some embodiments, the tray is horizontally movable relative to the fork support along the transverse direction, to travel to a position close to the goods acquired by the manipulator, or to retract when the goods are placed on the tray.

In some embodiments, a quantity of the telescopic arms is two. Movable ends of the two telescopic arms are horizontally spaced apart from each other along a longitudinal direction, and are synchronously horizontally movable relative to the fork support along the transverse direction. When the manipulator extends to the position where the goods are acquirable, the goods are located between the movable ends of the two telescopic arms.

In some embodiments, one of the telescopic arms is horizontally movable relative to the other of the telescopic arms along the longitudinal direction, to cause a horizontal distance between the movable ends of the two telescopic arms along the longitudinal direction to be adjustable.

According to another embodiment of the present disclosure, the transport robot includes the above carrying apparatus.

In some embodiments, the transport robot further includes a storage apparatus and a chassis. The storage apparatus is configured to store goods taken out by the fork. The chassis carries the storage apparatus and the carrying apparatus and is movable.

In some embodiments, the storage apparatus includes at least two plates distributed at different heights. The transport robot further includes a lifting driving apparatus. The lifting driving apparatus is configured to drive the carrying apparatus to be raised or lowered, to cause the fork to place the goods taken out to one of the at least two plates.

Compared with the prior art, in the carrying apparatus provided in the present disclosure and the transport robot having the carrying apparatus, the three-dimensional imaging information acquisition module is configured in the fork of the carrying apparatus to acquire the three-dimensional imaging information of the goods. In this way, the position of the container can be determined, and the tedious labeling process can be avoided.

In the above embodiment, a retrievement method in which the status information of the target goods is used as the posture information of the target goods is described.

A retrievement method in which the status information of the target goods is used as the size information of the target goods is described below. First, a structure of the transport robot to which a retrievement method in which the status information of the target goods is used as the size information of the target goods is applicable is described.

Figure 14:
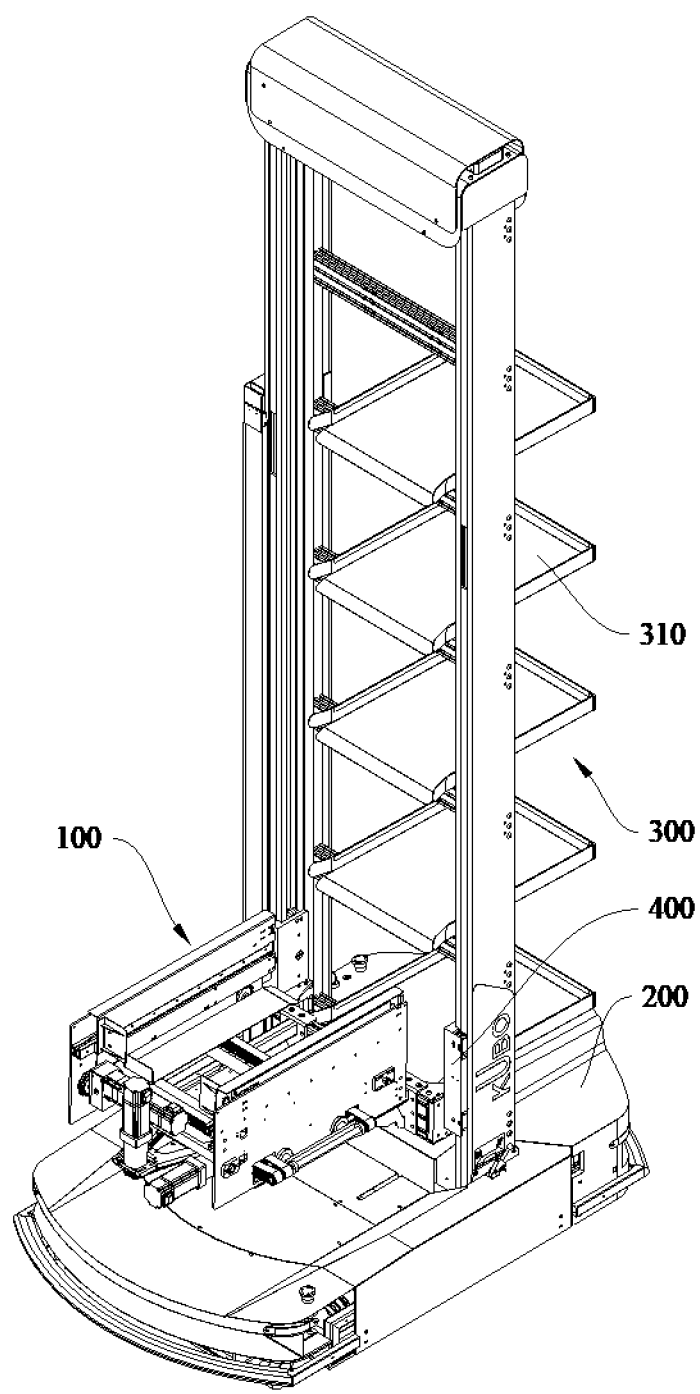
FIG. 14 is a schematic structural diagram of a transport robot according to another embodiment of the present disclosure.

FIG. 14 is a schematic structural diagram of a transport robot according to an embodiment of the present disclosure. Referring to FIG. 14, an embodiment of the present disclosure provides a transport robot 10. The transport robot includes a mobile chassis 200, a storage shelving rack 300, a lifting assembly 400, and a carrying apparatus 100. The storage shelving rack 300 is mounted to the mobile chassis 200, and the storage shelving rack 300 is provided with a plurality of storage trays 310 distributed along a vertical direction. Each of the storage trays 310 is configured to place goods. The carrying apparatus 100 is configured to transfer the goods between a stationary shelving unit and any of the storage trays 310, and the lifting assembly 400 is configured to drive the carrying apparatus 100 to move along the vertical direction, to cause the carrying apparatus 100 to be raised or lowered to a height corresponding to the storage tray 310 or a height of the stationary shelving unit. When the carrying apparatus 100 is raised or lowered to the height corresponding, to the storage tray 310, the carrying apparatus 100 moves the goods to the corresponding storage tray 310 along a transfer direction, or the carrying apparatus 100 moves the goods located on the corresponding storage tray 310 out along the transfer direction. When the carrying apparatus 100 is raised or lowered to the height corresponding to the stationary shelving unit, the carrying apparatus 100 moves the goods to the corresponding stationary shelving unit along the transfer direction, or the carrying apparatus 100 moves the goods located on the corresponding stationary shelving unit out along the transfer direction.

In some embodiments, the carrying apparatus includes a support frame, a first arm portion and a second arm portion supported by the support frame, and a driving apparatus that drives at least one of the first arm portion or the second arm portion to move to adjust a spacing between the first arm portion and the second arm portion. The goods are placed between the first arm portion and the second arm portion when the carrying apparatus moves the goods out, and the spacing between the first arm portion and the second arm portion is adjusted, to cause the carrying apparatus to adapt to goods having different sizes.

In some embodiments, the carrying apparatus further includes a bracket. The bracket is movable along a vertical direction, and the support frame is rotatably disposed on the bracket along an axis in a vertical direction.

Figure 15:
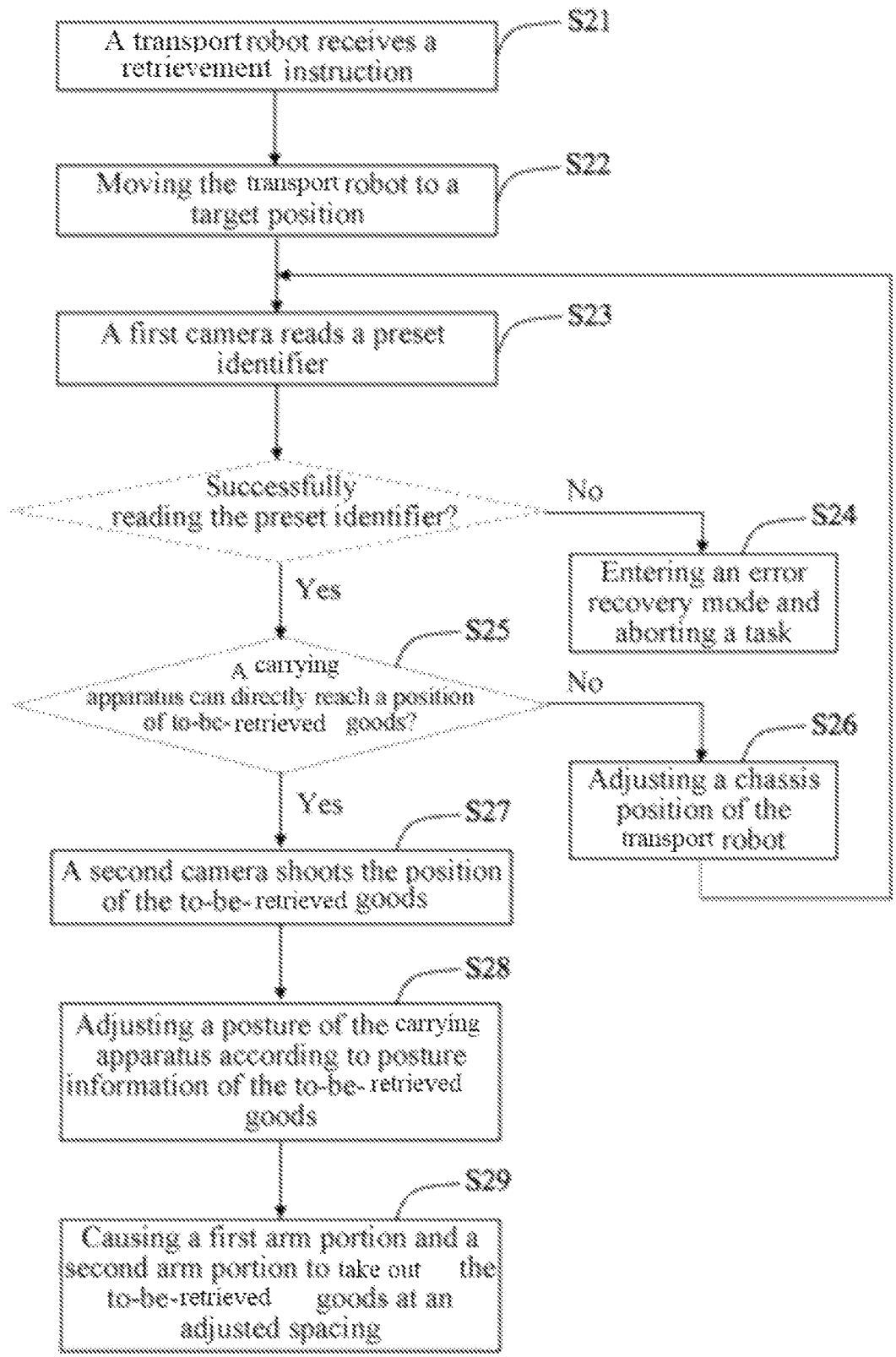
FIG. 15 is a schematic flowchart of a control method for goods retrievement according to an embodiment of the present disclosure.

FIG. 15 is a schematic flowchart of a control method for goods retrievement according to an embodiment of the present disclosure. The method may be applicable to the above transport robot. It may be understood that the method of this embodiment may also be applicable to other transport robots that can adapt to goods having different sizes by adjusting the spacing between the two arm portions. Referring to FIG. 15, the method includes the following steps.

S21: The transport robot receives a retrievement instruction and obtains locating information of target goods.

The locating information of the target goods may be the locating information of the target goods themselves, or may be locating information of a shelving unit on which the target goods are stored.

In some embodiments, the retrievement instruction may include identifier information of the target goods or the shelving unit on which the target goods are stored. The transport robot may obtain the locating information of the target goods by querying the identifier information after receiving the retrievement instruction.

In some embodiments, the retrievement instruction may include the locating information of the target goods, and the transport robot may directly obtain the locating information of the target goods from the retrievement instruction.

In some embodiments, the locating information of the target goods includes plane position information, direction information, height information, and/or the like. The plane position information may be, for example, a coordinate value on a horizontal plane, a row number and a column number in a warehouse, or the like. The direction information may be, for example, a transfer direction of the target goods. The height information may be, for example, a layer-number of shelving unit, a coordinate value in a height direction, or the like.

S22: Moving the transport robot to a target position according to the locating information of the target goods.

In some embodiments, the locating information of the target goods includes plane position information and height information. The moving the transport robot to a target position includes: moving the transport robot to a position corresponding to the plane position information; and raising or lowering the carrying apparatus to a height corresponding to the height information.

In some embodiments, the moving the transport robot to a target position further includes: rotating the carrying apparatus to the transfer direction of the target goods. If the carrying apparatus can carry the goods only in one direction, the carrying apparatus is required to be rotated to the transfer direction of the goods.

In some embodiments, the chassis of the transport robot may be moved to the target plane position, and then the carrying apparatus is raised or lowered to a target height and/or rotated to a target direction.

In some other embodiments, the chassis of the transport robot may also be moved to the target plane position, and the carrying apparatus is raised or lowered to the target height and/or rotated to the target direction during the movement of the chassis of the transport robot.

S23: Causing a first camera of the transport robot to attempt to read a preset identifier.

In some embodiments, the first camera is disposed on the carrying apparatus and is a two-dimensional camera. Before the two-dimensional camera reads the preset identifier, the transport robot first turns on a lighting device to provide a light source for the two-dimensional camera. The lighting device may be disposed on the carrying apparatus or at other suitable positions.

In some embodiments, the preset identifier is a shelving unit identifier of a shelving unit on which the target goods are stored. In some other embodiments, the preset identifier is a goods identifier on the target goods. The preset identifier may be a two-dimensional code or any other identifier that can be shot and read by the first camera.

S24: Entering an error recovery mode and aborting a task if the first camera cannot read the preset identifier.

In some embodiments, if the first camera fails to read the preset identifier for the first time, the transport robot repeatedly lifts the carrying apparatus by a preset range, and causes the first camera to read the preset identifier again during the lifting of the carrying apparatus. If a number of failures of reading the preset identifier by the first camera exceeds a preset threshold, the error recovery mode is entered, the transport robot reports a result to a server, and the lighting device is turned off.

S25: Determining, based on a position relationship between the transport robot and the preset identifier, whether the carrying apparatus may directly reach a position of the target goods from a current position of the transport robot if the first camera successfully reads the preset identifier.

In some embodiments, when the first camera reads the preset identifier, it is further checked whether the preset identifier has a code lost or is pasted upside down. If the preset identifier has a code lost or is pasted upside down, a reset mode is entered, and a result is reported to the server to notify the staff to make corrections.

In some embodiments, the determining whether the carrying apparatus may directly reach the position of the target goods from a current position of the transport robot may include: determining whether the chassis of the transport robot is within a preset range of the preset identifier. If the chassis of the transport robot is beyond the preset range, it indicates that the carrying apparatus cannot directly reach the position of the target goods from the current position of the transport robot, and a chassis position of the transport robot is required to be adjusted.

S26: Adjusting the chassis position of the transport robot, and performing S23 to read the preset identifier again, if it is determined that the carrying apparatus cannot directly reach the target goods from the current position of the transport robot.

S27: Shooting a corresponding position of the target goods by using a second camera of the transport robot, to obtain posture information of the target goods including goods size information, if it is determined that the carrying apparatus may directly reach the target goods from the current position of the transport robot.

In some embodiments, the second camera is disposed on the carrying apparatus and is a three-dimensional camera such as a depth camera, a panoramic camera, and the like.

In some embodiments, the second camera is a camera composed of two two-dimensional cameras, or other devices capable of collecting three-dimensional imaging information. For example, in a specific implementation, a three-dimensional imaging device using a tune-of-flight method may be adopted. Such a device can detect a flight (a round-trip) time of the light pulse by transmitting the light pulse to a target and receiving the light returning from an object by using a sensor, to obtain a distance between the target and the object.

In some embodiments, in addition to the goods size information, the posture information of the target goods further includes depth information, angle information, and/or the like of the target goods relative to the carrying apparatus.

In some embodiments, after it is determined that the carrying apparatus may directly reach the target goods from the current position of the transport robot, it is determined, based on shooting information of the second camera, whether goods exist at a corresponding position of the target goods. If it is determined that goods exist at the position of the target goods, it is further determined whether the size of the goods is within a size range that the carrying apparatus can take out. If it is determined that no goods exist at the corresponding position of the target goods or the size of the goods exceeds the size range that the carrying apparatus can take out, the reset mode is entered, and the result is reported to the server.

S28: Adjusting a position and posture of the carrying apparatus according to the posture information of the target goods.

Relative positions of the target goods and the carrying apparatus may be learned according to the posture information of the target goods, so as to further adjust the position and posture of the carrying apparatus. In this way, the carrying apparatus can obtain the target goods along the transfer direction.

The posture information of the target goods includes goods size information. The adjusting a position and posture of the carrying apparatus includes adjusting the spacing between the first arm portion and the second arm portion of the carrying apparatus according to the size information of the goods, to adapt to the size of the target goods.

In some embodiments, the adjusting a position and posture of the carrying apparatus further includes: adjusting the chassis position of the transport: robot, raising or lowering the carrying apparatus, and/or rotating the carrying apparatus, to align a specific position of the transport robot to a specific position of the target goods.

In some embodiments, the first arm portion and the second arm portion of the carrying apparatus are both movable arm portions. The adjusting a position and posture of the carrying apparatus includes: adjusting the chassis position of the transport robot, raising or lowering a bracket of the carrying apparatus, and/or rotating a support frame of the carrying apparatus, to align a specific position (for example, a middle position) between the first arm portion and the second arm portion to the specific position (for example, a central position) of the target goods, and simultaneously or successively adjusting the first arm portion and the second arm portion, to cause the spacing between the first arm portion and the second arm portion to adapt to the size of the target goods. The adjusted distances of the first arm portion and the second arm portion may be the same or different.

In some other embodiments, the first arm portion is a movable arm portion, and the second arm portion is a fixed arm portion. The adjusting a position and posture of the carrying apparatus includes: adjusting the chassis position of the transport robot, raising or lowering the bracket of carrying apparatus, and/or rotating the support frame of carrying apparatus within a preset amplitude range, to cause the first arm portion and one side edge of the target goods to satisfy a corresponding preset position relationship (for example, the first arm portion is on an outer side of the one side edge of the target goods, and a preset spacing exists between the first arm portion and the side edge), and adjusting the second arm portion to cause the second arm portion and an other side edge of the target goods to satisfy the corresponding preset position relationship (for example, the second arm portion is on an outer side of the other side edge of the target goods, and a preset spacing exists between the second arm portion and the other side edge), so that the spacing between the first arm portion and the second arm portion adapts to the size of the target goods.

S29: Causing the first arm portion and the second arm portion to take out the target goods at the adjusted spacing.

After the transport robot adjusts the position and posture of the carrying apparatus, the carrying apparatus is extended out, and the first arm portion and the second arm portion take out the target goods at the adjusted spacing.

In some embodiments, after the transport robot adjusts the position and posture of the carrying apparatus, and during the causing the first arm portion and the second arm portion to take out the target goods at the adjusted spacing, it may be determined, for example, by using a sensor disposed on the first arm portion or the second arm portion or sensors disposed on the first arm portion and the second arm portion, whether the first arm portion and the second arm portion collide with the target goods. If it is determined that the first arm portion and the second arm portion collide with the target goods, the retrievement task is aborted, such as stopping or retracting the two arm portions, and a manager is notified to deal with the situation, or the retrievement task is terminated, and retrievement of the goods is abandoned. If it is determined that the first arm portion and the second arm portion do not collide with the target goods, the goods are taken out.

In the above embodiment, the three-dimensional camera is used to shoot the target goods to obtain the size information of the goods. As an alternative, the size information of the target goods may be obtained from an external management system of the transport robot. For example, in some embodiments, a retrievement instruction received by the transport robot includes the size information of the target goods. In this way, the size information of the target goods may be directly obtained from the retrievement instruction.

In the above embodiment, the two-dimensional camera is used to shoot the preset identifier such as the goods identifier, the shelving unit identifier, or the like, and the three-dimensional camera is used to shoot the target goods to obtain the size information of the goods. As an alternative, the preset identifier is set as an identifier that can be shot and read by the three-dimensional camera. In this way, in some embodiments, the transport robot may only be provided with the three-dimensional camera. That is to say, the first camera and the second camera in the above embodiments represent the same three-dimensional camera.

Figure 16:
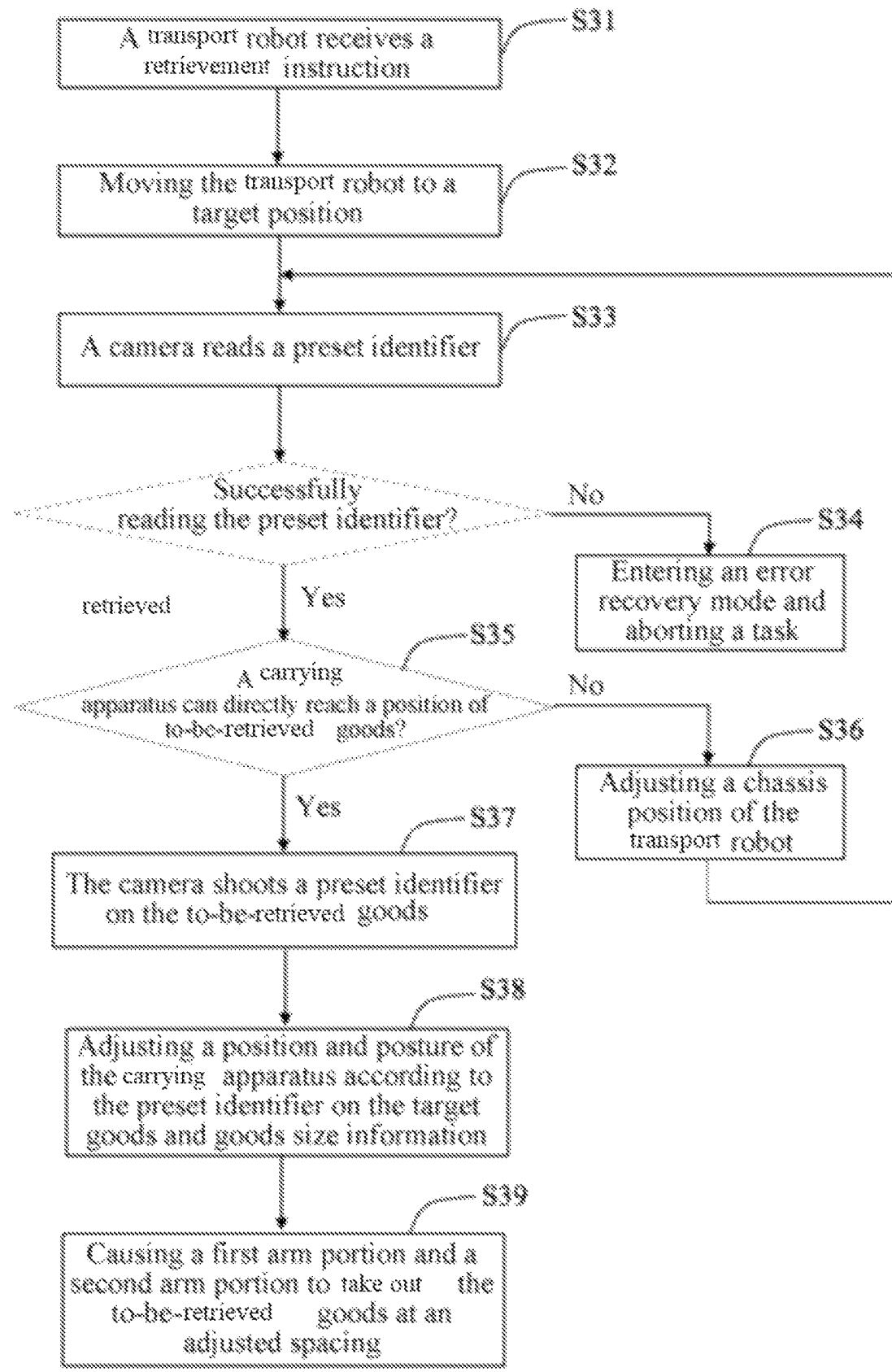
FIG. 16 is a schematic flowchart of a control method for goods retrievement according to another embodiment of the present disclosure.

In the above embodiment, the posture of the carrying apparatus is adjusted according to the posture information of the target goods obtained by the three-dimensional camera. FIG. 16 is a schematic flowchart of a control method for goods retrievement according to another embodiment of the present disclosure. In this embodiment, the posture of the carrying apparatus is adjusted according to a preset identifier on the target goods. Referring to FIG. 16, the method includes the following steps.

S31: The transport robot receives a retrievement instruction and obtains locating information and size information of target goods.

The locating information of the target goods may be locating information of a target shelving unit on which the target goods are stored.

In some embodiments, the retrievement instruction may include identifier information of the target shelving unit. The transport robot may obtain the locating information of the target shelving unit by querying the identifier information after receiving the retrievement instruction.

In some embodiments, the retrievement instruction may include the locating information of the target shelving unit, and the transport robot may directly obtain the locating information of the target shelving unit from the retrievement instruction.

S32: Moving the transport robot to a target position according to the locating information of the target goods.

In some embodiments, the locating information of the target goods includes plane position information and height information of the target shelving unit. The moving the transport robot to a target position includes: moving the transport robot to a plane position of the target shelving unit; and raising or lowering the carrying apparatus to a height of the target shelving unit.

In some embodiments, the moving the transport robot to a target position further includes: rotating the carrying apparatus to a transfer direction of the goods.

S33: Causing a camera of the transport robot to attempt to read a shelving unit identifier.

In some embodiments, the camera is disposed on the carrying apparatus and is a two-dimensional camera. Before the two-dimensional camera reads the shelving unit identifier, the transport robot first turns on a lighting device to provide a light source for the two-dimensional camera. The lighting device may be disposed on the carrying apparatus or at other suitable positions.

The shelving unit identifier may be a two-dimensional code or any other identifier that can be shot and read by the camera.

S34: Entering an error recovery mode and aborting a task if the camera cannot read the shelving unit identifier.

In some embodiments, if the camera fails to read the shelving unit identifier for the first time, the transport robot repeatedly lifts the carrying apparatus by a preset range, and causes the camera to read the shelving unit identifier again during the lifting of the carrying apparatus. If a number of failures of reading the shelving unit identifier by the camera exceeds a preset threshold, the error recovery mode is entered the transport robot reports a result to a server, and the lighting device is turned off.

S35: Determining, based on a position relationship between the transport robot and the shelving unit identifier, whether the carrying apparatus may directly reach a position of the target goods from a current position of the transport robot if the camera successfully reads the shelving unit identifier.

In some embodiments, when the camera reads the shelving unit identifier, it is checked whether the shelving unit identifier has a code lost or is pasted upside down. If the shelving unit identifier has a code lost or is pasted upside down, a reset mode is entered, and a result is reported to the server to notify the staff to make corrections.

In some embodiments, the determining whether the carrying apparatus may reach the position of the target goods from a current position of the transport robot may include: determining whether the chassis of the transport robot is within a preset range of the shelving unit identifier. If the chassis of the transport robot is beyond the preset range, it indicates that the carrying apparatus cannot directly reach the position of the target goods from the current position of the transport robot, and a chassis position of the transport robot is required to be adjusted.

S36: Adjusting the chassis position of the transport robot, and performing S33 to read the shelving unit identifier again, if it is determined that the carrying apparatus cannot directly reach the target goods from the current position of the transport robot.

S37: If it is determined that the carrying apparatus may directly reach the target goods from the current position of the transport robot, the camera shoots and reads the preset identifier on the target goods.

S38: Adjusting a position and posture of the carrying apparatus according to the preset identifier on the target goods and goods size information.

In some embodiments, the preset identifier on the target goods is set at a specific position of the goods (for example, a central position), and the adjusting a position and posture of the carrying apparatus includes: adjusting the chassis position of the transport robot, raising or lowering the carrying apparatus, and/or rotating the carrying apparatus, to align a specific position of the transport robot to a specific position of the preset identifier on the target goods.

The adjusting a position and posture of the carrying apparatus further includes: adjusting a spacing between a first arm portion and a second arm portion of the carrying apparatus according to the goods size information, to adapt to a size of the target goods.

S39: Causing the first arm portion and the second arm portion to take out the target goods at the adjusted spacing.

After the transport robot adjusts the posture of the carrying apparatus, the carrying apparatus is extended out, and the first arm portion and the second arm portion take out the target goods at the adjusted spacing.

In some embodiments, after the transport robot adjusts the posture of the carrying apparatus, and before the carrying apparatus is extended to take out the goods, it is determined whether the carrying apparatus will collide with the shelving unit when being extended out.

In the above embodiment, the retrievement instruction received by the transport robot includes the size information of the target goods, and the transport robot directly obtains the size information of the target goods from the retrievement instruction. In some embodiments, the transport robot may also obtain the size information of the target goods by using the camera to shoot the target goods.

Figure 17:
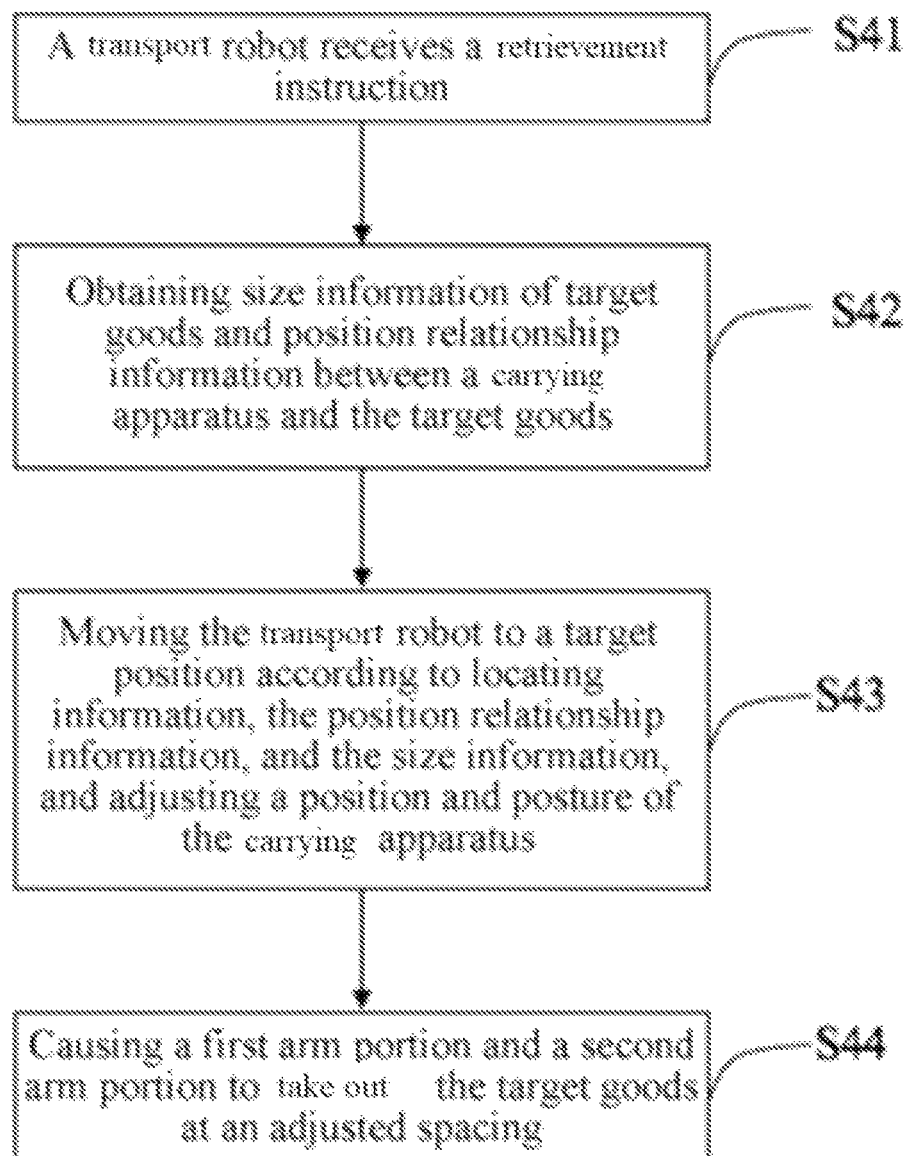
FIG. 17 is a schematic flowchart of a control method for goods retrievement according to another embodiment of the present disclosure.

FIG. 17 is a schematic flowchart of a control method for goods retrievement according to another embodiment of the present disclosure. The method is applicable to the transport robot. The transport robot has a chassis and the carrying apparatus supported on the chassis and configured to take out the goods. The carrying apparatus has a first arm portion and a second arm portion and is configured to place the goods between the first arm portion and the second arm portion when retrieving the goods. Referring to FIG. 17, the method includes the following steps. S41: Receiving a retrievement instruction, and obtaining locating information of target goods according to the retrievement instruction.

S42: Obtaining size information of the target goods and position relationship information between the carrying apparatus and the target goods.

S43: Moving the transport robot to a target position according to the locating information, the position relationship information, and the size information of the target goods, and adjusting a position and posture of the carrying apparatus, where the adjustment includes at least adjusting a spacing between the first arm portion and the second arm portion to adapt to a size of the target goods.

S44: Causing the first arm portion and the second arm portion to take out the target goods at the adjusted spacing.

It may be understood that the control method for goods retrievement in the present disclosure is not necessarily performed in the order shown in FIG. 17. For example, some of the information in S42 may be obtained first, then some of the actions in S43 is performed, then some other information in S42 is obtained, and some other actions in S43 is performed. For example, some of the actions in S43 may be performed first, then the information in S42 is obtained, and then some other actions in S43 are performed, and so on, as long as the purpose of the present disclosure can be achieved.

In another embodiment, the obtaining size information of the target goods includes: obtaining the size information of the target goods by causing the transport robot to acquire image information of the target goods. The causing the first arm portion and the second arm portion to take out the target goods at the adjusted spacing includes: causing the first arm portion and the second arm portion to extend to a position allowing one of all to-be-retrieved goods having a largest size in a taken-out direction to be taken out, to take out the target goods at the adjusted spacing. In this embodiment, a two-dimensional camera or a three-dimensional camera may be disposed in the transport robot, and the size information of the goods is Obtained by using the camera to shoot an identifier code. In addition, the identifier code is attached to the goods, and a position relationship between the transport robot and the goods is obtained by shooting of the camera. As an alternative, during movement of the chassis to the target position, the spacing between the first arm portion and the second arm portion may be adjusted to a largest value of widths of all of the to-be-retrieved goods in the warehouse, to save the retrieving time. It may be understood that when the first arm portion and the second arm portion are caused to take out the target goods at the adjusted spacing, it may be determined whether the size information of the goods in the taken-out direction may be obtained according to the image information of the goods. If so, the size information is used to control the extension size of the first arm portion and the second arm portion for goods retrievement. Otherwise, the first arm portion and the second arm portion are caused to extend to the position allowing one of all of the to-be-retrieved goods having the largest size in the taken-out direction to be taken out.

In another embodiment, the obtaining size information of the target goods includes: Obtaining the size information of the target goods by causing the transport robot to acquire three-dimensional imaging information of the target goods. The causing the first arm portion and the second arm portion to take out the target goods at the adjusted spacing includes: causing the first arm portion and the second arm portion to extend by a preset maximum extension size to take out the target goods at the adjusted spacing. In this embodiment, a three-dimensional camera may be disposed in the transport robot, and the size information of the goods may be obtained by using the three-dimensional camera to shoot. The identifier code is attached to the goods, and the position relationship between the transport robot and the goods is obtained by using the two-dimensional camera to shoot the identifier code. As an alternative, during movement of the chassis to the target position, the spacing between the first arm portion and the second arm portion may be adjusted to a largest value of widths of all of the to-be-retrieved goods in the warehouse, to save the retrieving time. It may be understood that when the first arm portion and the second arm portion are caused to take out the target goods at the adjusted spacing, it may be determined whether the size information of the goods in the taken-out direction may be obtained according to the three-dimensional imaging information of the goods. If so, the size information is used to control the extension size of the first arm portion and the second arm portion for goods retrievement. Otherwise, the first arm portion and the second arm portion are caused to extend by the preset maximum extension size for goods retrievement.

In another embodiment, the obtaining size information of the target goods includes: obtaining the size information of the target goods from an external management system of the transport robot. The obtaining position relationship information between the carrying apparatus and the target goods includes: obtaining the position relationship information between the carrying apparatus and the target goods based on a preset identifier on the target goods. The moving the transport robot to the target position according to the locating information, the position relationship information, and the size information of the target goods, and adjusting the position and posture of the carrying apparatus includes: moving the chassis of the transport robot to the target position according to the locating information and the size information of the target goods, adjusting the spacing between the first arm portion and the second arm portion according to the size information of the target goods during the movement of the chassis or after the chassis is moved to the target position, and adjusting the position and posture of the carrying apparatus according to the position relationship information between the carrying apparatus and the target goods Obtained based on the preset identifier on the target goods. In this embodiment, the size information of the target goods obtained from the external management system may be wrong, resulting in a failure to take out the goods. Therefore, during the causing the first arm portion and the second arm portion to take out the target goods at the adjusted spacing, it may be determined, by using a sensor disposed on the first arm portion or the second arm portion or sensors disposed on the first arm portion and the second arm portion, whether the first arm portion and the second arm portion collide with the target goods. If it is determined that the first arm portion and the second arm portion collide with the target goods, the retrievement task is aborted, such as stopping or retracting the two arm portions, and a manager is notified to deal with the situation, or the retrievement task is terminated, and retrievement of the container is abandoned. If it is determined that the first arm portion and the second arm portion do not collide with the target goods, the goods are taken out. In this embodiment, a three-dimensional camera is not necessarily disposed, which has the advantage of relatively low costs.

In another embodiment, the moving the transport robot to the target position includes: moving the chassis of the transport robot to the target position, and adjusting the spacing between the first arm portion and the second arm portion according to prestored size information of the target goods obtained from an external management system of the transport robot. The obtaining the size information of the target goods includes: obtaining actual size information of the target goods by causing the transport robot to acquire three-dimensional imaging information of the target goods. The adjusting a position and posture of the carrying apparatus includes: determining Whether the actual size information of the target goods is same as the prestored size information of the target goods, and if not, readjusting the spacing between the first arm portion and the second arm portion according to the actual size information. In this embodiment, a width between the two arm portions of the carrying apparatus may be adjusted before the transport robot is moved to the target position, so as to improve the efficiency of the entire system.

Figure 18:
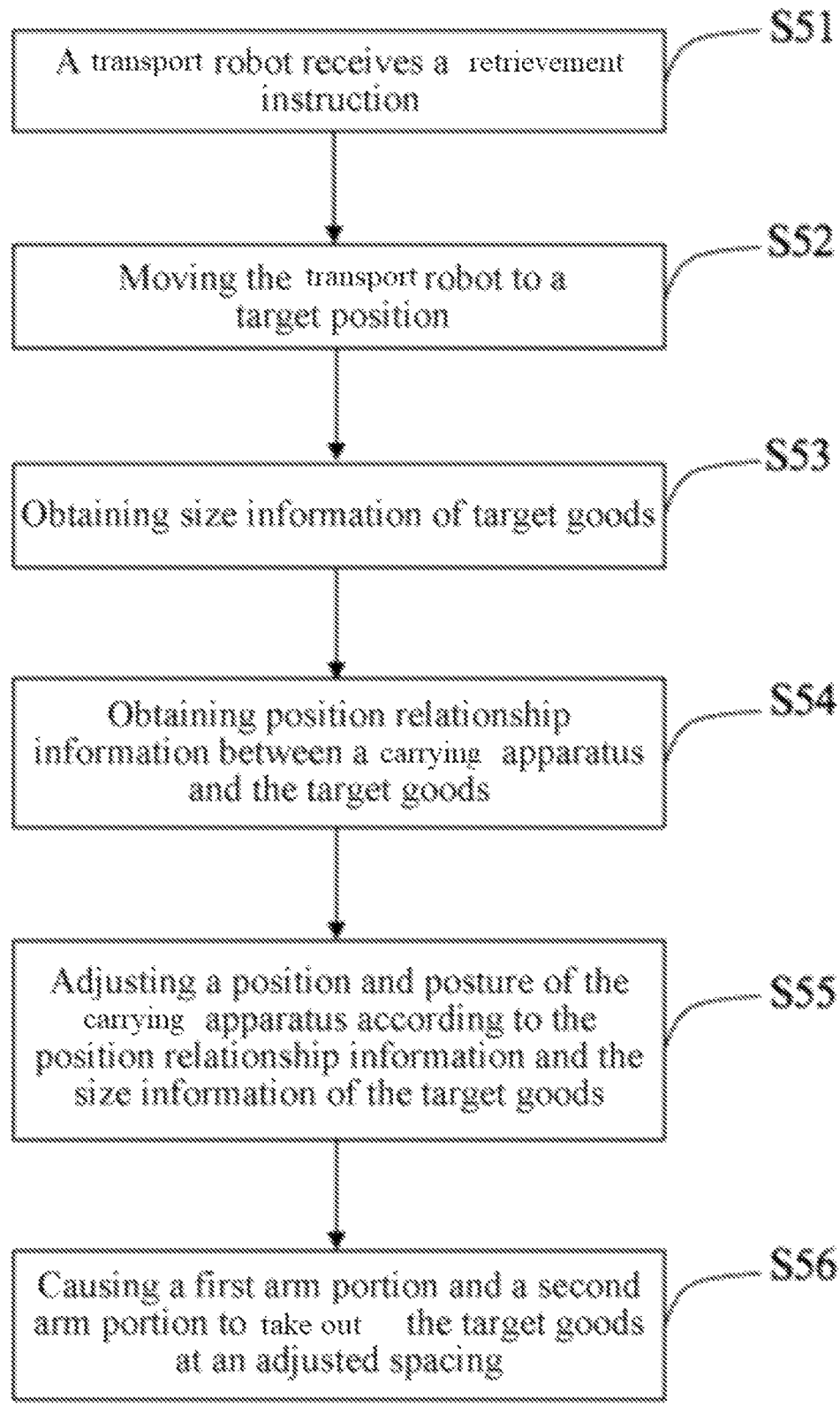
FIG. 18 is a schematic flowchart of a control method for goods retrievement according to another embodiment of the present disclosure.

FIG. 18 is a schematic flowchart of a control method for goods retrievement according to another embodiment of the present disclosure. The method is applicable to the transport robot. The transport robot has a chassis and the carrying apparatus supported on the chassis and configured to take out the goods. The carrying apparatus has a first arm portion and a second arm portion and is configured to place the goods between the first arm portion and the second arm portion when retrieving the goods. Referring to FIG. 18, the method includes the following steps.

S51: Receiving a retrievement instruction, and obtaining locating information of target goods according to the retrievement instruction.

S52: Moving the transport robot to a target position according to the locating information.

S53: Obtaining size information of the target goods.

S54: Obtaining position relationship information between the carrying apparatus and the target goods.

S55: Adjusting a position and posture of the carrying apparatus according to the position relationship information and the size information of the target goods, where the adjusting a position and posture of the carrying apparatus includes at least adjusting a spacing between the first arm portion and the second arm portion to adapt to a size of the target goods.

S56: Causing the first arm portion and the second arm portion to take out the target goods at the adjusted spacing.

In some embodiments, the obtaining size information of the target goods includes at least one of the following: obtaining the size information of the target goods from an external management system of the transport robot; and obtaining the size information of the target goods based on sensing of the target goods by the transport robot.

In some embodiments, the obtaining size information of the target goods includes at least one of the following: obtaining the size information of the target goods from the retrievement instruction; obtaining the size information of the target goods based on a preset identifier on the target goods; and obtaining the size information of the target goods by causing the transport robot to acquire image information of the target goods.

In some embodiments, the first arm portion is a movable arm portion, the second arm portion is a fixed arm portion, and the adjusting a spacing between the first arm portion and the second arm portion is achieved by moving the first arm portion.

In some embodiments, the first arm portion and the second arm portion are both movable arm portions, and the adjusting a spacing between the first arm portion and the second arm portion is achieved by simultaneously or successively moving the first arm portion and the second arm portion.

In some embodiments, the carrying apparatus or the transport robot further has at least one sensing apparatus. The obtaining position relationship information between the transport robot and the target goods includes: obtaining the position relationship information between the transport robot and the target goods based on first sensed information obtained by the at least one sensing apparatus by performing an operation on the preset identifier. The obtaining the size information of the target goods includes: obtaining the size information of the target goods based on second sensed information obtained by the at least one sensing apparatus by performing an operation on the target goods.

In some embodiments, the carrying apparatus or the transport robot has two sensing apparatuses. One of the sensing apparatuses is a two-dimensional camera, an other of the sensing apparatuses is a three-dimensional camera. The first sensed information is obtained by the two-dimensional camera, and the second sensed information is obtained by the three-dimensional camera.

In some embodiments, the carrying apparatus has only one two-dimensional camera or only one three-dimensional camera.

In some embodiments, the preset identifier is a goods identifier or a locating identifier on the target goods, or a shelving unit identifier or a locating identifier on the shelving unit on which the target goods are stored. It may be understood that the goods identifier of the target goods may be an identifier code set on a surface of the goods or the container. The identifier code may be a unique identifier of the goods or the container, or may be the same identifier as those of other goods or containers.

In some embodiments, before the obtaining position relationship information between the carrying apparatus and the target goods, the method further includes: determining whether the target goods exist; and determining whether a size of the target goods is within a size range that the carrying apparatus can take out if the target goods exist.

In some embodiments, the adjusting a position and posture of the carrying apparatus further includes: aligning a specific position of the transport robot to a specific position of a preset identifier on the target goods by performing at least one of the following: driving the chassis of the transport robot, raising or lowering the carrying apparatus, or rotating the carrying apparatus. It may be understood that the preset identifier on the target goods may be the goods identifier on the target goods or on the container of the target goods, or may be other locating identifiers set on the goods or the container.

In some embodiments, the adjusting a position and posture of the carrying apparatus further includes: aligning a specific position of the transport robot to a specific position of the target goods by performing at least one of the following: driving the chassis of the transport robot, raising or lowering the carrying apparatus, or rotating the carrying apparatus.

In some embodiments, the adjusting a position and posture of the carrying apparatus includes: aligning a specific position between the first arm portion and the second an portion to a specific position of the target goods by performing at least one of the following: driving the chassis of the transport robot, raising or lowering the carrying apparatus, or rotating the carrying apparatus, and simultaneously or successively adjusting the first arm portion and the second arm portion, to cause the spacing between the first arm portion and the second arm portion to adapt to the size of the target goods.

In some embodiments, the adjusting a position and posture of the carrying apparatus includes: aligning the first arm portion to one side edge of the target goods by performing at least one of the following: driving the chassis of the transport robot, raising or lowering the carrying apparatus, or rotating the carrying apparatus, and aligning the second arm portion to an other side edge of the target goods by adjusting the second arm portion.

In some embodiments, the moving the transport robot to a target position includes: moving the chassis of the transport robot to the target position, and then raising or lowering the carrying apparatus to a target height and/or rotating the carrying apparatus to a target direction; or moving the chassis of the transport robot to the target position, and raising or lowering the carrying apparatus to a target height and/or rotating the carrying apparatus to a target direction during the movement of the chassis of the transport robot.

In some embodiments, the causing the first arm portion and the second arm portion to take out the target goods at the adjusted spacing includes: determining, by using a sensor disposed on the first arm portion or the second arm portion or sensors disposed on the first arm portion and the second arm portion, whether the first arm portion and/or the second arm portion will collide with the target goods during the goods retrievement by the first arm portion and the second arm portion, if so, aborting or terminating the retrievement task, and if not, retrieving the goods.

In the above embodiments, the goods are retrieved from the stationary shelving unit by way of example for description. It may be understood that those skilled in the art can obtain the process of retrieving the goods from the storage shelving rack 300 from the above embodiments, and the details will not be described again in the present disclosure.

A specific example of the carrying apparatus 100 that can perform the methods of the above embodiments is provided below. It may be understood that the present disclosure is not limited thereto, which may also be implemented by other suitable carrying apparatuses.

Figure 19:
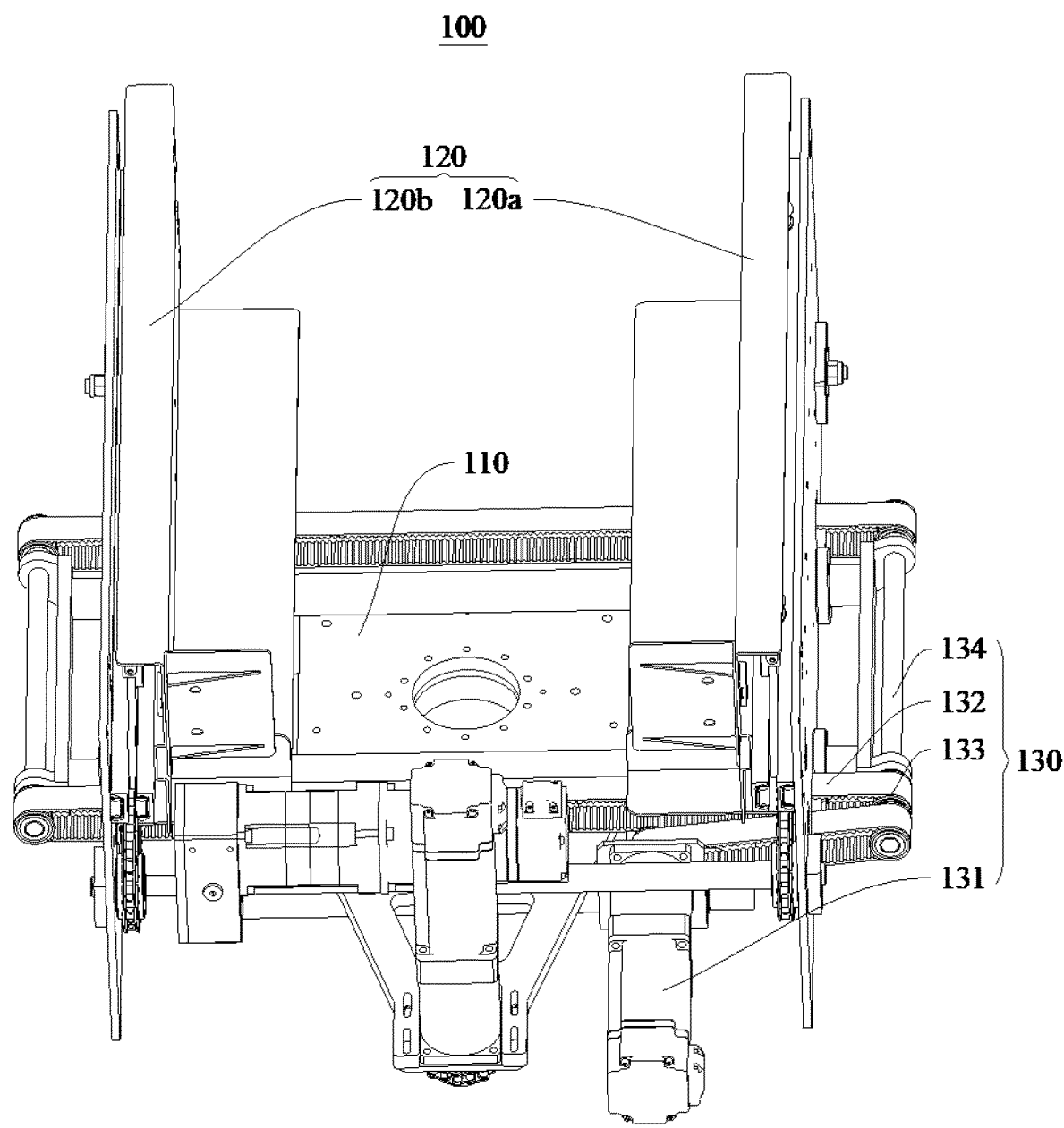
FIG. 19 is a schematic structural diagram of a state in which two side arms of a carrying apparatus are far away from each other according to an embodiment of the present disclosure.
Figure 20:
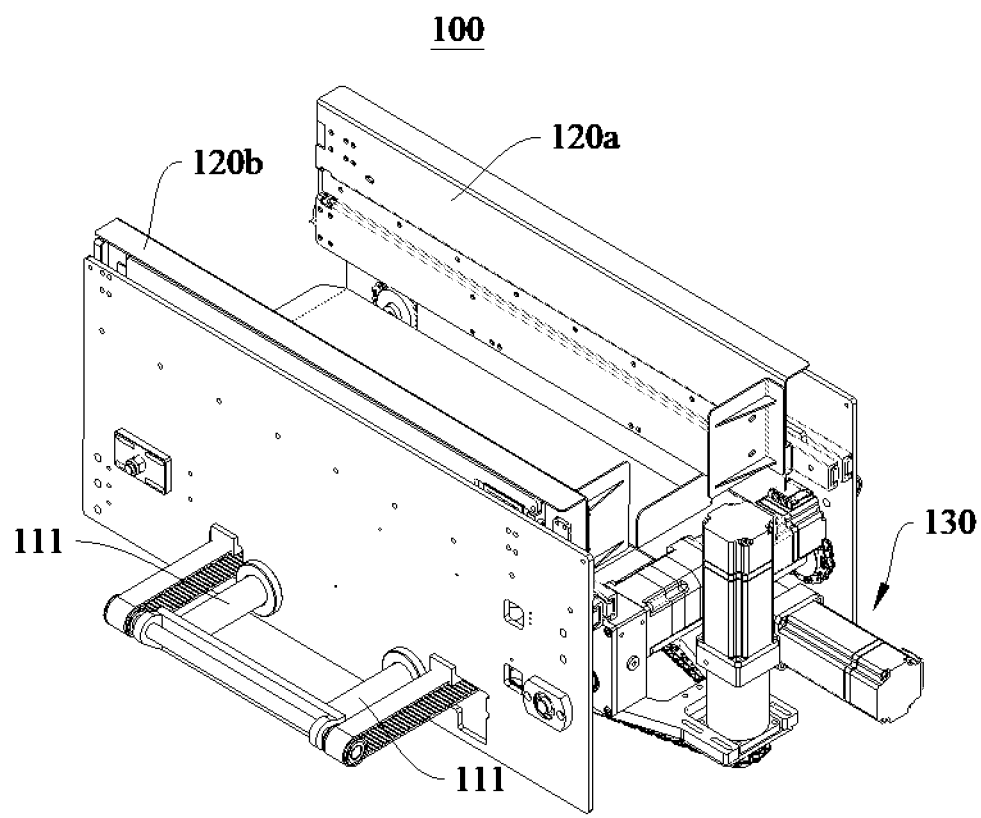
FIG. 20 is a schematic structural diagram of a state in which two side arms of a carrying apparatus are moved close to each other according to an embodiment of the present disclosure.

FIG. 19 is a schematic structural diagram of a state in which two side arms of a carrying apparatus are far away from each other according to an embodiment of the present disclosure. FIG. 20 is a schematic structural diagram of a state in which two side arms of a carrying apparatus are close to each other according to an embodiment of the present disclosure. As shown in FIG. 19 and FIG. 20, an embodiment of the present disclosure provides a carrying apparatus 100 configured to convey goods along a transfer direction. The carrying apparatus 100 includes a support frame 110, two side arms 120, and a transverse driving assembly 130. The two side arms 120 may be used as the first arm portion and the second arm portion in the above methods. The support frame 110 extends along a direction perpendicular to the transfer direction in a horizontal plane. The two side arms 120 are respectively disposed on two ends of the support frame 110 in an extending direction. The two side arms 120 respectively extend along the transfer direction, and at least one of the side arms 120 is movably disposed on the support frame 110 along the extending direction of the support frame 110. The transverse driving assembly 130 is drivingly connected to the at least one of the side arms 120. The transverse driving assembly 130 drives the at least one of the side arms 120 to move along the extending direction of the support frame 110, to cause the two side arms 120 to move close to or away from each other along the extending direction of the support frame 110, so that the two side arms 120 adapt to a size of the carried goods when moving close to each other along the extending direction of the support flame 110. In the above carrying apparatus 100, the side arms 120 movable along the extending direction of the support frame 110 can adjust the distance between the two side arms 120 according to an external size of the goods, and then parts of the carrying apparatus 100 collaborate with each other to perform the transfer action. In this way, the adaptability of the carrying apparatus 100 and the transport robot 10 provided in the present disclosure to containers of different sizes is greatly enhanced, thereby effectively improving the efficiency of the goods transfer.

The distance between the two side arms 120 along the extending direction of the support frame 110 is applicable to the to-be-carried goods when varying within a set range. Optionally, the two side arms 120 are movably disposed on the support frame 110 along the extending direction of the support frame 110. Alternatively, only one of the side arms 120 is movably disposed on the support frame 110 along the extending direction of the support frame 110, and an other of the side arms 120 is fixedly disposed on the support frame 110 along the extending direction of the support frame 110. It is to be noted that the side arm 120 fixedly disposed on the support frame 110 along the extending direction of the support frame 110 can move relative to the support frame 110 in other directions, or is also fixed relative to the support frame 110 in other directions. According to the above two solutions, the spacing between the two side arms 120 along the extending direction of the support frame 110 is adjustable. The present disclosure does not limit a quantity of the side arms 120 movably disposed on the support frame 110 along the extending direction of the support frame 110. As shown in FIG. 6 to FIG. 7, in an embodiment of the present disclosure, the two side arms 120 are respectively a transverse fixed arm 120a and a transverse movable arm 120b. The transverse fixed arm 120a is fixedly disposed on one end of the support frame 110 along the extending direction of the support frame 110, and the transverse movable arm 120b is movably disposed on the support frame 110 along the extending, direction of the support frame 110. The transverse movable arm 120b moves close to or away from the transverse fixed arm 120a during, the movement along the extending direction of the support lame 110. This arrangement ensures that the carrying apparatus 100 has a relatively simple structure under the premise of adjusting the spacing between the two side arms 120, thereby ensuring the stable operation of the carrying apparatus 100 provided in this embodiment.

The function of the transverse driving assembly 130 is to drive the side arm 120 movably disposed along the extending direction of the support frame 110 to move along the extending direction of the support frame 110, so that the carrying apparatus 100 adapts to the size of the to-be-carried goods. In a possible implementation, the transverse driving assembly 130 includes a transverse power source and a transverse transmission structure. An output end of the transverse power source is drivingly connected to an input end of the transverse transmission structure, and an output end of the transverse transmission structure is fixedly connected to the transverse movable arm 120b along the extending direction of the support frame 110. In other implementations, the transverse driving assembly 130 may include only a power source. An output end of the power source is directly drivingly connected to the transverse movable arm 120b, thereby driving the transverse movable arm 120b to move along the extending direction of the support frame 110. For example, the transverse driving assembly 130 includes an air cylinder, a hydraulic cylinder, a linear motor, or the like.

Further, as shown in FIG. 19 and FIG. 20, the transverse power source includes a transverse motor 131, and the transverse transmission structure includes a transverse traction rope 132 and at least two transverse driving wheels 133. The at least two transverse driving wheels 133 are spaced apart on the support frame 110 along the extending direction of the support frame 110, and at least one of the transverse driving wheels 133 is drivingly connected to an output shaft of the transverse motor 131. The transverse traction rope 132 is sleeved on the at least two transverse driving wheels 133, and the transverse traction rope 132 is fixedly connected to the transverse movable arm 120b along the extending direction of the support frame 110. The at least one of the transverse driving wheels 133 drives the transverse traction rope 132 to move during rotation, thereby driving the transverse movable arm 120b to move along the extending direction of the support frame 110. The combination of the motor and the driving wheel has the advantages of high transmission efficiency, easy control, mature technology, and low costs. Optionally, the output shaft of the motor is directly drivingly connected to the transverse driving wheels 133 or drivingly connected to the transverse driving wheels by using a gear structure. In a possible implementation, the motor is a stepper motor. In other possible implementations, the power source is a pneumatic motor or a hydraulic motor, as long as the transverse driving wheel can be driven to rotate. Similarly, a combination form of the transverse traction rope 132 and the transverse driving wheels 133 has the advantages of a simple structure, stable performance, low costs, and easy restorage during the driving. Optionally, the transverse traction rope 132 is a belt or a chain, and the corresponding transverse chain wheel is a belt pulley or a chain wheel.

Figure 21:
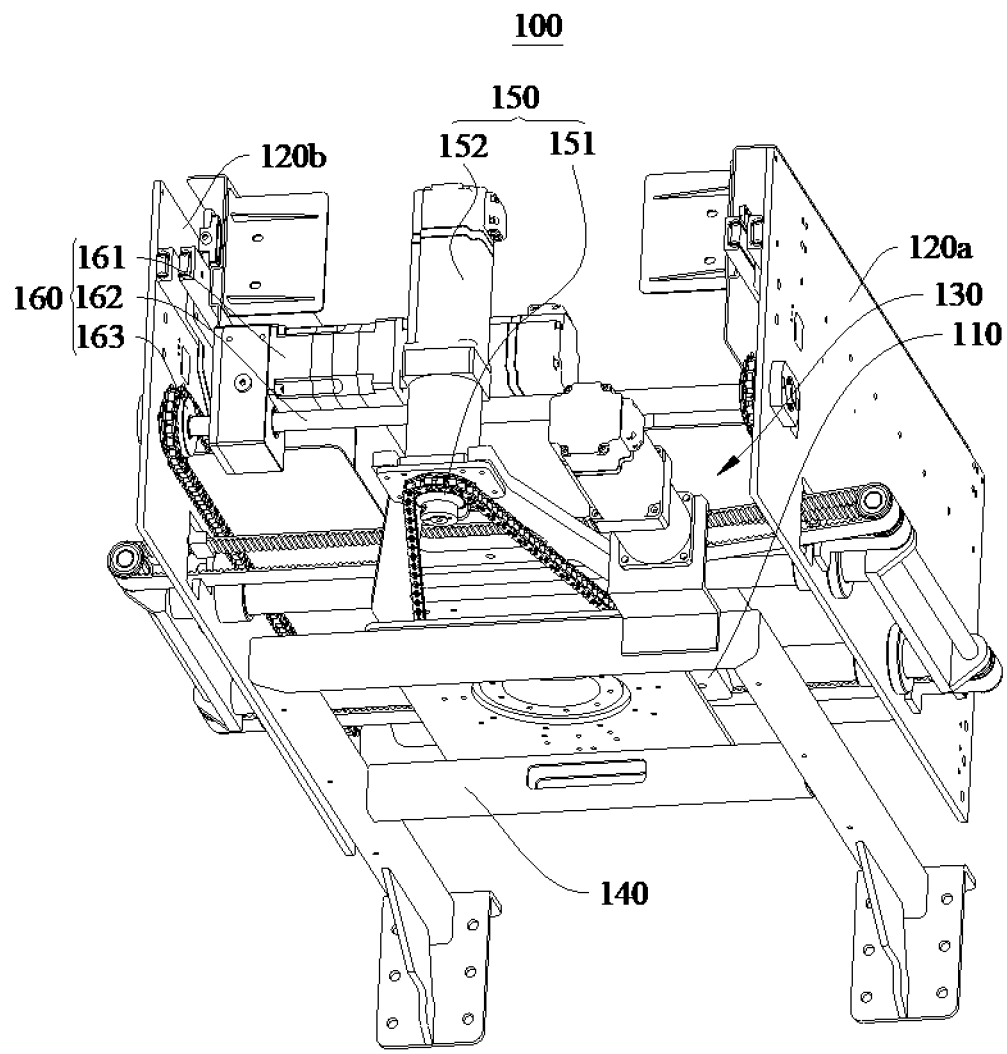
FIG. 21 is a schematic structural diagram of a carrying apparatus according to an embodiment of the present disclosure.

FIG. 21 is a schematic structural diagram of a carrying apparatus according to an embodiment of the present disclosure. Further, as shown in FIG. 19 to FIG. 21, the transverse driving assembly 130 includes two transverse transmission structures. The two transverse transmission structures are spaced apart on the support frame 110 along the transfer direction. The transverse driving assembly 130 further includes a transverse transmission shaft 134. The output shaft of the transverse motor 131 is drivingly connected to the transverse transmission shaft 134. The transverse transmission shaft 134 is drivingly connected to one of the transverse driving wheels 133 of the two transverse transmission structures, and the transverse traction ropes 132 of the two transverse transmission structures are drivingly connected to the transverse movable arm 120b. The two transverse transmission structures can respectively drive the transverse movable arm 120b by different positions on the transverse movable arm 120b. This is beneficial for the transverse movable arm 120b to be uniformly stressed during the movement along the extending direction of the support frame 110, thereby preventing the transverse movable arm 120b from being stuck due to being unevenly stressed during the movement. In addition, the two transverse transmission structures are simultaneously driven by the transverse motor 131 by using the transverse transmission shaft 134, thereby realizing the synchronous driving of the two transverse transmission structures, and ensuring the stability of the movement of the transverse movable arm 120b along the extending direction of the support frame 110.

Figure 22:
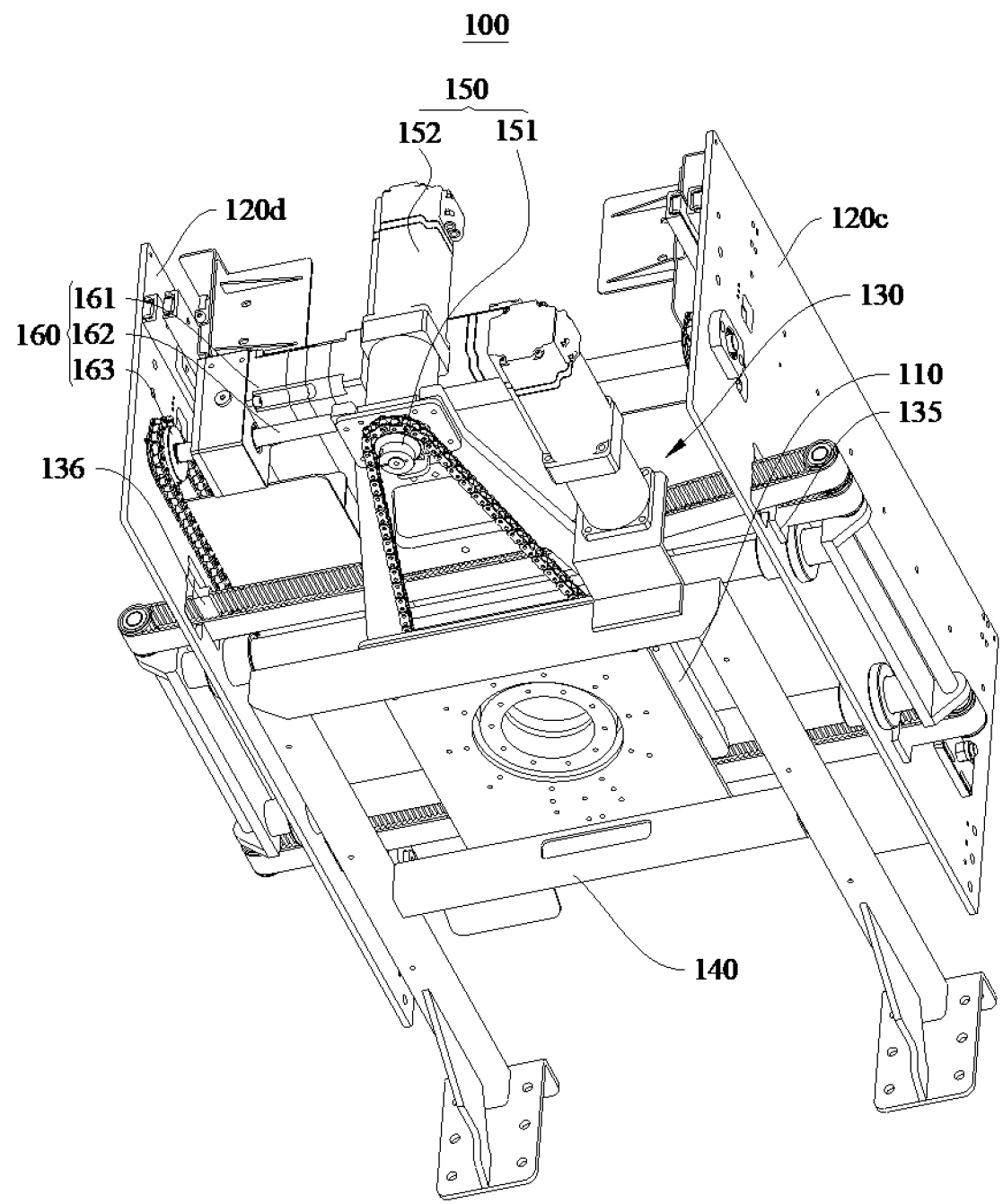
FIG. 22 is a schematic structural diagram of a carrying apparatus according to another embodiment of the present disclosure.

FIG. 22 is a schematic structural diagram of a carrying apparatus according to another embodiment of the present disclosure. As shown in FIG. 19 and FIG. 22, in an embodiment of the present disclosure, the two side arms 120 are respectively a first movable arm 120c and a second movable arm 120d. The first movable arm 120c and the second movable arm 120d are movably disposed on the support frame 110 along the extending direction of the support frame 110. The first movable arm 120c and the second movable arm 120d are respectively drivingly connected to the transverse driving assembly 130. The transverse driving assembly 130 drives the first movable arm 120c and the second movable arm 120d to move along the extending direction of the support frame 110. In this way, the first movable arm 120c and the second movable arm 120d move close to or away from each other along the extending direction of the support frame 110. The first movable arm 120c and the second movable arm 120d can adapt to the size of the carrying container when moving close to each other along the extending direction of the support frame 110. The first movable arm 120c and the second movable arm 120d are movably disposed, so as to more efficiently adapt to the containers having different sizes. Compared with the carrying apparatus in which only one side arm 120 is movable, the carrying apparatus 100 provided in this embodiment can save half of the adjustment time for adapting to the size of the container.

The function of the transverse driving assembly 130 is to drive the side arm 120 movably disposed along the extending direction of the support flame 110 to move along the extending direction of the support frame 110, so that the carrying apparatus 100 adapts to the size of the to-be-carried goods. In a possible implementation, as shown in FIG. 6 and FIG. 9, the transverse driving assembly 130 includes a transverse power source and a transverse transmission structure. An output end of the transverse power source is drivingly connected to an input end of the transverse transmission structure, and an output end of the transverse transmission structure is fixedly connected to the first movable arm 120c and the second movable arm 120d along the extending direction of the support frame 110. In other implementations, the transverse driving assembly 130 may include only a power source. An output end of the power source is directly drivingly connected to the first movable arm 120c and the second movable arm 120d, thereby driving the first movable arm 120c and the second movable arm 120d to move close to or away from each other along the extending direction of the support frame 110. For example, the transverse driving assembly 130 includes one or more of an air cylinder, a hydraulic cylinder, a linear motor, or the like.

Further, as shown in FIG. 19 and FIG. 22, the transverse power source includes a transverse motor 131, and the transverse transmission structure includes a transverse traction rope 132 and at least two transverse driving wheels 133. The at least two transverse driving wheels 133 are spaced apart on the support frame 110 along the extending direction of the support frame 110. At least one of the transverse driving wheels 133 is drivingly connected to an output shaft of the transverse motor 131, and the transverse traction rope 132 is sleeved on the at least two transverse driving wheels 133. Two sections of the transverse traction rope 132 wound around the transverse driving wheels 133 are fixedly connected to the first movable arm 120c and the second movable arm 120d respectively, and at least one of the transverse driving wheels 133 drives the transverse traction rope 132 to move during rotation, thereby driving the first movable arm 120c and the second movable arm 120d to move close to or away from each other along the extending direction of the support flame 110. The combination of the motor and the driving wheel has the advantages of high transmission efficiency, easy control, mature technology, and low costs. In a possible implementation, the transverse transmission structure further includes a first connecting block 135 and a second connecting block 136. The first connecting block 135 is fixedly connected to the first movable arm 120c and a section of the transverse traction rope 132 wound around the transverse driving wheel 133, and the second connecting block 136 is fixedly connected to the second movable arm 120d and an other section of the transverse traction rope 132 wound around the transverse driving wheel 133.

Optionally, the output shaft of the motor is directly drivingly connected to the transverse driving wheels or drivingly connected to the transverse driving wheels by using a gear structure. In a possible implementation, the motor is a stepper motor. In other possible implementations, the power source is a pneumatic motor or a hydraulic motor, as long as the transverse driving wheel can be driven to rotate. Similarly, a combination form of the transverse traction rope 132 and the transverse driving wheels 133 has the advantages of a simple structure, stable performance, low costs, and easy restorage during the driving. Optionally, the transverse traction rope is a belt or a chain, and the corresponding transverse chain wheel is a belt pulley or a chain wheel.

Further, as shown in FIG. 19 and FIG. 22, the transverse driving assembly 130 includes two transverse transmission structures. The two transverse transmission structures are spaced apart on the support frame 110 along the transfer direction. The transverse driving assembly 130 further includes a transverse transmission shaft 134. The output shaft of the transverse motor 131 is drivingly connected to the transverse transmission shaft 134. The transverse transmission shaft 134 is drivingly connected to one of the transverse driving wheels 133 of the two transverse transmission structures, and the transverse traction ropes 132 of the two transverse transmission structures wound around two sections of the transverse driving wheels 133 are respectively fixedly connected to the first movable arm 120c and the second movable arm 120d. The two transverse transmission structures can respectively drive the first movable arm 120c and the second movable arm 120d by different positions on the first movable arm 120c and the second movable arm 120d. This is beneficial for the first movable arm 120c and the second movable arm 120d to be uniformly stressed during the movement along the extending direction of the support frame 110, thereby preventing the first movable arm 120c and the second movable arm 120d from being stuck due to being unevenly stressed during the movement. In addition, the two transverse transmission structures are simultaneously driven by the transverse motor 131 by using the transverse transmission shaft 134, thereby realizing the synchronous driving of the two transverse transmission structures, and ensuring the stability of the first movable arm 120c and the second movable arm 120d during the moving close to or away from each other along the extending direction of the support frame 110.

In an embodiment of the present disclosure, as shown in FIG. 22, the transverse transmission structure includes two transverse driving wheels 133. The first movable arm 120c and the second movable arm 120d are symmetrically disposed between the two transverse driving wheels 133. That is to say, the first movable arm 120c and the second movable arm 120d respectively move close to the transverse driving wheels 133 at one end, and the first movable arm 120c and the second movable arm 120d are at a same distance from the transverse driving wheels 133 to which the first movable arm and the second movable arm respectively move close. When and transverse driving assembly 130 drives the first movable arm 120c and the second movable arm 120d to move close to or move away from each other, the first movable arm 120c and the second movable arm 120d are always at a same distance from the transverse driving wheels 133 to which the first movable arm and the second movable arm respectively move close. The first movable arm 120c and the second movable arm 120d can simultaneously move to a limiting position when moving away from each other. The first movable arm 120c and the second movable arm 120d can collide at a midpoint of a line connecting the two transverse driving wheels 133 when moving close to each other. The first movable arm 120c and the second movable arm 120d are symmetrically disposed between the two transverse driving wheels 133, which ensures a maximum distance adjustment range between the first movable arm 120c and the second movable arm 120d. In addition, when the first movable arm 120c and the second movable arm 120d adapt to the size of the container and transfer the container, the container can be located in the middle position of the carrying apparatus 100, which ensures the stability of the container during the transfer.

In an embodiment of the present disclosure, as shown in FIG. 19 and FIG. 20, the support frame 110 includes a transverse guide rail 111. The transverse guide rail 111 extends along the extending direction of the support frame 110, and the side arms 120 movably disposed on the support frame 110 along the extending direction of the support frame 110 are movably disposed in the transverse guide rail 111. The transverse guide rail 111 increases the smoothness of the movement of the transverse movable arm 120b (the first movable arm 120c and the second movable arm 120d) along the extending direction of the support frame 110. Optionally, the transverse movable arm 120b (the first movable arm 120c and the second movable arm 120d) and the transverse guide rail 111 are slidably mated, reliably mated, or mated in other manners capable of implementing the guiding function. Further, the support frame 110 includes two transverse guide rails 111. The two transverse guide rails 111 are disposed in parallel and are spaced apart from each other along the transfer direction. The two guide rails spaced apart from each other and in parallel jointly support and guide the side arms 120, which further increases the smoothness of the movement of the transverse movable arm 120b (the first movable arm 120c and the second movable arm 120d) along the extending direction of the support frame 110.

Figure 23:
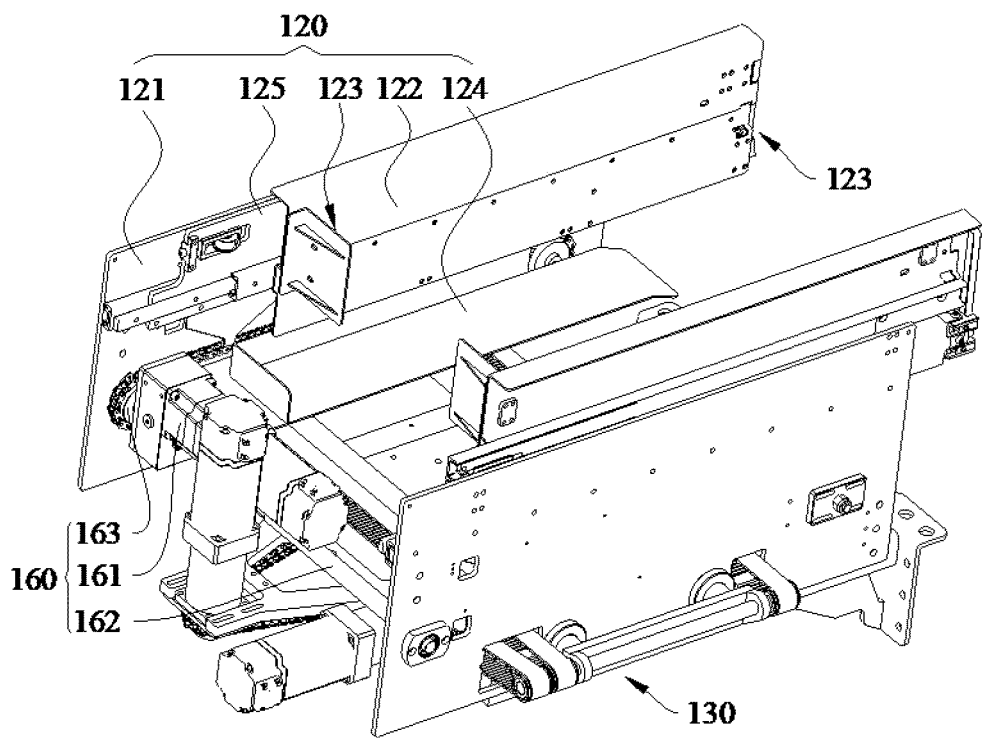
FIG. 23 is a schematic diagram of an inner arm section of a carrying apparatus structure in an extended state according to an embodiment of the present disclosure.

FIG. 23 is a schematic diagram of an inner arm section of a carrying apparatus structure in an extended state according to an embodiment of the present disclosure. In an embodiment of the present disclosure, as shown in FIG. 21 to FIG. 23, the carrying apparatus 100 further includes a bracket 140, and the support frame 110 is rotatably disposed on the bracket 140 along an axis in a vertical direction. The support frame 110 can drive the two side arms 120 to rotate relative to the bracket 140 along the axis in the vertical direction. That is to say, when the support frame 110 drives the side arms 120 to rotate, the transfer direction of the carrying apparatus 100 also changes accordingly. In this way, the carrying apparatus 100 can rotatably transfer goods to the carrying apparatus 100 from different directions, or the carrying apparatus 100 can transport the goods toward different directions, thereby enhancing the adaptability of the carrying apparatus 100 to an actual working condition. In a possible implementation, the carrying apparatus 100 further includes a rotary driving assembly 150. The rotary driving assembly 150 includes a chain wheel transmission structure 151 and a rotary motor 152. The rotary motor 152 drives, by using the chain wheel transmission structure 151, the support frame 110 to rotate relative to the bracket 140 along the axis in the vertical direction. Specifically, the support frame 110 is fixedly connected to the chain wheel, and when the rotary motor 152 drives the chain wheel to drive the support frame 110 to rotate along the axis in the vertical direction when rotating, and the rotary motor 152 is mounted to the bracket 140 or the support frame 110.

Various parts of the carrying apparatus 100 coordinate and cooperate to realize the transfer of the goods or the container. Optionally, the transfer action is directly completed by the side arms 120 or completed by an additionally disposed telescopic structure. The present disclosure does not limit the specific structure of the carrying apparatus 100 that directly performs the transfer action. In an embodiment of the present disclosure, as shown in FIG. 16 to FIG. 18, the transfer action is directly completed by the cooperation of the two side arms 120. Each of the side arms 120 includes an outer arm section 121, an inner arm section 122, a pusher assembly 123, and a temporary tray 124. The two outer arm sections 121 are respectively disposed on two ends of the support frame 110 in the extending direction. At least one of the outer arm sections 121 is movably disposed on the support frame 110 along the extending direction of the support frame 110. The temporary tray is fixedly disposed at a bottom of the outer arm section 121, the two temporary trays are disposed between the two outer arm sections 121 along the extending direction of the support frame 110, and the pusher assembly 123 is disposed on the inner arm section 122. The inner arm section 122 is movably disposed on the outer arm section 121 along the transfer direction to drive the pusher assembly 123 to move relative to the temporary tray along the transfer direction, and the pusher assembly 123 is capable of pushing out goods on the temporary tray or pulling goods to the temporary tray during the movement along the transfer direction. The side arms 120 directly perform the transfer actions, which simplifies an overall structure of the carrying apparatus 100. In other embodiments of the present disclosure, the outer arm section 121, the inner arm section 122, the pusher assembly 123, and the temporary tray 124 may further be directly disposed on the support frame 110, so as to coordinate with each other to complete the goods transfer.

Further, as shown in FIG. 21 to FIG. 23, each of the side arms 120 further includes a middle arm section 125. The middle arm section 125 is mounted between the inner arm section 122 and the outer arm section 121 and is movable relative to the outer arm section 121 along the transfer direction, and the inner arm section 122 is movable relative to the middle arm section 125 along the transfer direction. The side arms 120 further includes an acceleration assembly. The acceleration assembly includes a movable pulley and a strop. The movable pulley is mounted to the middle arm section 125. A middle portion of the strop is bent and sleeved on the movable pulley, to cause two ends of the strop to be opposite to each other. One end of the strop is fixedly connected to the outer arm section 121, and an other end of the strop is fixedly connected to the inner arm section 122. When the middle arm section 125 moves at a first speed relative to the outer arm section 121 along the transfer direction, the inner arm section 122 moves at a second speed relative to the outer arm section 121 along the transfer direction, and the second speed is twice the first speed. The arrangement of the middle arm section 125 and the acceleration assembly prolongs the distance of the side arms 120 for transferring goods along the transfer direction. In addition, the inner arm section 122 can be extended or retracted at a faster speed, which improves the efficiency of the carrying apparatus 100 for transferring the goods.

Figure 24:
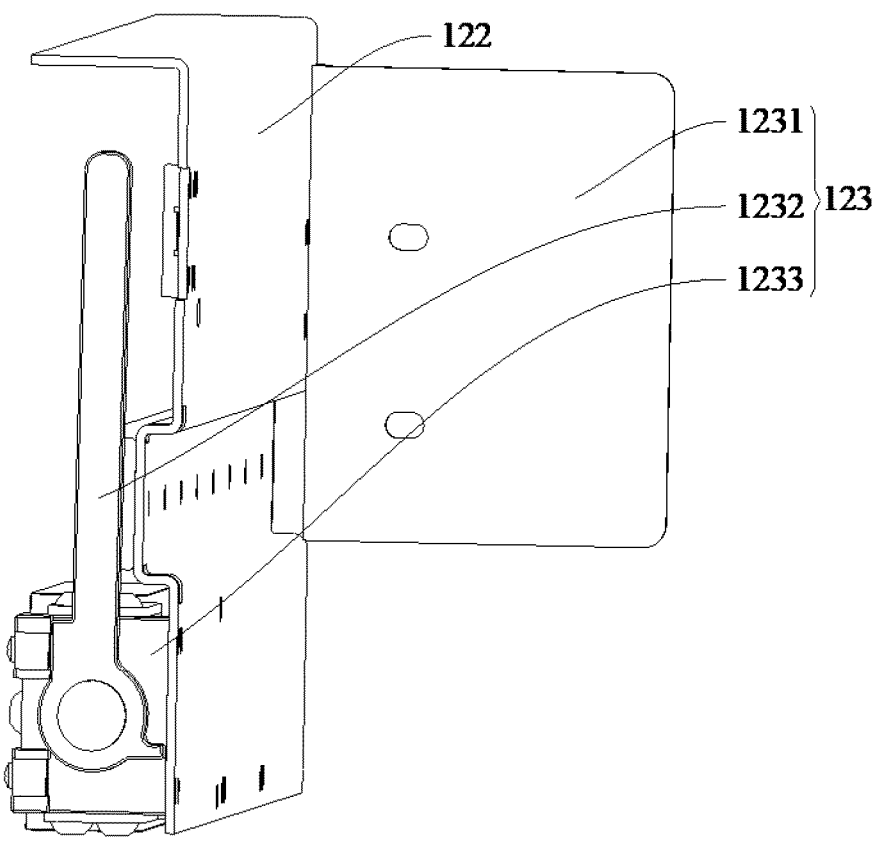
FIG. 24 is a schematic structural diagram of a movable pusher in an avoidance position according to an embodiment of the present disclosure.
Figure 25:
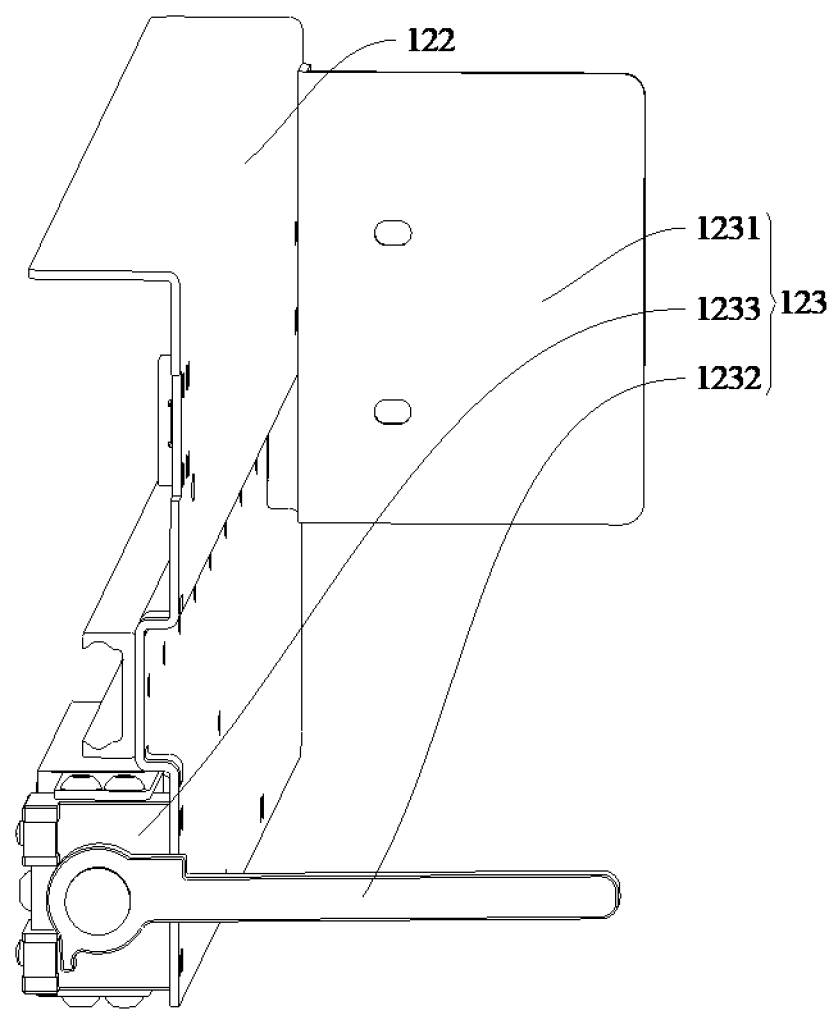
FIG. 25 is a schematic structural diagram of a movable pusher in an operating position according to an embodiment of the present disclosure.

FIG. 24 is a schematic structural diagram of a movable pusher in an avoidance position according to an embodiment of the present disclosure. FIG. 25 is a schematic structural diagram of a movable pusher in an operating position according to an embodiment of the present disclosure. In an embodiment of the present disclosure, as shown in FIG. 23 to FIG. 25, the carrying apparatus 100 further includes an arm section driving assembly 160. The arm section driving assembly 160 is disposed between the outer arm section 121 and the middle arm section 125, and is configured to drive the middle arm section 125 to move relative to the outer arm section 121 along the transfer direction. The arm section driving assembly 160 realizes the automatic completion of the transfer action. In a possible implementation, the arm section driving assembly 160 includes an arm section motor 161, an arm section transmission shaft 162, and two arm section chain wheel structures 163. The arm section transmission shaft 162 includes two sections connected by a spline structure along an axial direction of the ami section transmission shaft. The two arm section chain wheel structures 163 are respectively disposed on the two outer arm sections 121. Output ends of the two arm section chain wheel structures 163 are fixedly connected to the corresponding middle arm sections 125 along the transfer direction respectively. Two ends of the arm section transmission shaft 162 are drivingly connected to input ends of the two arm section chain wheel structures 163 respectively, and an output shaft of the arm section motor 161 is drivingly connected to the arm section transmission shaft 162. When the arm section motor 161 rotates, the arm section transmission shaft 162 is driven to rotate, thereby driving the chain wheel and the chain to rotate. In this way, the chain drives the pusher assembly 123 to move relative to the temporary tray along the transfer direction. When the pusher assembly 123 moves along the transfer direction, the goods on the temporary tray can be pushed out, or the goods can be pulled to the temporary tray. When the transverse movable arm 120b moves close to or away from the transverse fixed arm 120a, the arm section transmission shaft 162 of the spline mechanism can ensure the real-time effective transmission of the arm section motor 161 and the two arm section chain wheel structures 163. When the transverse movable arm 120b moves close to the transverse fixed arm 120a, the arm section transmission shaft 162 of the spline structure correspondingly reduces axial dimensions of the arm section transmission shaft. When the transverse movable arm 120b moves away from the transverse fixed arm 120a, the arm section transmission shaft 162 of the spline structure correspondingly increases axial dimensions of the arm section transmission shaft.

The function of the pusher assembly 123 is to push out the goods on the temporary tray along the transfer direction, or pull the goods to the temporary tray. In an embodiment of the present disclosure, as shown in FIG. 24 and FIG. 25, the pusher assembly 123 includes a fixed pusher 1231 and a movable pusher 1232. The movable pusher 1232 is rotatably mounted to an extension end of the inner arm section 122, and the fixed pusher 1231 is fixedly mounted to an end of the inner arm section 122 away from the movable pusher 1232. When the pusher assembly 123 extends out relative to the temporary tray along the transfer direction, the fixed pusher 1231 can push out the goods on the temporary tray along the transfer direction. When the pusher assembly 123 is retracted relative to the temporary tray along the transfer direction, the movable pusher 1232 can pull the goods to the temporary tray along the transfer direction. Further, a rotation plane of the movable pusher 1232 is perpendicular to the transfer direction, and the movable pusher 1232 has a working position and an avoidance position during the rotation. When the pusher assembly 123 extends out relative to the temporary tray along the transfer direction, the movable pusher 1232 rotates to the avoidance position, and the fixed pusher 1231 can push out the goods on the temporary tray along the transfer direction. When the pusher assembly 123 is retracted relative to the temporary tray along the transfer direction, the movable pusher 1232 rotates to the working position, and the movable pusher 1232 can pull the goods to the temporary tray along the transfer direction. In a possible implementation, the movable pusher 1232 is driven by a movable motor 1233 to rotate. Further, the carrying apparatus 100 further includes a camera module. The camera module is configured to acquire image information to detect whether the two side arms 120 correspond to designated to-be-transferred goods, and whether the pusher assembly 123 is in contact with the to-be-transferred goods. The camera module may be, for example, a two-dimensional camera or a three-dimensional camera.

In the above carrying apparatus and the transport robot, the side anus movable along the extending direction of the support frame can adjust the distance between the two side arms according to an external size of the goods, and then parts of the carrying apparatus collaborate with each other to perform the transfer action. In this way, the adaptability of the carrying apparatus and the transport robot to containers of different sizes is greatly enhanced, thereby effectively improving the efficiency of the goods transfer.

In an embodiment of the present disclosure, a carrying apparatus configured to convey goods along a transfer direction is provided. The carrying apparatus includes:
a support frame, extending along a direction perpendicular to the transfer direction in a horizontal plane;
two side arms, respectively disposed on two ends of the support frame in an extending direction, where the two side arms extend along the transfer direction, and at least one of the side arms is movably disposed on the support frame along the extending direction of the support frame; and
a transverse driving assembly, drivingly connected to the at least one of the side arms and configured to drive the at least one of the side arms to move along the extending direction of the support frame, to cause the two side arms to move close to or away from each other along the extending direction of the support frame, so that the two side arms adapt to a size of the carried goods when moving close to each other along the extending direction of the support frame.

In some embodiments, the two side arms are respectively a transverse fixed arm and a transverse movable arm. The transverse fixed arm is fixedly disposed on one end of the support frame along the extending direction of the support frame, and the transverse movable arm is movably disposed on the support frame along the extending direction of the support frame.

In some embodiments, the transverse driving assembly includes a transverse power source and a transverse transmission structure. An output end of the transverse power source is drivingly connected to an input end of the transverse transmission structure, and an output end of the transverse transmission structure is fixedly connected to the transverse movable arm along the extending direction of the support frame.

In some embodiments, the transverse power source includes a transverse motor. The transverse transmission structure includes a transverse traction rope and at least two transverse driving wheels. The at least two transverse driving wheels are spaced apart on the support frame along the extending direction of the support frame. At least one of the transverse driving wheels is drivingly connected to an output shaft of the transverse motor. The transverse traction rope is sleeved on the at least two transverse driving wheels. The transverse traction rope is fixedly connected to the transverse movable arm along the extending direction of the support frame, and the at least one of the transverse driving wheels drives the transverse traction rope to move during rotation, thereby driving the transverse movable arm to move along the extending direction of the support frame.

In some embodiments, the transverse driving assembly includes two transverse transmission structures. The two transverse transmission structures are spaced apart on the support frame along the transfer direction. The transverse driving assembly further includes a transverse transmission shaft. The output shaft of the transverse motor is drivingly connected to the transverse transmission shaft. The transverse transmission shaft is drivingly connected to one of the transverse driving wheels of the two transverse transmission structures, and the transverse traction ropes of the two transverse transmission structures are drivingly connected to the transverse movable arm.

In some embodiments, the two side arms are respectively a first movable arm and a second movable arm, and the first movable arm and the second movable arm are movably disposed on the support frame along, the extending direction of the support frame. The first movable arm and the second movable arm are drivingly connected to the transverse driving assembly, and the transverse driving assembly drives the first movable arm and the second movable arm to move along the extending direction of the support frame.

In some embodiments, the transverse driving assembly includes a transverse power source and a transverse transmission structure. The output end of the transverse power source is drivingly connected to the input end of the transverse transmission structure, and the output end of the transverse transmission structure is fixedly connected to the first movable arm and the second movable arm along the extending direction of the support frame.

In some embodiments, the transverse power source includes a transverse motor, and the transverse transmission structure includes a transverse traction rope and at least two transverse driving wheels. The at least two transverse driving wheels are spaced apart on the support frame along the extending direction of the support frame. At least one of the transverse driving wheels is drivingly connected to the output shaft of the transverse motor, and the transverse traction rope is sleeved on the at least two transverse driving wheels. Two sections of the transverse traction rope wound around the transverse driving wheels are fixedly connected to the first movable arm and the second movable arm respectively, and at least one of the transverse driving Wheels drives the transverse traction rope to move during rotation, thereby driving the first movable arm and the second movable arm to move close to or away from each other along the extending direction of the support frame.

In some embodiments, the transverse driving assembly includes two transverse transmission structures. The two transverse transmission structures are spaced apart on the support frame along, the transfer direction. The transverse driving assembly further includes a transverse transmission shaft. The output shaft of the transverse motor is drivingly connected to the transverse transmission shaft. The transverse transmission shaft is drivingly connected to one of the transverse driving wheels of the two transverse transmission structures, and the transverse traction ropes of the two transverse transmission structures wound around two sections of the transverse driving wheel are respectively fixedly connected to the first movable arm and the second movable arm.

In some embodiments, the transverse transmission structure includes two transverse driving wheels, and the first movable arm and the second movable arm are symmetrically disposed between the two transverse driving wheels.

In some embodiments, the carrying apparatus further includes a bracket, and the support frame is rotatably disposed on the bracket along an axis in a vertical direction.

In some embodiments, the carrying apparatus further includes a rotary driving assembly. The rotary driving assembly includes a chain wheel transmission structure and a rotary motor, and the rotary motor drives, by using the chain wheel transmission structure, the support frame to rotate relative to the bracket along the axis in the vertical direction.

In some embodiments, each of the side arms includes an outer arm section, an inner arm section, a pusher assembly, and a temporary tray. The two outer arm sections are respectively disposed on two ends of the support frame in the extending direction. At least one of the outer arm sections is movably disposed on the support flame along the extending direction of the support frame. The temporary tray is fixedly disposed at a bottom of the outer arm section, the two temporary trays are disposed between the two outer arm sections along the extending direction of the support frame, and the pusher assembly is disposed on the inner arm section. The inner arm section is movably disposed on the outer arm section along the transfer direction to drive the pusher assembly to move relative to the temporary tray along the transfer direction, and the pusher assembly is capable of pushing out goods on the temporary tray or pulling goods to the temporary tray during the movement along the transfer direction.

In some embodiments, each of the side arms further includes a middle arm section and an acceleration assembly. The middle arm section is mounted between the inner arm section and the outer arm section and is movable relative to the outer arm section along the transfer direction, and the inner arm section is movable relative to the middle arm section along the transfer direction. The acceleration assembly includes a movable pulley and a strop. The movable pulley is mounted to the middle arm section. A middle portion of the strop is bent and sleeved on the movable pulley, to cause two ends of the strop to be opposite to each other. One end of the strop is fixedly connected to the outer arm section, and an other end of the strop is fixedly connected to the inner arm section. When the middle arm section moves at a first speed relative to the outer arm section along the transfer direction, the inner arm section moves at a second speed relative to the outer arm section along the transfer direction, and the second speed is twice the first speed.

In some embodiments, the carrying apparatus further includes an arm section driving assembly. The arm section driving assembly is disposed between the outer arm section and the middle arm section, and is configured to drive the middle arm section to move relative to the outer arm section along the transfer direction. The arm section driving assembly includes an arm section motor, an arm section transmission shaft, and two arm section chain wheel structures. The arm section transmission shaft includes two sections connected by a spline structure along an axial direction of the arm section transmission shaft. The two arm section chain wheel structures are respectively disposed on the two outer arm sections. Output ends of the two arm section chain wheel structures are fixedly connected to the corresponding middle arm sections along the transfer direction respectively, two ends of the arm section transmission shaft are drivingly connected to input ends of the two arm section chain wheel structures respectively, and an output shaft of the arm section motor is drivingly connected to the arm section transmission shaft.

In some embodiments, the support frame includes a transverse guide rail. The transverse guide rail extends along the extending direction of the support frame, and the side arm movably disposed on the support frame along the extending direction of the support frame is movably disposed in the transverse guide rail.

In some embodiments, the support frame includes two transverse guide rails, and the two transverse guide rails are disposed in parallel and are spaced apart from each other along the transfer direction.

In some embodiments, the carrying apparatus further includes a camera module. The camera module is configured to acquire image information to detect whether the two side arms correspond to designated to-be-transferred goods.

A transport robot according to an embodiment of the present disclosure includes a mobile chassis, a storage shelving rack, a lifting assembly, and the carrying apparatus. The storage shelving rack is mounted to the mobile chassis and is provided with a plurality of storage trays distributed along a vertical direction. Each of the storage trays is configured to place goods. The carrying apparatus is configured to transfer the goods between a stationary shelving unit and any of the storage trays, and the lifting assembly is configured to drive the carrying apparatus to move along the vertical direction, to cause the carrying apparatus to be raised or lowered to a height corresponding to the storage tray or a height of the stationary shelving unit. When the carrying apparatus is raised or lowered to the height corresponding to the storage tray, the carrying apparatus pushes the goods to the corresponding storage tray along a transfer direction, or the carrying apparatus pulls the goods located on the corresponding storage tray out along the transfer direction. When the carrying apparatus is raised or lowered to the height corresponding to the stationary shelving unit, the carrying apparatus pushes the goods to the corresponding stationary shelving unit along the transfer direction, or the carrying apparatus pulls the goods located on the corresponding stationary shelving unit out along the transfer direction.

Specifically, the storage shelving rack is mounted to the mobile chassis, the lifting assembly is mounted to the storage shelving rack, and the lifting assembly is fixedly connected to the bracket of the carrying apparatus along the vertical direction. In the above transport robot, the side arms movable along the extending direction of the support frame can adjust the distance between the two side arms according to an external size of the goods, and then parts of the carrying apparatus collaborate with each other to perform the transfer action. In this way, the adaptability of the carrying apparatus and the transport robot provided in the utility model to containers of different sizes is greatly enhanced.

An embodiment of the present disclosure further provides a control apparatus 500, including: at least one processor 520; and a memory 510, communicatively connected to the at least one processor 520, the memory 510 storing executable code, the executable code, when executed by the at least one processor 520, causing the at least one processor 520 to perform some or all of the methods of FIG. 15 to FIG. 18. The control apparatus 500 has the same structure and working principle as the control apparatus 500 in the embodiment of FIG. 5, and the details will not be described herein again.

Finally, it should be noted that: the foregoing embodiments are merely used for describing the technical solutions of the present application, but are not intended to limit the present disclosure. Although the present disclosure is described in detail with reference to the foregoing embodiments, it should be appreciated by a person of ordinary skill in the art that, modifications may still be made to the technical solutions recorded in the foregoing embodiments, or equivalent restorages may be made to the part of all of the technical features; as long as such modifications or restorages do not cause the essence of corresponding technical solutions to depart from the scope of the technical solutions of the embodiments of the present disclosure.

What is claimed is:

1. A control method for goods retrievement, applicable to a transport robot, wherein the transport robot is provided with a first camera, a second camera, and a carrying apparatus configured to take out goods, and the method comprises:
   receiving a retrievement instruction, and acquiring locating information of target goods according to the retrievement instruction;
   moving the transport robot to a target position according to the locating information;
   obtaining status information of the target goods and relative position information between the carrying apparatus and the target goods, wherein the status information of the target goods comprises posture information of the target goods; and
   adjusting a position and posture of the carrying apparatus according to the status information and the relative position information, and causing the carrying apparatus to take out the target goods,
   wherein the obtaining status information of the target goods and relative position information between the carrying apparatus and the target goods comprises:
   causing the first camera to attempt to read a preset identifier to obtain a position relationship between the transport robot and the preset identifier, wherein the preset identifier is a shelving unit identifier of a shelving unit where the target goods is stored;
   determining, based on the position relationship between the transport robot and the preset identifier, whether the carrying apparatus could directly reach the position of the target goods from a current position of the transport robot if the first camera successfully reads the preset identifier; and
   shooting the target goods by using the second camera to obtain the posture information of the target goods and the relative position information of the target goods and the carrying apparatus, if it is determined that the carrying apparatus could directly reach the target goods from the current position of the transport robot;
   and-wherein the adjusting a position and posture of the carrying apparatus according to the status information and the relative position information, and causing the carrying apparatus to take out the target goods comprises:—adjusting the position and posture of the carrying apparatus according to the relative position information and the posture information, and causing the carrying apparatus to take out the target goods in the adjusted position and posture.

2. The method according to claim 1,
   wherein the status information further comprises size information of the target goods; wherein the carrying apparatus has a pair of telescopic arms, and the adjusting the position and posture of the carrying apparatus further comprises:
   adjusting a spacing between the pair of telescopic arms to adapt to a size of the target goods,
   wherein before the adjusting the position and posture of the carrying apparatus according to the relative position information and the posture information, the method comprises:
   determining whether the target goods exist; and
   determining whether a size of the target goods is within a size range that the carrying apparatus can take out if the target goods exist,
   wherein before the causing the carrying apparatus to take out the target goods in the adjusted position and posture, the method comprises:
   determining whether the carrying apparatus will collide with a shelving unit when retrieving the goods,
   wherein the moving the transport robot to a target position comprises:
   moving a chassis of the transport robot to the target position, and then raising or lowering the carrying apparatus to a target shelving unit height and rotating the carrying apparatus to a target direction; or
   moving a chassis of the transport robot to the target position, and raising or lowering the carrying apparatus to a target height and rotating the carrying apparatus to a target direction during the movement of the chassis of the transport robot.

3. The method according to claim 1, wherein the transport robot comprises a chassis;
   the relative position information between the carrying apparatus and the target goods comprises: a deviation between the carrying apparatus and the target goods in a traveling direction of the transport robot, a relative distance between the carrying apparatus and the target goods in a taken-out direction of the carrying apparatus, and an angle at which the target goods are placed relative to the carrying apparatus;
   wherein the adjusting the position and posture of the carrying apparatus according to the relative position information and the posture information comprises:
   aligning a specific position of the transport robot to a specific position of the target goods by performing at least one of the following: driving the chassis of the transport robot, raising or lowering the carrying apparatus, or rotating the carrying apparatus.

4. The method according to claim 3, wherein the carrying apparatus has a telescopic arm, and the causing the carrying apparatus to take out the target goods in the adjusted position and posture comprises:
   determining an extension depth of the carrying apparatus; and
   causing the telescopic arm to extend out by the extension depth in the adjusted position and posture, wherein
   the extension depth is equal to a sum of the relative distance between the carrying apparatus and the target goods in the taken-out direction of the carrying apparatus and a predetermined percentage of a largest one of sizes of all to-be-retrieved goods in the taken-out direction; or the extension depth is equal to a preset maximum extension size.

5. The method according to claim 1, wherein the transport robot has a chassis and the carrying apparatus supported on the chassis, and the carrying apparatus has a first arm portion and a second arm portion and is configured to place the goods between the first arm portion and the second arm portion when retrieving the goods;
- wherein the status information of the target goods further comprises size information of the target goods;
- wherein in the adjusting the position and posture of the carrying apparatus, the adjustment comprises at least adjusting a spacing between the first arm portion and the second arm portion to adapt to a size of the target goods; and
- the causing the carrying apparatus to take out the target goods further comprises: causing the first arm portion and the second arm portion to take out the target goods at the adjusted spacing.

6. The method according to claim 5, wherein the size information of the target goods is obtained by at least one of the following:
- obtaining the size information of the target goods from an external management system of the transport robot;
- obtaining the size information of the target goods based on sensing of the target goods by the transport robot,
- obtaining the size information of the target goods from the retrievement instruction;
- obtaining the size information of the target goods based on a preset identifier on the target goods; and
- obtaining the size information of the target goods by causing the transport robot to acquire image information of the target goods.

7. The method according to claim 5, wherein the first arm portion is a movable arm portion, the second arm portion is a fixed arm portion, and the adjusting a spacing between the first arm portion and the second arm portion is achieved by moving the first arm portion; or
- the first arm portion and the second arm portion are both movable arm portions, and the adjusting a spacing between the first arm portion and the second arm portion is achieved by simultaneously or successively moving the first arm portion and the second arm portion.

8. The method according to claim 7, wherein the first camera is a two-dimensional camera, the second camera is a three-dimensional camera.

9. The method according to claim 5, wherein the size information of the target goods is obtained by the shooting the target goods by using the second camera; the causing the first arm portion and the second arm portion to take out the target goods at the adjusted spacing comprises: causing the first arm portion and the second arm portion to extend to a position allowing one of all to-be-retrieved goods having a largest size in a taken-out direction to be taken out or causing the first arm portion and the second arm portion to extend by a preset maximum extension size, to take out the target goods at the adjusted spacing.

10. The method according to claim 5, wherein before the obtaining position relationship information between the carrying apparatus and the target goods, the method further comprises:
- determining whether the target goods exist; and
- determining whether a size of the target goods is within a size range that the carrying apparatus can take out if the target goods exist, wherein the adjusting the position and posture of the carrying apparatus further comprises:
  - aligning a specific position of the transport robot to a specific position of the preset identifier on the target goods or aligning the specific position of the transport robot to the specific position of the target goods by performing at least one of the following: driving the chassis of the transport robot, raising or lowering the carrying apparatus, or rotating the carrying apparatus, wherein the adjusting the position and posture of the carrying apparatus comprises:
  - aligning a specific position between the first arm portion and the second arm portion to a specific position of the target goods by performing at least one of the following: driving the chassis of the transport robot, raising or lowering the carrying apparatus, or rotating the carrying apparatus, and simultaneously or successively adjusting the first arm portion and the second arm portion, to cause the spacing between the first arm portion and the second arm portion to adapt to the size of the target goods; or
  - causing the first arm portion and one side edge of the target goods to satisfy a corresponding preset position relationship by performing at least one of the following: driving the chassis of the transport robot, raising or lowering the carrying apparatus, or rotating the carrying apparatus, and causing the second arm portion and an other side edge of the target goods to satisfy the corresponding preset position relationship by adjusting the second arm portion.

11. The method according to claim 5, wherein the moving the transport robot to the target position comprises:
- moving the chassis of the transport robot to the target position, and then raising or lowering the carrying apparatus to a target shelving unit height and rotating the carrying apparatus to a target direction; or moving the chassis of the transport robot to the target position, and raising or lowering the carrying apparatus to a target height and rotating the carrying apparatus to a target direction during the movement of the chassis of the transport robot.

12. The method according to claim 5, wherein the causing the first arm portion and the second arm portion to take out the target goods at the adjusted spacing comprises: determining, by using a sensor disposed on the first arm portion or the second arm portion or sensors disposed on the first arm portion and the second arm portion, whether the first arm portion and and/or the second arm portion will collide with the target goods during the goods retrievement by the first arm portion and the second arm portion, if so, aborting or terminating the retrievement task, and if not, retrieving the goods.

13. A control method for goods retrievement, applicable to a transport robot, wherein the transport robot is provided with a carrying apparatus configured to take out goods, and the method comprises:
- receiving a retrievement instruction, and acquiring locating information of target goods according to the retrievement instruction;
- moving the transport robot to a target position according to the locating information;
- obtaining status information of the target goods and relative position information between the carrying apparatus and the target goods, wherein the status information of the target goods comprises posture information of the target goods; and
- adjusting a position and posture of the carrying apparatus according to the status information and the relative position information, and causing the carrying apparatus to take out the target goods; wherein the obtaining status information of the target goods and relative position information between the carrying apparatus and the target goods comprises:

acquiring, by the transport robot, three-dimensional imaging information of the target goods; and acquiring the posture information of the target goods and the relative position information between the carrying apparatus and the target goods according to the three-dimensional imaging information; and wherein the adjusting a position and posture of the carrying apparatus according to the status information and the relative position information, and causing the carrying apparatus to take out the target goods comprises:

adjusting the position and posture of the carrying apparatus according to the relative position information and the posture information, and causing the carrying apparatus to take out the target goods in the adjusted position and posture; wherein the carrying apparatus has a telescopic arm, and the causing the carrying apparatus to take out the target goods in the adjusted position and posture comprises:

determining an extension depth of the carrying apparatus; and causing the telescopic arm to extend out by the extension depth in the adjusted position and posture, wherein the extension depth is equal to a sum of the relative distance between the carrying apparatus and the target goods in the taken-out direction of the carrying apparatus and a predetermined percentage of a largest one of sizes of all to-be-retrieved goods in the taken-out direction.

14. A control method for goods retrievement, applicable to a transport robot, wherein the transport robot is provided with a carrying apparatus configured to take out goods, and the method comprises:

receiving a retrievement instruction, and acquiring locating information of target goods according to the retrievement instruction;

moving the transport robot to a target position according to the locating information;

obtaining status information of the target goods and relative position information between the carrying apparatus and the target goods, wherein the status information of the target goods comprises posture information of the target goods; and adjusting a position and posture of the carrying apparatus according to the status information and the relative position information, and causing the carrying apparatus to take out the target goods;

wherein the obtaining status information of the target goods and relative position information between the carrying apparatus and the target goods comprises:

acquiring, by the transport robot, three-dimensional imaging information of the target goods; and acquiring the posture information of the target goods and the relative position information between the carrying apparatus and the target goods according to the three-dimensional imaging information; and wherein the adjusting a position and posture of the carrying apparatus according to the status information and the relative position information, and causing the carrying apparatus to take out the target goods comprises:

adjusting the position and posture of the carrying apparatus according to the relative position information and the posture information, and causing the carrying apparatus to take out the target goods in the adjusted position and posture;

wherein before the causing the carrying apparatus to take out the target goods in the adjusted position and posture, the method comprises:

determining whether the carrying apparatus will collide with a shelving unit when retrieving the goods;

when it is determined that the carrying apparatus will collide with the shelving unit after being extended out, readjusting the position and posture of the carrying apparatus; and when it is determined that the carrying apparatus will not collide with the shelving unit after being extended out, causing the carrying apparatus to take out the target goods in the adjusted position and posture.

* * * * *